United States Patent
Narvaez et al.

(10) Patent No.: US 8,503,470 B2
(45) Date of Patent: *Aug. 6, 2013

(54) SYSTEM AND METHOD FOR PERFORMING CONCATENATION OF DIVERSELY ROUTED CHANNELS

(75) Inventors: Paolo Narvaez, Wayland, MA (US); Murat Bog, Fremont, CA (US)

(73) Assignee: NetLogic Microsystems, Inc., Mountain View, CA (US)

(*) Notice: Subject to any disclaimer, the term of this patent is extended or adjusted under 35 U.S.C. 154(b) by 270 days.

This patent is subject to a terminal disclaimer.

(21) Appl. No.: 12/716,094

(22) Filed: Mar. 2, 2010

(65) Prior Publication Data

US 2010/0254709 A1 Oct. 7, 2010

Related U.S. Application Data

(63) Continuation of application No. 11/336,188, filed on Jan. 20, 2006, now Pat. No. 7,684,426.

(60) Provisional application No. 60/645,841, filed on Jan. 21, 2005.

(51) Int. Cl.
*H04L 12/54* (2006.01)

(52) U.S. Cl.
USPC .......................................... 370/419; 370/428

(58) Field of Classification Search
None
See application file for complete search history.

(56) References Cited

U.S. PATENT DOCUMENTS

| | | | |
|---|---|---|---|
| 3,997,729 A * | 12/1976 | Costales et al. | 370/515 |
| 5,383,196 A | 1/1995 | Morton | |
| 5,577,105 A | 11/1996 | Baum et al. | |
| 6,842,455 B1 | 1/2005 | Heuer | |
| 7,424,036 B1 * | 9/2008 | Alexander et al. | 370/474 |
| 7,492,714 B1 * | 2/2009 | Liao et al. | 370/235 |
| 7,684,426 B2 * | 3/2010 | Narvaez et al. | 370/419 |
| 2002/0001308 A1 | 1/2002 | Heuer | |
| 2002/0009048 A1 | 1/2002 | Hosler et al. | |
| 2003/0095563 A1 * | 5/2003 | Wu | 370/442 |
| 2004/0076168 A1 | 4/2004 | Patenaude | |
| 2004/0105456 A1 * | 6/2004 | Lanzone et al. | 370/429 |
| 2004/0120362 A1 * | 6/2004 | Chohan et al. | 370/907 |
| 2004/0136217 A1 | 7/2004 | De Sandre | |

FOREIGN PATENT DOCUMENTS

WO 00/46938 A1 8/2000

OTHER PUBLICATIONS

International Search Report Issued Dec. 5, 2007 in Corresponding PCT/US2006/02144.

* cited by examiner

*Primary Examiner* — Andrew Chriss
*Assistant Examiner* — Salvador E Rivas
(74) *Attorney, Agent, or Firm* — Sterne, Kessler, Goldstein & Fox, P.L.L.C.

(57) ABSTRACT

A system and method are provided for performing Local Centre Authorization Service (LCAS) in a network system, the system having a data aligner configured to align bytes of input data according to groups of members. The system also including an LCAS control manager configured to generate de-sequencing control commands in response to data input from the data aligner. The system further including a de-sequencer configured to de-sequence the input data input from the data aligner according to de-sequencing control commands received from the LCAS control manager.

21 Claims, 35 Drawing Sheets

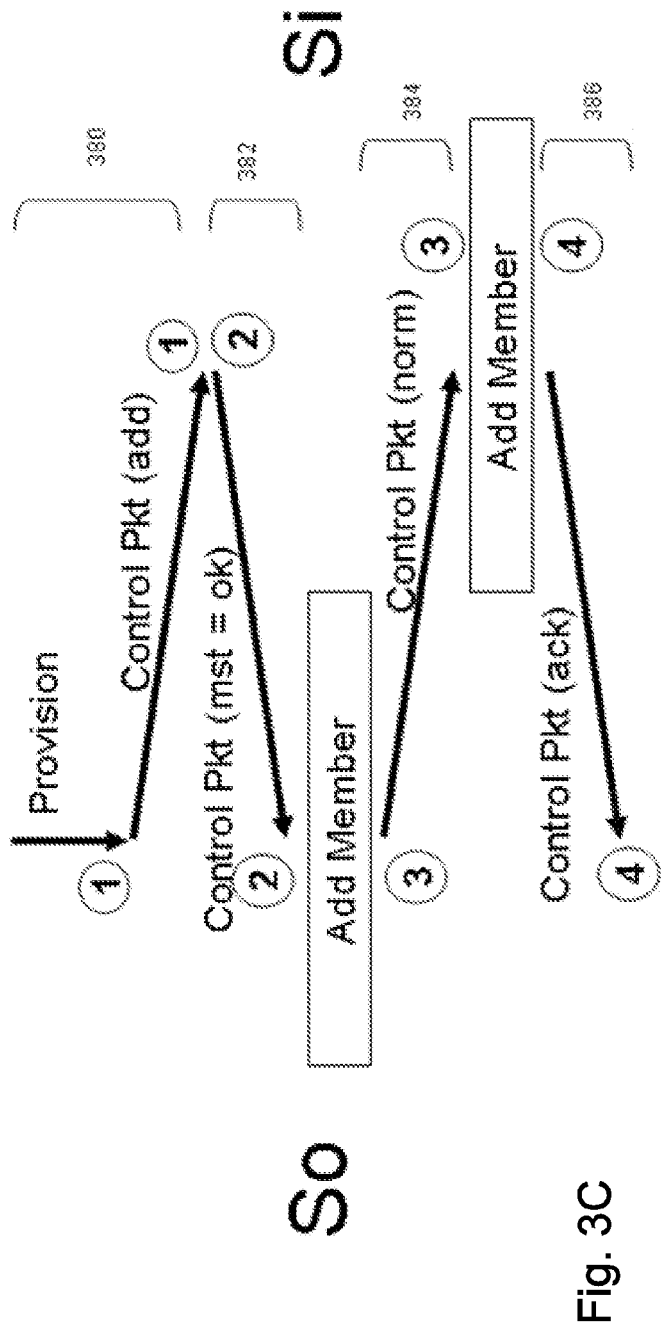

SYSTEM AND METHOD FOR PERFORMING CONCATENATION OF DIVERSELY ROUTED CHANNELS

RELATED APPLICATIONS

This application is a continuation of U.S. application Ser. No. 11/336,188, filed on Jan. 20, 2006, issued as U.S. Pat. No. 7,684,426, which claims priority to U.S. provisional application No. 60/645,841, filed on Jan. 21, 2005, all of which are hereby incorporated by reference in their entireties.

BACKGROUND

VCAT

The invention is directed to novel hardware and software systems, methods, devices and configurations in virtual concatenated signals, including new protocols used to enable TDM (Time Division Multiplexed) networks to better accommodate data traffic.

Such systems pertain to the efficient transport of data services over Synchronous Optical Network (SONET) and Synchronous Digital Hierarchy (SDH). The term TDM can be used to represent both SONET and SDH. New protocols, including Broadband Low Order (LO) and High-Order (HO) Virtual Concatenation (VCAT), specified in the T1.105 addenda, and G.7042 Link Capacity Adjustment Scheme (LCAS) allow TDM networks to better accommodate data traffic. The International Telecommunication Union (ITU) has published standards regarding LCAS and for virtual concatenated signals. The ITU-T recommendation G7042/Y.1305 defines the required states at the source and sink side of the network link as well as the control information exchanged between both the source and sink side of the link to enable the flexible resizing of the Virtual Concatenated signal. The actual information fields used to convey the control information through transport networks are defined in ITU-T Recommendations G.707, G783 for SDH and ITU Recommendations G.709 and G798 for OTN. All of these are universally recognized and well known and available to those skilled in the art, and are incorporated by reference for purposes of this application, including the commonly used definitions included therein.

Virtual concatenation provides the ability to transmit and receive several noncontiguous STSs/VCs fragments as a single flow. This grouping of STSs/VCs is called a virtual concatenation group (VCG). Using the same example as in the previous section, the STS-3c payload can be converted to a VCAT payload and be mapped noncontiguously to three STS-1s.

The VCAT notation for SONET is STS-n-mv, where n is the size of the noncontiguous STS fragments that will be used to transport the entire VCG. The value of m is the total number of n fragments that it takes to make up the total VCG. The "v" indicates that this is a VCAT payload. So in the preceding example the VCG would be an STS-1-3v flow.

Three STS-1s make up the total flow of an STS-3. An STS-12c can be broken down into STS-1 or STS-3c fragments; thus it can be transported as an STS-1-12v or STS-3c-4v. The VCAT notation for SDH is VCn-mv, where the definitions of n and m are the same as used for SONET. For example a VC-4-16c payload can be mapped to a VC-3-16v or VC-4-4v Unlike noncommon concatenations, such as an STS-24c/VC-4-8c, VCAT only needs to be implemented in the path-terminating devices because resequencing and the indication of multiframing is performed via the H4 byte, a path overhead field. Path overhead is only used at the source and destination of the TDM flow. Since VCAT streams are composed of STS-1/VC-3 and STS-3c/VC-4, which are supported by virtually all SONET/SDH devices, the legacy non-path-terminating transport equipment need not support VCAT. Therefore, the utilization gains can be enjoyed by the rest of the TDM network without the need to map circuits to larger fixed concatenations and without the need to aggregate smaller flows to larger fixed concatenations, as explained earlier.

An additional feature that VCAT indirectly supports—although it does not specify the means—is the ability to provide hitless resizing of STS/VC paths. LCAS is one scheme that defines hitless resizing. Since a VCAT's payload is broken into several fragments, adding or removing bandwidth can be accomplished by adding fragments to or removing them from an existing flow, as discussed in the following section. VCAT also does not specify a protection scheme, but the LCAS scheme can also provide protection control.

Finally, additional wideband support for virtual tributary (VT)-1.5s (1.544 Mbps) and VC-12 (2.048 Mbps) is available for even smaller granularity selection. This is low-order (LO) VCAT.

LCAS

Changing a customer's bandwidth profile is always an issue. It is important to take something that works, change it, and make sure it works again without anyone noticing. Most customers demand this, and many have it written into their service contracts. The best-case scenario for adding or decreasing bandwidth occurs when there is enough bandwidth for both the old and new paths to coexist during re-provisioning. After the two circuits are up, a bridge-and-roll is performed to move the customer to the new circuit. But when there is not enough bandwidth for the two flows to coexist, the old circuit must be removed before the new circuit can be set up, resulting in a customer outage. The aim of LCAS is to make changing bandwidth a simpler and safer task.

LCAS provides a control mechanism for the "hitless" increasing or decreasing of the capacity in a VCG link to meet the bandwidth needs of the application. It also provides the capability to temporarily remove member links that have experienced a failure. The LCAS assumes that, in cases of capacity initiation, increase, or decrease, the modification of the end-to-end path of each individual VCG member is the responsibility of the network and element management systems. That is, LCAS provides a mechanism for bandwidth reprovisioning, but it is not the controlling mechanism that decides when or why the operation is made.

Features of LCAS include the ability to increase and decrease VCG capacity in increments of its fragmented bandwidths, hitless bandwidth changes, automatic removal of failed VCG fragments without removing the entire VCG, as well as dynamic replacement of failed fragments with working fragments, interworking of LCAS VCG to non-LCAS VCG; that is, a LCAS transmitter can transfer to a non-LCAS receiver and visa versa, unidirectional control of a VCG, giving the ability to have asymmetrical connections, and many other features. These features offer a list of benefits that can greatly improve transport networking. LCAS offers the flexibility to add and remove bandwidth capacity within a VCG without affecting service or taking down the VCG. This not only saves provisioning time, but it eliminates the restriction of working during the "maintenance window." In addition, less planning is needed, because the engineer needs to find only the incremental bandwidth for the circuit, rather than the additional bandwidth required for a bridge-and-roll.

Another key benefit is that LCAS adds and deletes bandwidth in VCG increments. This allows the provider to offer a greater range of SLAs. Also adding to the SLA feature list is LCAS's ability to add bandwidth on demand. Therefore, it will aid in the creation of customer-based on-demand bandwidth changes—another advantage for the service provider.

In addition to management provisioning and customer invocations, LCAS can work in conjunction with signaling protocols to dynamically change the flow of traffic in a network. One application for this would be network-wide or span-based load balancing. Furthermore, load balancing/network recovery could be biased toward those customers that pay for a higher availability. A load-sharing restoration scheme potentially can be a component of a service that, when combined with packet-level prioritization and congestion-avoidance schemes, produces new types of enhanced service offerings.

VCAT flexibility could also be enhanced with LCAS. This will greatly improve the provider's ability to provision flexible and efficient SLAs as well as to provide dynamic TDM path restoration.

The SONET/SDH ("Synchronous Optical Network/Synchronous Digital Heirarchy") transport hierarchy was designed to provide telecom carriers a practical means to carry voice and private line services using time-division multiplexing. In its initial design, SONET/SDH maintained a fixed hierarchical structure with a limited set of data rates (e.g. 51 Mb/s, 155 Mb/s, 622 Mb/s, 2.5 Gb/s, 10 Gb/s, 40 Gb/s). With the growth of the Internet and Enterprise data networks, and as the range and type of traffic has expanded, there is a need to make this structure more flexible and powerful.

The introduction of a set of next-generation SONET/SDH technologies, consisting of GFP, VCAT and LCAS, transforms the SONET/SDH transport network into a flexible and efficient carrier of data as well as voice circuits, while retaining the superior operations and management functionality built into SONET/SDH standards for performance monitoring and fault isolation. GFP, VCAT and LCAS have been developed in parallel and their main benefits are realized when they are used in combination. They complement each other to provide efficient utilization of transport resources and elastic bandwidth control. Components, vendor equipment and test equipment based on these are becoming mature and interwork to a high degree. Each of the three cornerstone technologies mentioned above has unique contributions to next-generation SONET/SDH:

Generic Framing Procedure—GFP (ITU-T G.7041 and G.806) is a lightweight encapsulation method for any data type providing flexible mapping of different bitstream types into a single byte-synchronous channel. It provides efficient encapsulation with fixed, but small overhead per packet. There are two main types of GFP:

Frame-based GPF (GFP-F) stores and forwards entire client frames in a single GFP frame. This is the preferred method for most packet types.

Transparent GFP (GFP-T) provides low latency by transporting block-coded signals for applications such as storage area networks, or SANs.

Virtual Concatenation, VCAT (ITU-T G.707 and G.783), is an inverse-multiplexing technique to combine arbitrary SONET/SDH channels to create a single byte-synchronous stream. Unlike continuous concatenation that needs concatenation functionality at each network element, VCAT only needs concatenation functionality at the path termination equipment. VCAT can transport payloads that do not fit efficiently in standard STS-Nc or VC SPE sizes typically supported by existing SONET/SDH NEs. VCAT functionality is only required only at Path Terminating Elements, not each NE in the path. VCAT uses smaller bandwidth containers to build a larger bandwidth end-to-end connection. The individual containers may be diversely routed, with compensation made for differential delay between each container.

Link Capacity Adjustment Scheme, LCAS (ITU-T G.7042, G.806 and G.783), is a signaling mechanism to dynamically and hitlessly adjust the size of a container transported in a SONET/SDH Network with VCAT. It is an extension to VCAT allowing dynamic changes to the number of SONET/SDH channels in use and is carried in-band on Path overhead bytes.

LCAS coordinates bandwidth adjustment on end-points, assuming the Trail has already been provisioned. It also includes optional failover recovery features.

At the edge of the SONET/SDH network, a device such as a Multi-Service Provisioning Platform (MSPP) may exist to adapt the Ethernet physical interface for transport in the SONET/SDH network. The Preamble and Start of Frame Delimiter in the MAC frame are removed and the remainder of the MAC frame (including the Source and Destination Addresses, Length/Type fields, MAC data, padding bytes and Frame Check Sequence) is mapped into the GFP payload. GFP overhead bytes are added and GFP frames are assigned to VCAT groups (VCGs), which may take diverse paths across the network. (Note that in the OIF World Interoperability Demonstration, the SONET/SDH network was comprised of multiple domains and multiple carrier labs utilizing equipment from different vendors.) LCAS signaling is intended to add or remove members of the VCG link to adjust to the bandwidth needs of the application and respond to failure or restoration of VCG member links At the network egress MSPP, the payloads from the VCGs are demapped from GFP, reassembled in time sequence, multiplexed and transmitted on an Ethernet physical interface.

Testing for service adaptation features in the OIF World Interoperability Demonstration focused on four areas:
  Throughput of Ethernet Private Line services over SONET/SDH infrastructure
  Accommodation of partial-rate and full-rate Ethernet transport by GFP and VCAT
  Resilience of the adaptation to different network characteristics (differential delays)
  In-service reaction to increased/decreased bandwidth demands and to network failure conditions with LCAS These test cases demonstrated not only interworking between different vendor equipment but also interworking between the essential features of GFP-F, VCAT and LCAS.

As an example of an application of VCAT and LCAS, illustrations of an Ethernet service that can be provided by a VCAT system using LCAS are shown in FIGS. 1A-1D. FIG. 1 illustrates an Ethernet system having service provided by VCAT and LCAS. The link between node A and node Z transports Ethernet frames using a virtual concatenation group of three members, and can be any number of members. The three separate LCAS protocols constantly monitor each peer location, including LCAS-a of node R talks with LCAS-a of node Z, LCAS-b(R) with LCAS-b(Z), . . . LCAS-n(R) with LCAS-n(Z), and so on. The LCAS protocol establishes the state machine and much of the configuration parameters for such a system, but it does not specify particular implementations of components for performing LCAS functions in the particular nodes. For communication, each node would need a send and receive component for transmitting and receiving data from CP1 and CP2 for example, and multiple nodes are possible.

The CP 1 sends an Ethernet signal having packets to the node R, where it is adapted to the data traffic were the Ethernet packets are processed according to a generic framing procedure (GFP). The frames are then segregated according to a VCAT process.

Historically, packet-oriented, statistically multiplex technology such as IP or Ethernet, do not match well the band with granularity provided by a contiguous concatenation. VCAT is an inverse multiplexing technique that allows granular increments of bandwidth and single VC-n units. At the source node, VCAT creates a continuous payload equivalent to X times the VC-n. The set of X containers is known as virtual container group (VCG), and each individual VC is a member of the VCG. Lower-order virtual concatenation (LO-VCAT) used X times VC 11, VC 12, or VC 2 containers (VC 11/12/2—X v X equals 1 . . . 64). Higher-order virtual concatenation (HO-VCAT) uses X times VC 3 or VC 4 containers (VC ¾—X v, X equals 1 . . . 256), providing a payload capacity of X times 48, 384 or 149, 760 kbit/s.

Referring to FIG. 1A a virtual concatenation operation, in particular, an Ethernet service provided by VCAT/LCAS is illustrated. The processor CP1 is connected to an Ethernet connection where flow control is performed according to Ethernet protocol. According to the new protocol, node R receives the Ethernet signal in a generic framing procedure for traffic adaptation followed by payload segregation according to virtual concatenation operations. Traffic control is performed according to an LCAS protocol before the node R exports the data via a cross bar switch, here shown as a legacy STH. The Ethernet frames are appended to VCAT member information as illustrated and are transported to a node Z via the legacy STH. Node Z similarly configured as node R, is configured to receive the data via the LCAS operation protocol and payload aggregation is performed to reconfigure the data for use by controller CP2 receiving Ethernet signals. The flow control is similarly operated or performed via flow control of the Ethernet protocol. For telecommunication, each node has the ability to send and receive the Ethernet signals. With virtual concatenation, the legacy STH has the ability to increase its bandwidth and efficiency with LCAS operations performing the traffic control.

Referring to FIG. 1B, virtual concatenation is illustrated graphically where the contiguous payloads VC ¾V, for example, are broken down into X segments, where each segment has multiple sequences and associated MFI numbers. Each segment has X multiples of VC 3, virtual concatenation groups, where each segment corresponds to a particular MFI number and sequence. As can be seen, the virtually concatenated groups (VCG) are transmitted individually.

Referring to FIG. 1C, a VCAT channel managed by LCAS is illustrated. Between node A and node B, signals are transferred, Tx and received, Rx, via VCGs, virtual concatenated groups in a pipeline manner. Each node has a source and a sync, and each also has corresponding LCAS configurations. The LCAS helps network operators efficiently control NG SDH connections established at VCAT sites. The use of LCAS is not compulsory, but improves VCAT management. As can be seen, the member states between the source and sync correspond with 4/idle, add/fail, norm/ok, DNU/fail, and remove/ok. As also can be seen, the transmission channels A, B, C, and D are shown as channels in a transfer mode, and the corresponding channels H, I, J, and K are illustrated as channels that transmit from the source to the sync. From node B to node A.

Referring to FIG. 1D, a K4 multi-frame (VCAT and LCAS codification), is illustrated. The lower order path overhead is shown in position to 17-20 within the K4 multi-frame. Also, in the multi-frame is the MFI number, the sequence number, control number, control bit, RS-ACK, an MST number and the CRC-3. Also, the K4 super frame is illustrated with corresponding MFI numbers, sequence numbers control and CRC-3 numbers. (SQ-sequence indicator in the VCG [0. . . ]). MFI: multi-frame count indicator [0 . . . 31]. The K4 super frame has a time length of 512ms. K4 is part of the LO-PO overhead and is repeated every 500 milliseconds. 32 bits are sent in a complete multi-frame, which takes 16 milliseconds to repeat (500×32=16 ms). The bit-2 super frame is made up of 32 multi-frames and takes 512 milliseconds to repeat. On the high order side, referring to FIG. 1E, the H4 multi-frame is illustrated in VACT and LCAS codification. H4 is part of the HO-PO (high order overhead). A4 is repeated every 125 milliseconds. 1-6 byte multi-frames takes 16 milliseconds. A complete multi-frame of 4096 bytes takes 512 ms to repeat (125×4096 =512 ms).

Many attempts at achieving a structure that is flexible and powerful have been attempted, however, the division of functions between the hardware and software to date in conventional systems has been inequitable. In particular, when certain processes are required, such as changing membership and size of a group on the fly, the operations in the process tie up the membership activity.

For example, in a sonic based system, the ITU in space G707 updated the V-4 requires virtual concatination. For example, if a 7megabit channel is required, the result desired may be 7-1 megabit channels. As a result, there is need to perform the LCAS addition. There is a need to change the size and membership of the group on the fly according to the standard requirements. In conventional systems, this process is very long, and requires very high demands on the processors. The processes that are demanding, for example, are check configuration, interrupts, commands, failures, resets, and other operations. Given the new standard requirements, systems will be burdened by real-time process requirements.

Virtual Concatenation (VCAT) enables transport pipes to be "right-sized" for various data payloads by allowing SONET/SDH channels to be multiplexed in arbitrary arrangements. VCAT breaks down data packets and maps them into the base units of TDM frames; e.g., STS-1 (51 Mb/s) for SONET, and AU4 (155 Mb/s) for SDH. This data is then grouped in multiple data flows of varying size to create larger, aggregate payloads optimally sized to match available SONET/SDH pipe capacity. VCAT is applied at the endpoints of the connections, which permits each channel used to be independently transmitted through a legacy transport network. Data is typically encapsulated using GFP. VCAT (defined in ITU-T G.707), combines a number of small SDH/SONET virtual-container (VC) payloads to form a larger Virtual Concatenation Group (VCG). VCs come in three different sizes—with VC-12 providing about 2 Mbit/s, VC-3 about 50 Mbit/s and VC-4 about 150 Mbit/s—so that an 8 Mbit/s data flow, for example, would be made up of four VC-12s. Creating these finely tuned SDH/SONET pipes of variable capacity improves the scalability and efficiency of data handling while also controlling quality of service (QoS) and customer service-level agreements. The VCG is treated as a group of independent VCs, which means that each VC can exploit any available time slot across an end-to-end path and the VCG is reformed at the other end. For example, the 8 Mbit/s payload described above can be split across four VC-12s anywhere within the overall SDH/SONET signal.

Equally important for the flexibility of data transport over SDH/SONET is the Link Capacity Adjustment Scheme (LCAS), described in ITU-T G.7042, which enables the payload of the VCG to be adjusted by adding or removing individual VCs. The LCAS recommendation provides the mechanism for signaling the demand change between the two end points, without packet loss, as the payload capacity is adjusted.

Combined with Link Capacity Adjustment Scheme (LCAS, ITU-T G.7042), VCAT is a cost-effective, elastic mechanism that allows data services to be overlaid on an existing optical transport network. These standards allow a carrier to maximise revenue while using already existing and deployed technologies. This Standards-based approach of combining Ethernet and traditional voice and data services over one transport infrastructure has become increasingly popular as service providers are challenged to deliver the same (or increased) services using multiple delivery mechanisms. These requirements are particularly critical for service areas outside those traditionally covered by metro packet networks. See:
http://www.haliplex.com.au/multis1600.html This causes a significant problem with conventional systems and related solutions. In such systems, the division of process function between hardware and software is inequitable. Since such systems were set up merely to transmit, receive and otherwise exchange merely voice data, the efficiencies required for more modern transmission of data were not realized. In network systems, quickly managing membership linkage activity, including resolving disparate membership connections, are a necessity for systems too efficiently work. For example, if a member required a 7-megabit channel, but receives seven 1-megabit channels, then LCAS addition would need to be performed in order to change the size and membership of the group. This is addressed in the ITU-T G7042. According to the new ITU standards requirement, this must be performed on the fly, or seamless. The standard, however, does not address exactly how this is to be done. This is very processor heavy, where configurations need to be checked, commands need to be interpreted, and programming must be robust in order to effectively and efficiently make the link, and to provide the VCAT required of the new standard. A simplified LCAS source and sink state machine is illustrated in FIG. 1F.

Therefore, there exists a need in the art for a system and method of performing LCAS operations in the context of a SONET based system that provides a more efficient balance between hardware and software operations in network communications, and that will be able to perform LCAS operations in a manner that is not burdened by real-time processing requirements. As will be seen, the invention provides such a system and method in an elegant manner

THE FIGURES

FIGS. 1A-F are illustrations of LCAS and related networks of the background.

FIG. 2A is a diagrammatic view of a system configured according to the invention.

FIGS. 3A-G are illustrations of Source and Sink configurations according to the invention.

FIGS. 4A-E are illustrations of a system and method of alignment according to the invention.

DETAILED DESCRIPTION

Figure 1A:
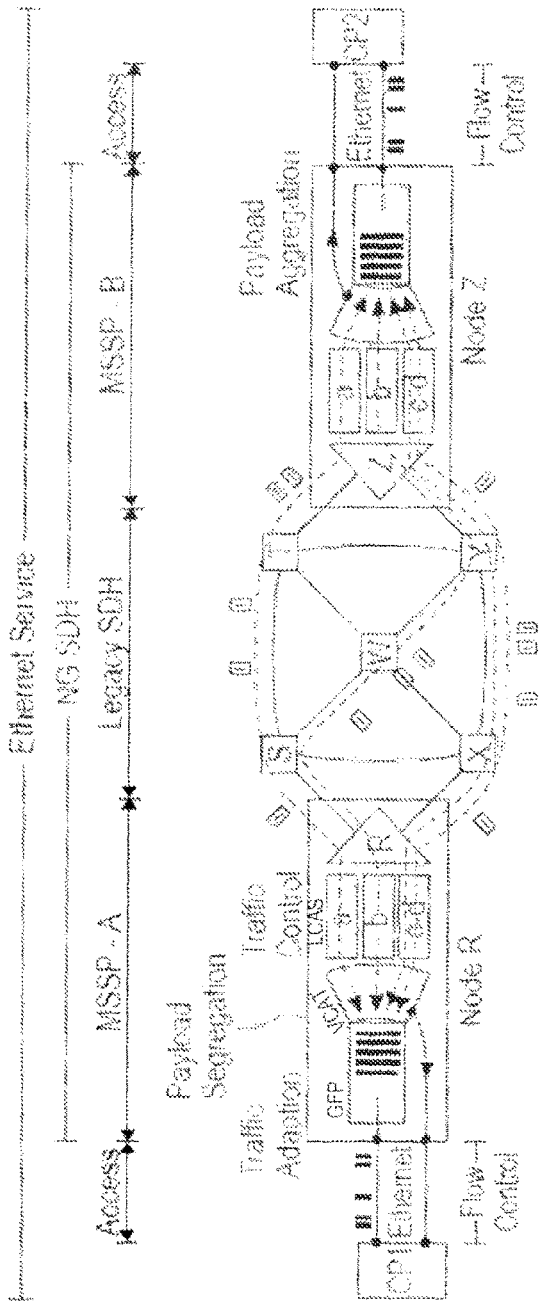
Figure 1B:
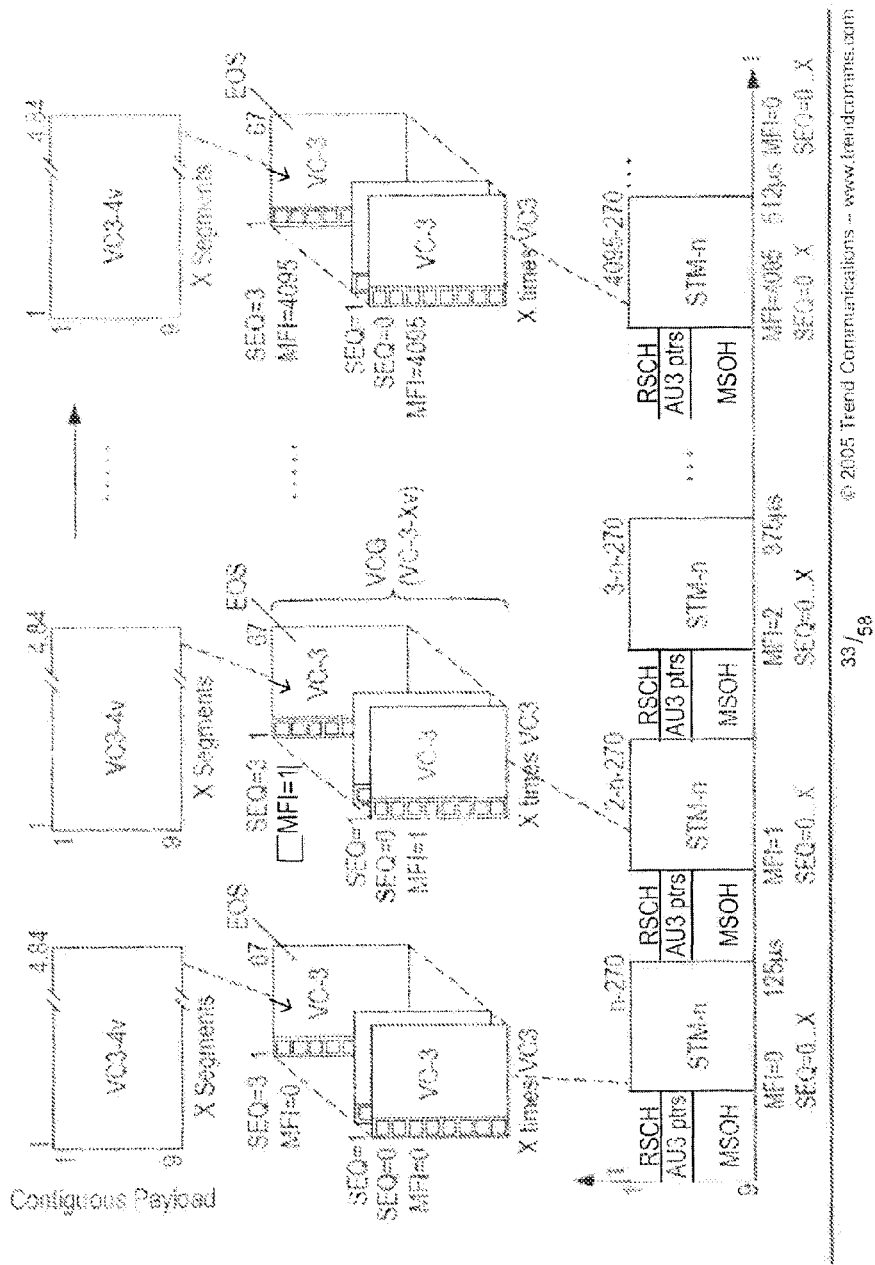
Figure 1C:
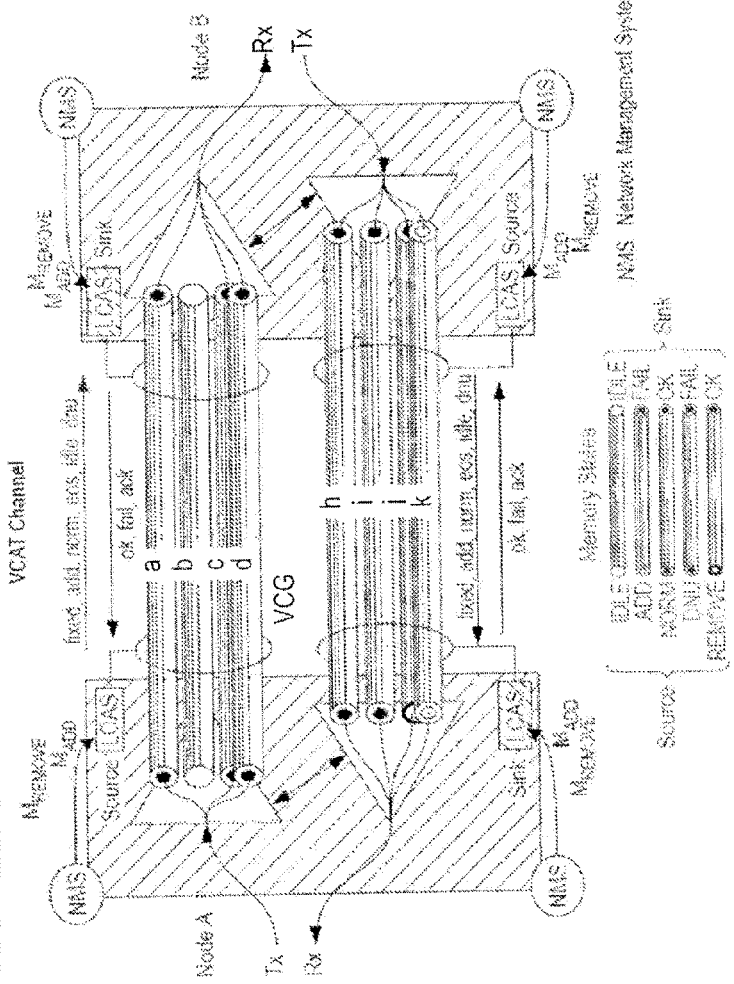
Figure 1D:
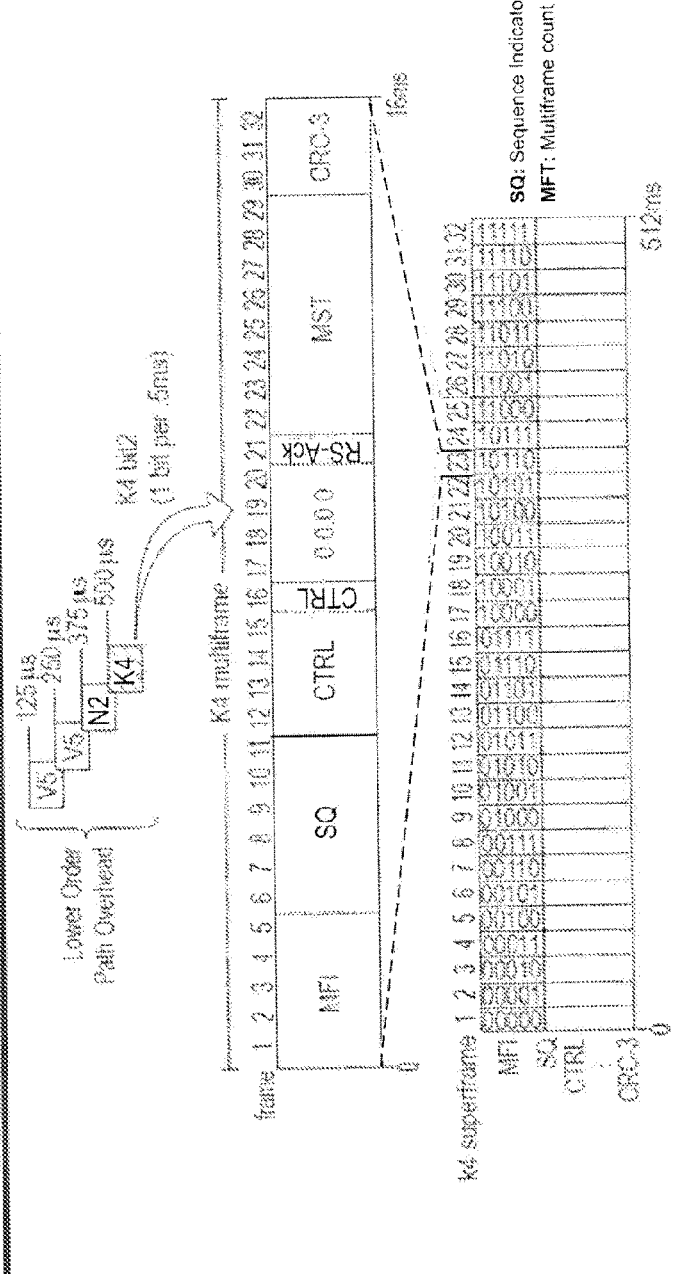
Figure 1E:
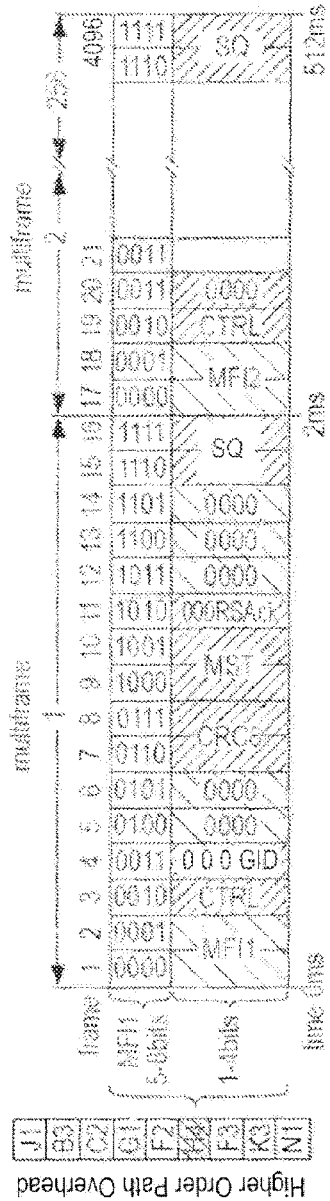
Figure 1F:
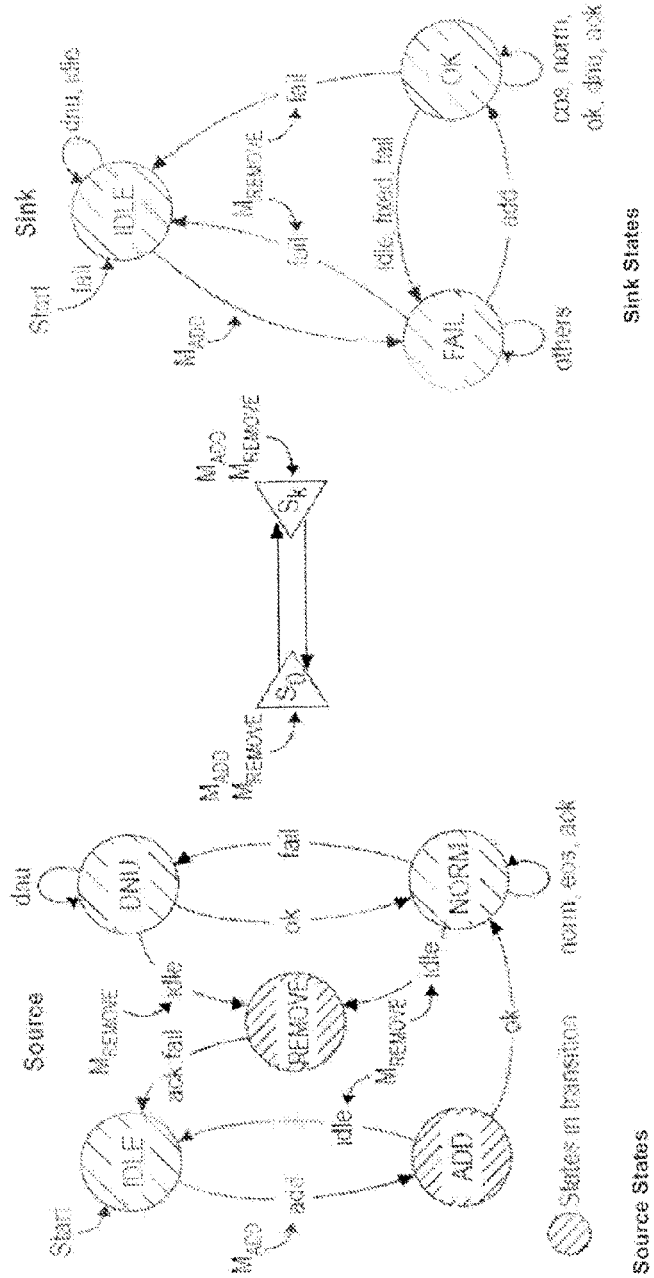

The invention is directed to a novel system and method for performing Local Centre Authorization Service (LCAS) in a network system that overcomes the shortcomings of the prior art. The system is multi-facetted and provides many features to a system for VCAT transmissions, particularly, but not limited to those providing LCAS functionality. Those skilled in the art will understand that the embodiments below can be used in any system or method where the underlying functions and components may be useful.

One embodiment of the novel system provides unique configuration of alignment, sequencing and de-sequencing of data within a virtual concatenation process. Such a system and process could be used in a SONET/SDH transport processor or the like, but is not limited to any particular network protocol. In particular, the system and process could be used in a high and low order framer and processor with virtual concatenation and LCAS functionality. Those skilled in the art will understand that the spirit and scope of the invention reaches to broader applications, and is defined in the appended claims and their equivalents.

Another embodiment of the invention presents a novel balance between hardware and software functions in such a system, where burdensome processes are removed from the process and performed outside the operational path. This allows the system to perform the LCAS in a more efficient manner, and speeds up the process in general. The invention is described in the context of a system and method of performing LCAS operations in the context of a SONET based system, but those skilled in the art will understand that the invention is actually broader in scope, and extends to any system that would benefit from a more efficient balance between hardware and software operations in network communications and other applications.

In one embodiment of the invention, a processor is configured to add and delete members in an efficient manner, where the processor overhead is similar to conventional hardware based state machines. The commonalities are similar configuration checking, command interpretation and device programming.

According to the invention, however, the LCAS processor configured according to the invention operates at significantly reduced processing time and demands no significant real-time processor requirements. In steady state or normal operation, there is no processor loading, and the processor is only required during configuration changes. Thus, the invention provides a solution that overcomes the shortcomings of the prior art by greatly reducing the burden on the processor during steady state operations. For example, in adding or deleting a member, for both source and sink sides of the operation, the system only needs to respond to two interrupts (in an add operation) or one interrupt (in a delete operation). Also, in practice, the processing time per member in such an operation can be less than one millisecond. The total LCAS Protocol Completion time as defined by the ITU standard is minimal, and this can be done independently of a particular implementation (HO: High Order, LO: Low Order), for example:

|    | Best Case          | Worst Case         |
|----|--------------------|--------------------|
| HO | 8 ms + 4XProp Delay | 70 ms + 4XProp Delay |
| LO | 128 ms + 4XProp Delay | 352 ms + 4XProp Delay |

If a failure event occurs, the invention provides a response to in interrupt within 100 microseconds for a failed member. The LCAS failure rates for interrupts can be, for LO, every 32 ms up to 8 failure member status messages received, and, for HO, every 2 ms up to 8 failure member status messages received. Over all, the processor execution time is substantially insignificant with respect to LCAS protocol execution.

Alignment

The invention further provides an alignment system for performing LCAS, where a data aligner configured to align channels of input data. In one embodiment, the aligner includes a write manager configured to receive input data into a first memory. The write manager then writes bytes from multiple channels into a multi-channel transparency module (MCT) having a second memory. The MCT is configured to store input data received from the write manager that in the second memory, keeping data separate for separate channels. The alignment system further includes a read manager configured to read input data stored in the second memory into a third memory in an aligned manner. In one embodiment, the read manager is configured to read channel data from a group of channels that make up a virtually concatenated group (VCG) when all data is received from the VCG. In a system configured to perform LCAS type processes, the different individual virtually concatenated (VC) channels of a group arrive at the receive end of the transmissions at different times. According to the invention, the read manager allows the channel data to fill space in the MCT until all group member data arrives. At that point in time, they are ready to be read out, then sent to a subsequent process, such as de-sequencing. It is also possible to perform de-sequencing as a part of the alignment process. In a preferred embodiment, the alignment is performed separately from the change of sequence of the individual channel data.

Sequencing and De-sequencing

The invention further provides a novel system and method for sequencing channel data from VCGs. The system includes a sequencing module configured to reorder data bytes according to a predetermined transmission slot order of member channels of a VCG and to process dynamic VCG membership changes. The system further includes at least two buffers configured to enable the module to perform a double buffering process to perform VCG membership changes to support LCAS. A read manager is configured to read membership change data from one buffer and a write manager configured to write membership change data to another buffer, wherein the write and read functions of the read and write managers alternate between the two buffers. In one embodiment, the byte capacity of each of the buffers is equal to or greater than the number of members of the VCG.

Systems configured according to the different embodiments invention, which can be utilized individually or in combination, can greatly benefit in many ways. Systems can provide highly integrated voice/data-capable low-cost fixed form factor next-generation, SONET/SDH-enabled Customer Premise (CPE) systems, highly integrated advanced Ethernet service delivery solution for next-generation, SONET/SDH-enabled MSPP line cards, network elements supporting Ethernet-Over-SONET (EOS), Packet-Over-SONET, (POS), and TDM services, service card/Line card for intelligent (re)aggregation of data traffic into SONET/SDH circuits, data and/or Circuit Grooming systems, support of enhanced Ethernet E-line, E-LAN/VPLS, PWE data services, and legacy, TDM services and many other applications The invention allows processors to enable system platforms to deliver these services while reducing the transport costs associated with the service delivery. Additionally, by utilizing low-cost Ethernet interfaces for universal client access, hardware and software solutions configured according to the invention can enable service rates and other SLA properties. These can be easily modified on demand at the initiation of the client autonomously without expensive truck rolls.

With the invention's highly integrated solution, system providers can enjoy additional shipment volumes due to the cost/service/value points enabled by the invention. Service providers can enable advanced service models increasing their monthly revenue opportunity (with CAPEX expenditure that is about the same as the monthly premium that is enabled) while reducing their OPEX through service multiplexing techniques. End users can take advantage of more service options. The invention provides flexible interface options including Gigabit Ethernet, 10/100 Ethernet, protected SONET/SDH (optical or MSPP fabric), a PDH expansion bus, and up to STS-48 bandwidth, with full SONET/SDH and packet processing. It optimizes the transport of Ethernet Services over the existing SONET/SDH infrastructure utilizing GFP, Virtual Concatenation and LCAS. It also provides a carrier class solution for the delivery of Ethernet services over Ethernet carrier networks.

A system configured according to the invention enables the delivery of high-bandwidth Ethernet Virtual Private Line (E-Line), Virtual Private LAN (E-LAN and VPLS), and Pseudowire (PWE) services, allowing a broad range of service profiles. It also enables Virtual Switching, wherein many virtual switches service multiple revenue generating E-LANs, each of whose bandwidth, port, and statistics resources are functionally and managerially isolated.

In one embodiment of the invention, the system includes an LCAS state machine configured to store and manage state date related to the state of system LCAS hardware. A virtual concatenation (VCT) module is configured to perform virtual and standard concatenation processes in the system, particularly in accordance with ITU standards that call for such processes. The VCT module includes a packet engine interface configured to transmit, receive or otherwise exchange packet data with the packet engine via SONET/SDH logical ports. The VCT module further includes a cross connect interface configured to transmit, receive and otherwise exchange SONET/SDH traffic having data mapped therein with the internal SONET/SDH Cross Connect. The system VCT may be configured to exchange (transmit) SONET/SDH traffic having data mapped therein with the internal SONET/SDH Cross Connect via an internal STM-16 interface.

HW System

Figure 2A:
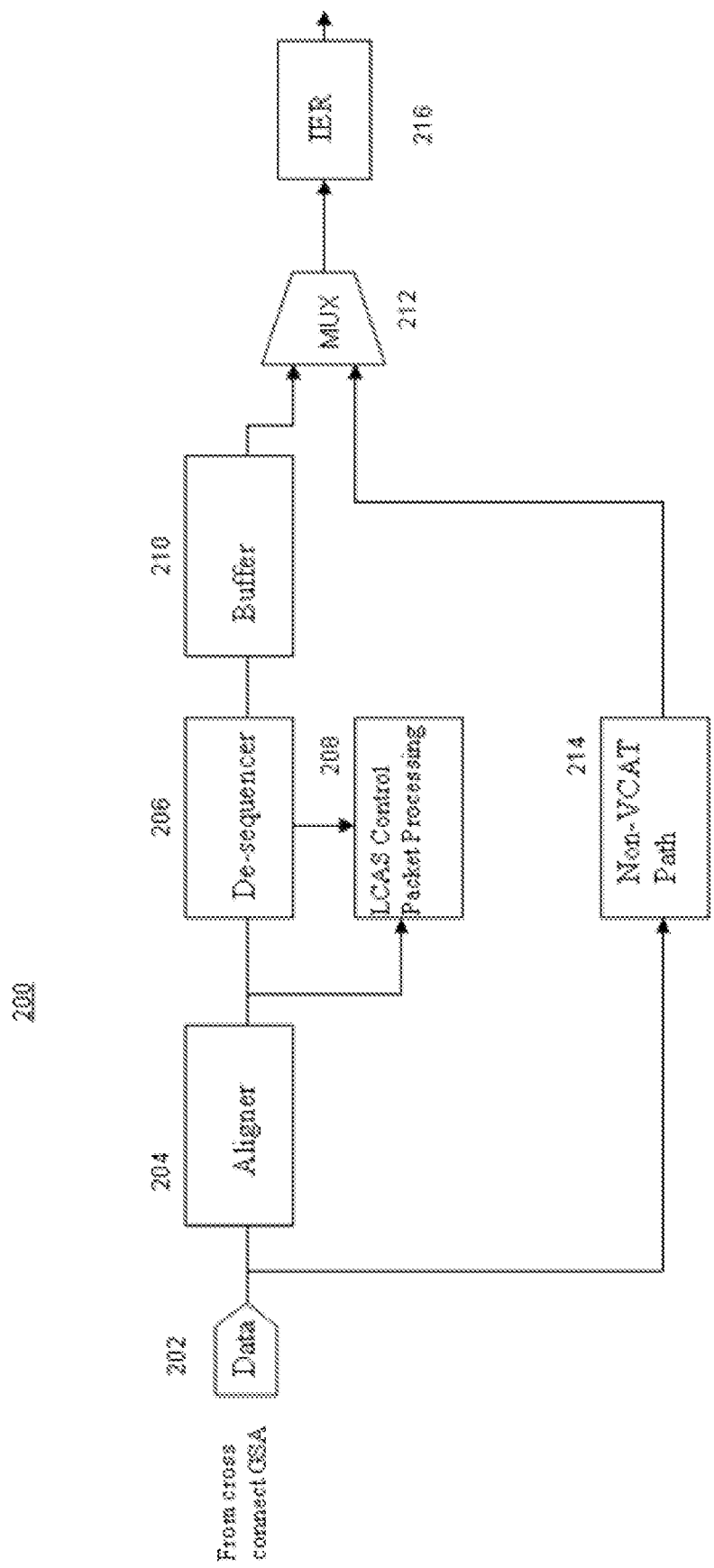

Referring to FIG. 2A, a diagrammatic view of a hardware system for a receive channel configured according to the invention is illustrated.

Referring to FIG. 2A, a configuration of receiving channel of an LCAS configuration is illustrated. In operation, data 202 is received by the aligner 204 in the system 200, which aligns the data 10 members. In a separate process, the de-sequencer 206 reorders the sequence of the members of the VCG according to the MFI information. This is all controlled by the LCAS control packet processing 208, which receives the same data as the de-sequencer 206 and controls the desequencing process. The output is then sent to the buffer 210 and then to the multiplexer 212. Also received into the multiplexer is an output from the packet path overhead (POH) processing for the non-VCAT transmissions from module 214.

According to the invention, the hardware and software in the LCAS configuration is divided in a novel manner that allows optimum efficiency. LCAS is defined in the ITU standard mostly in software. In practice, however, the exclusive use of software in application has been found to be too slow. It has been discovered that a better combination of hardware and software provides a better result. Generally, the data related to control paths are controlled by software. Hardware is used only when needed, such as in data path transmissions.

According to the invention, substantially all functions of the overhead data is generated by software. Hardware makes sure changes occur synchronously. The process has essentially placed all non-timing critical steps in software, where hardware provides a synchronization of control paths and data paths. Thus, hooks and hardware are configured for software to put data in and take data out.

When considering solely the control path, the control of the control path is exclusively the domain of software. For inserting into a control packet, hardware hooks allow software to insert the control packet. In extraction, hardware hooks allow software to read outcast control packets in data streams. In essence, software defines when change must occur, and hardware determines when the change can occur and make the changes. Thus, hardware provides the synchronicity.

Considering the control path and data path, in the receive side of the configuration, software configures hardware such that data path size, number of members, follows the received overhead in LCAS control packet. On a transmission side, still considering the control and data path, software directs hardware to change first the data path size and the transmission overhead in the LCAS control packet. These two functions are done synchronously by hardware, thus the software and hardware divide.

Considering internal resource synchronization, different virtually concatenated groups have different sizes. Therefore, some buffers are sized to different group sizes and software controls the hardware to set the buffer size. Similarly, resource allocation can by performed using this hardware software divide, where software defines the resource allocation, and hardware respond accordingly. In buffer swapping synchronization, software directs hardware to change buffers used by a particular VC group. Hardware performs change at the exact appropriate time.

Those skilled in the art will understand that the software can be external or internal in a memory or external or internal to the CPU. It can be performed on the same line card or different line cards. Also the software can be located on separate or similar dies. Therefore, the invention is not limited to any particular configuration where software is used internally or externally on a CPU or on a particular chip or chip set.

Referring to FIGS. 3A-G, diagrammatic flow diagrams illustrating the hardware and software split utilized in one embodiment of the invention is illustrated. FIGS. 3A through 3g architectural and system flow diagrams are illustrated to help describe the operation of the system according to the invention. According to the invention, the LCAS transaction is broken down into a sequence of automatic operations, with hardware configured to carry out each automatic operation and where software is responsible for issuing the appropriate automatic operations for each transaction.

Figure 3A:
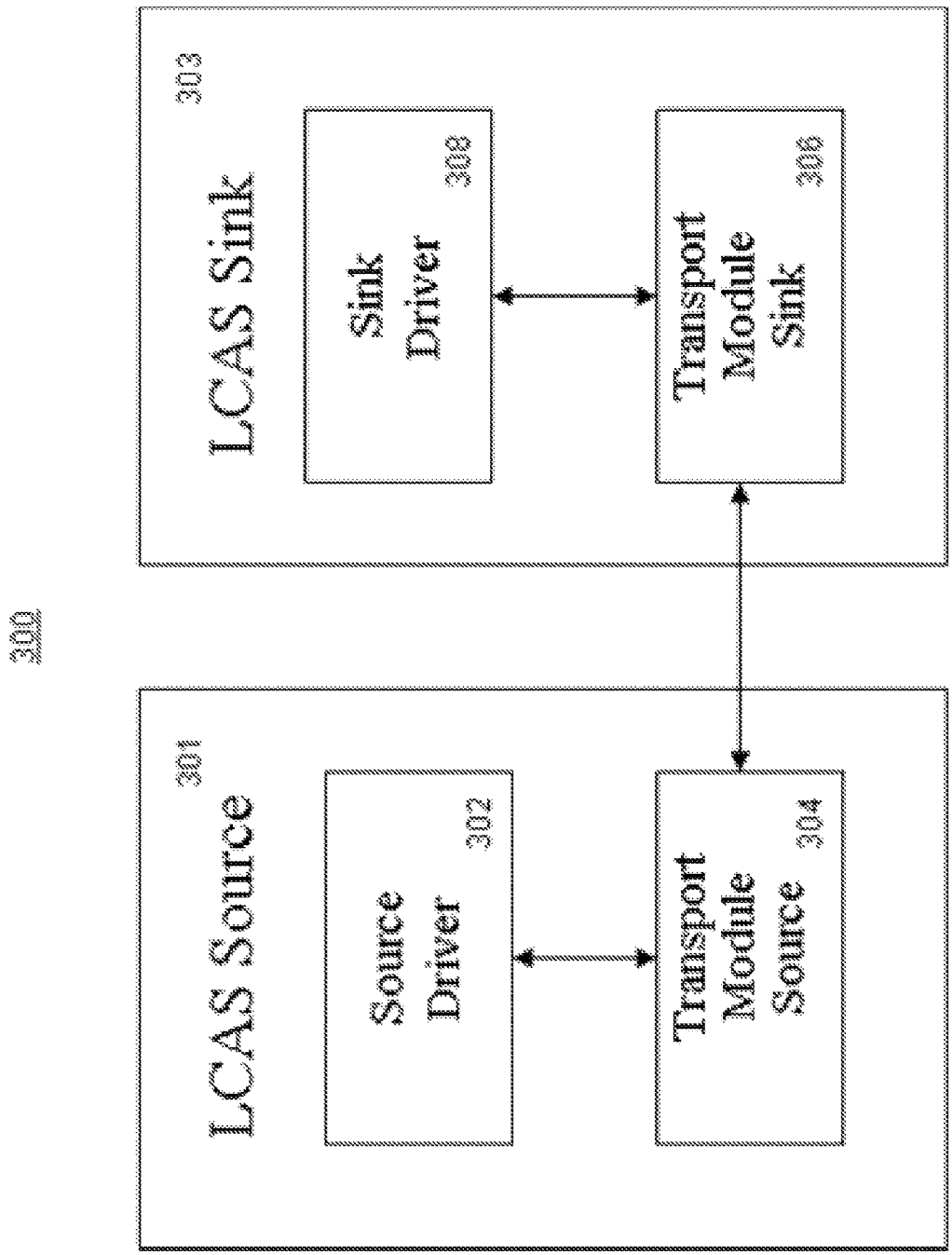

Referring to FIG. 3A, a source/sync LCAS system configured according to the invention is illustrated. The system includes a first driver of the source 302, hardware control 304 of the source, hardware control of the sync 306, and software driver of the sync 308. The operational steps are illustrated in serial sequence steps and will herein be described.

Figure 3B:
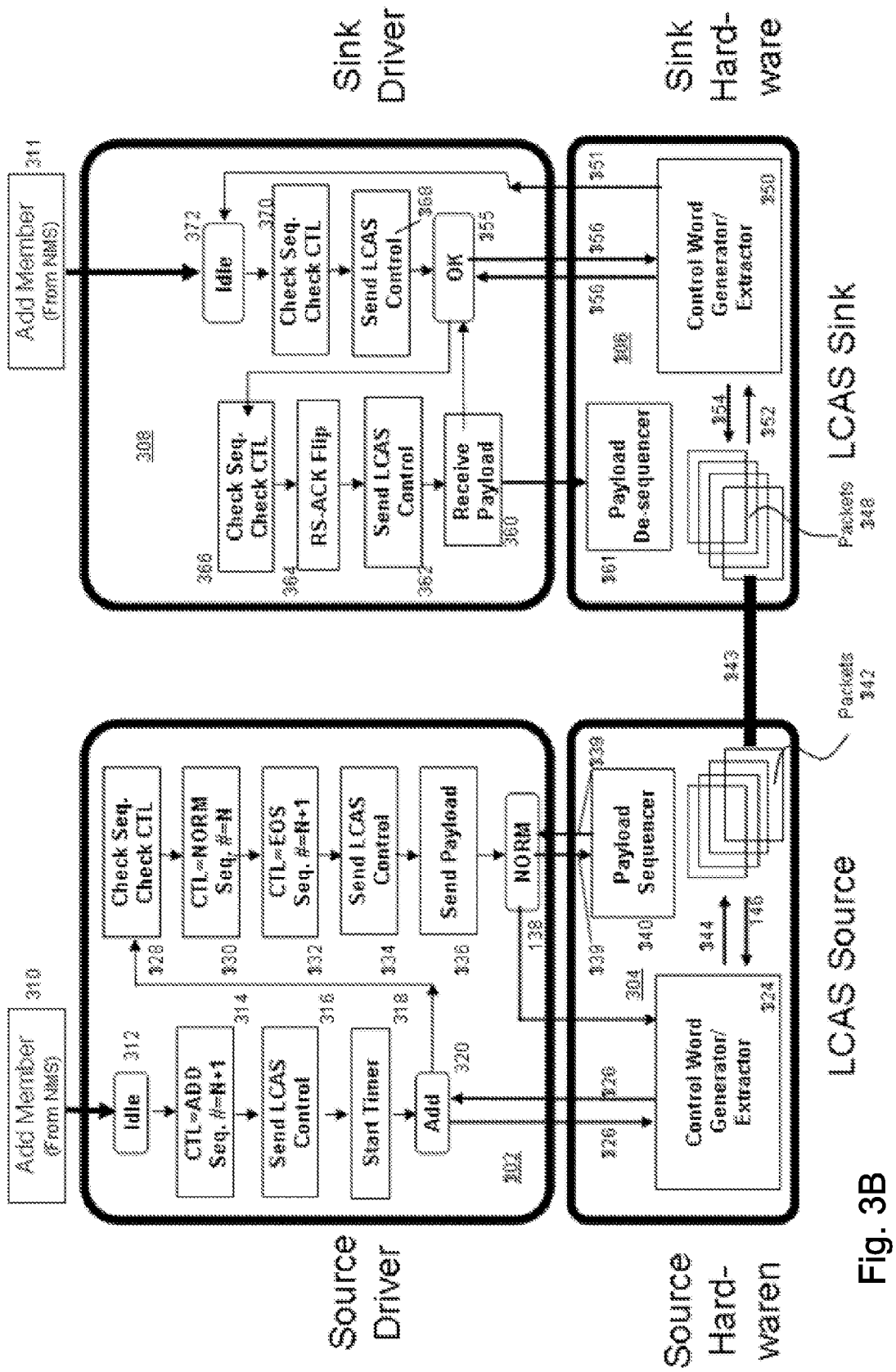

Referring to FIG. 3B, in operation, when new member 310 from NMS is added, the process proceeds to Step 312 where the system is in idle. This is the state of the operations when a new member is added. In Step 314, the control is set add, where a new member is being added, and the sequence number is incremented by 1, where a sequence number equals N plus 1. In Step 316, the LCAS control is sent. In Step 388, the timer is set. In Step 320, the add sequence is initiated, and the controls are sent via line sequence paths 326 and 328, respectively. In Step 328, the check sequence and check control operations are performed. In Step 330 the control is set to norm and the sequence number is set to N. In Step 332, the control is set to end of sequence (EOS) and a sequence number equals N plus 1. In Step 334, the operation to send LCAS control is initiated and in Step 336 the payload is sent. In Step 338, the payload is normalized and sent to hardware components 304. In the hardware system, the control word generator/extractor receives the payload information in preparation for transmitting the payload. In Step 340, the payload sequencer establishes the sequence of the payload, packets 342. The control word generator/extractor, in an odd number sequence from the source, generates and then send a control word to packets 342 via path 344 for transmission. In the reverse direction, path 346, the control word is extracted by the control word generator/extractor 324. The packets are then transmitted via path 343 and are received as packets 348 at the sink 306. These packets are received by the control word generator/extractor 350 of the sink via path 352. If the packets were being sent back to the source hardware via path 343, a control word generator/extractor would be generating a control word and attaching it to the packets via path 354. The control word generator/extractor then sends the control word received from the source hardware to the software driver 308. First, the control word from control word generator/extractor 350 is sent to the diver 308 to OK 355 of path 356 to determine where the membership addition is OK at 355. The check sequence and check control operations are performed in Step 366. The sequence then proceeds to Step 364, where the RS-ACK flip is initiated. Once these operations pass, the procedure proceeds to Step 362 indicating a received payload. If adding a member 359, the idle Step 372 is initiated and the operation works in reverse back to the driver 302. After the idle Step 372, the check sequence and check control operations are initiated in Step 370 and the send LCAS control is subsequently initiated in Step 368 and the operation works in reverse.

Referring to FIG. 3C, a more detailed description of an LCAS ad transaction sequence is illustrated. In operation, the process drivers 302 and 308 operate with overhead that substantially replaces conventional hardware based state machines. According to the invention, the configuration checking can be common for both the source and the sink. Furthermore, a command interpretation and device programming is also common for both. The LCAS state machine represents less than 20% of the total processing time and introduces no additional significant real-time requirements of processing. In steady state operation, there is no process or load during normal operation, and, furthermore, the processor is only required during configuration changes. In adding or deleting a member, both source and sink, there are significantly reduced operations. When adding a member, only two interrupts need to be responded to. When deleting a member, only one interrupt is required. In the final analysis, less than one millisecond total processing time per member is required. This is the minimum total LCAS protocol completion time defined by the LCAS standard. As a result, the process of execution time is a significant respect to LCAS protocol execution. Still referring to FIG. 3C, a flow diagram illustrating the LCAS add transaction sequence example is illustrated. In Step 380, the source initiates the transaction by setting sending a control packet (add) to add on the new member. In Step 382, the sink detects a change in control and sends a member status change (MST) and in Step 384 adds a member by setting control=EOS on the new member and control=NORM on the previous last member, if any exists. In Step 386, the sink detects the change in the control and toggles RS-ACK, or RS sequence acknowledgment.

Figure 3D:
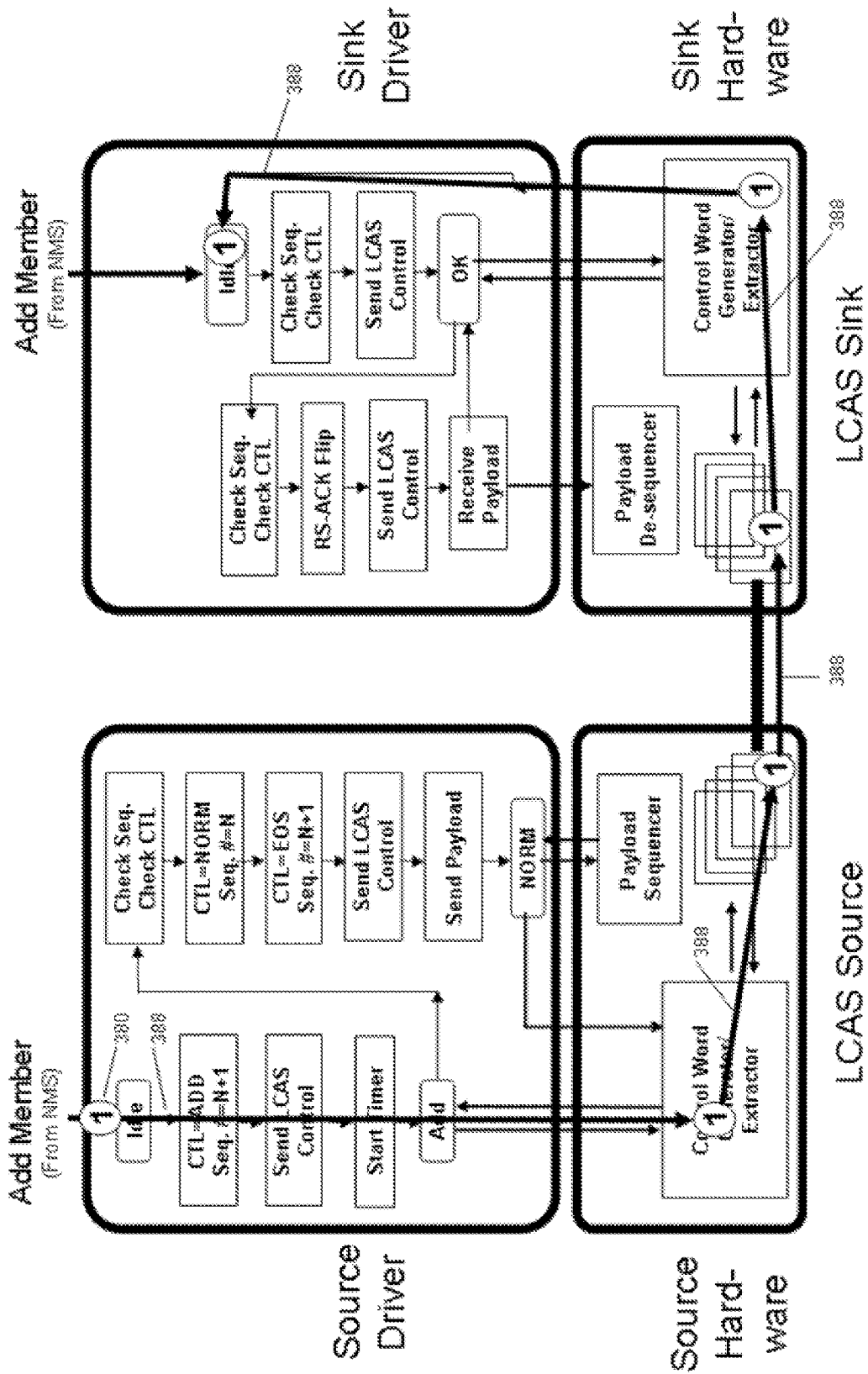

Referring to FIG. 3D, the pathways associated with the adding a new member process is illustrated in more detail, with reference to FIG. 3A. In operation, pathway 1 begins at idle Step 312 and proceeds to the control word generator/extractor 324 via path 388 where a control word is generated for packets 342, which are then transmitted to the sink hardware 306 delivering packets 348 in the sink 306. The control word extractor then extracts the control word, adding a new member, and then proceeds to idle Step 342, still via path 388.

Figure 3E:
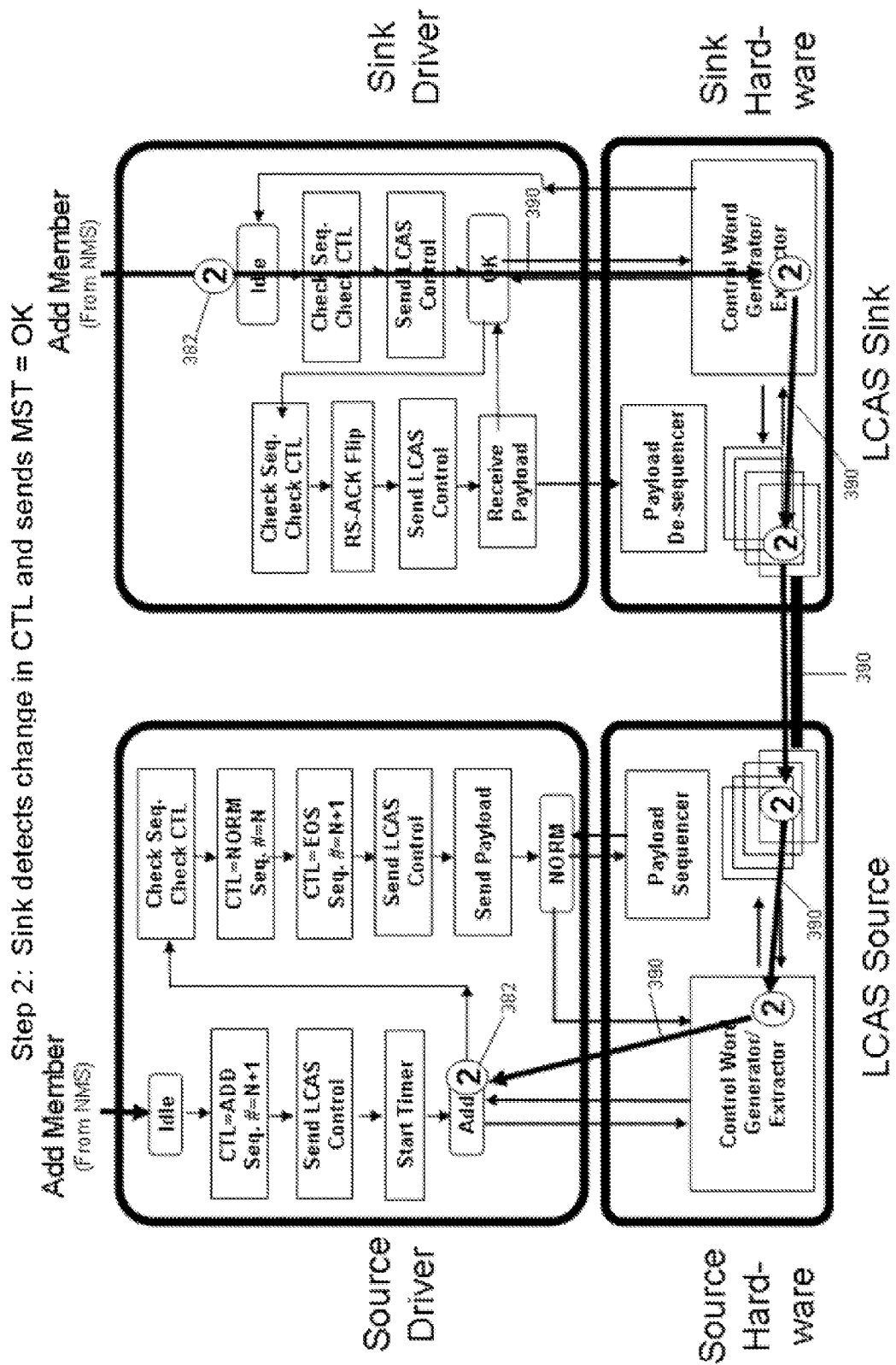
Figure 3F:
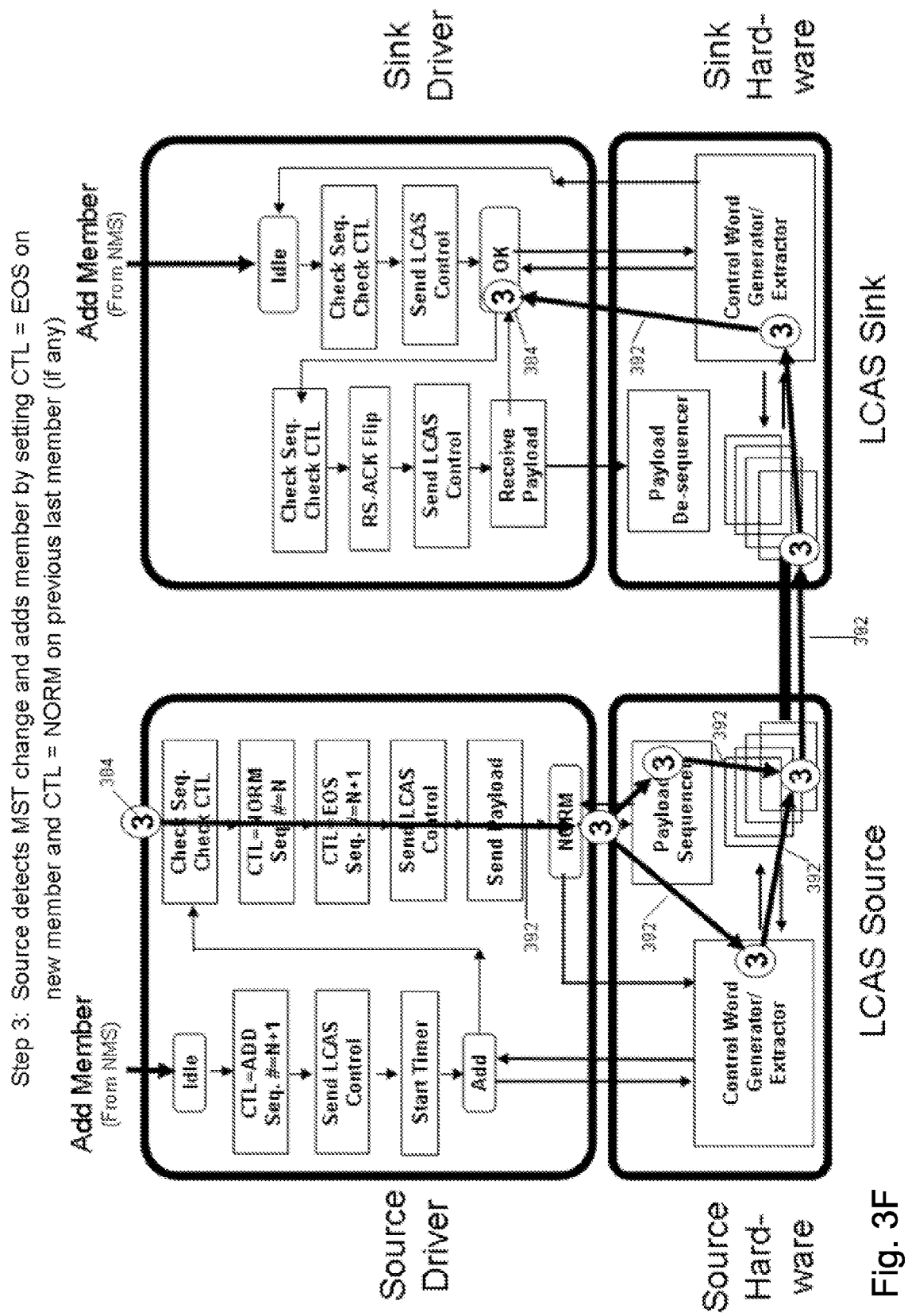

Referring to FIG. 3E, Step 2 illustrates the operation where the sink detects the change in control and sends a command MST equals OK. This is done via path 390. The add number 372 of the driver 308 sends a command via path 390 to control word generator/extractor 350 via path 390, which sends the control word to the data packets generated 348. These packets are transmitted via path 390 to give packets 342. The control word extractor 324 then extracts the command of MST equals OK and then transmits that the ad operation module 320 to complete the ad sequence.

In Step 3F, from the add sequence module 320, the process proceeds to Step 328 and proceeds via path 392 where the source detects the MST change and adds a number by setting control=EOS on the new member and control=NORM on the previous member, if any exists. Still continuing down path 392, the process proceeds simultaneously to the control word generator/extractor 324 and payload sequencer 340 to generate packets 342 to continue via path 392 to the sink hardware 306. The control word generator/extractor then extracts the control word, control=EOS, and the process proceeds to Step 358 where the new member is OK'ed.

Figure 3G:
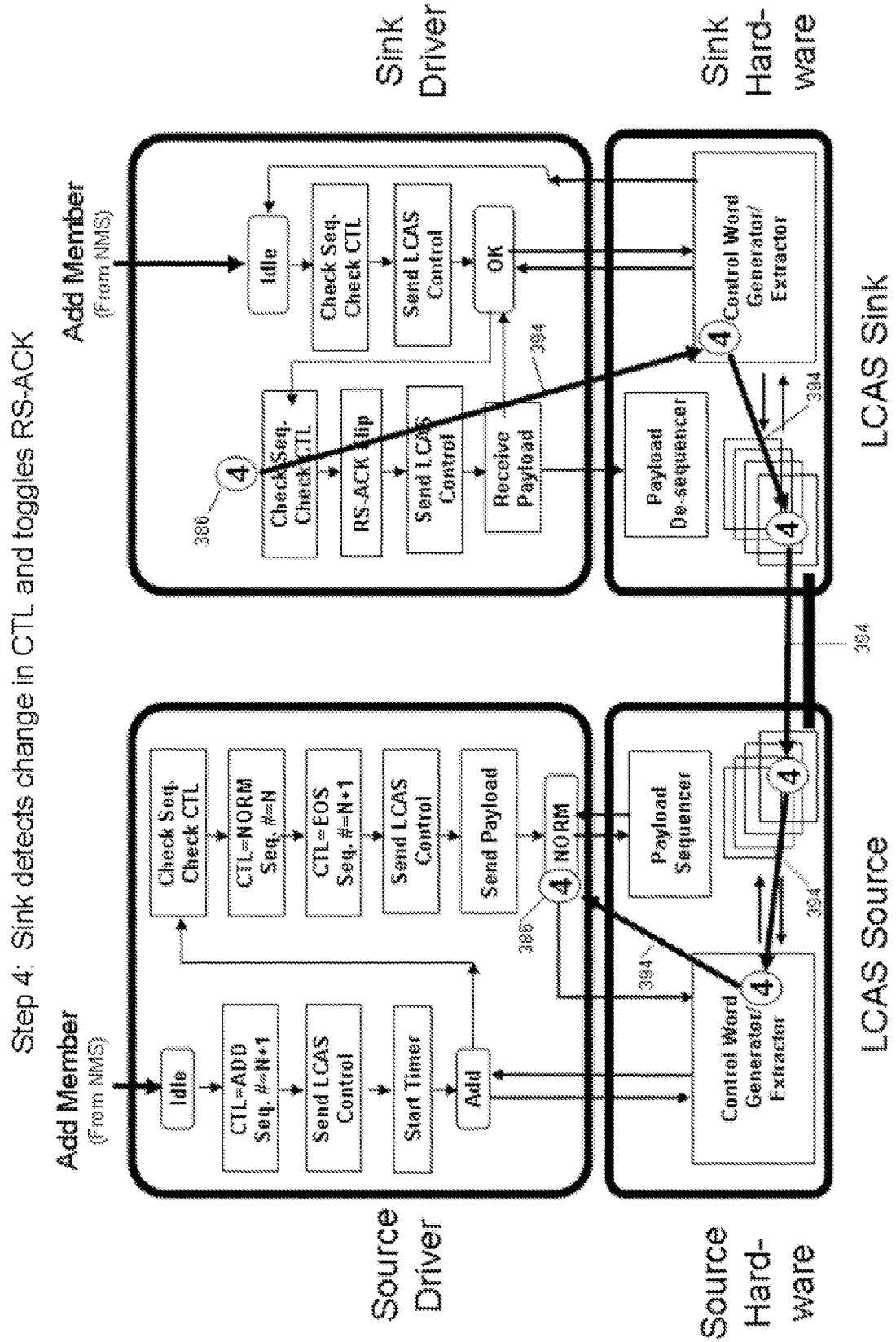

Referring to FIG. 3G, the final Step, where the sink detects a change in control and toggles an RS-ACK, or acknowledgment command, this process proceeds down Step 394, beginning where the check sequence and check control proceeds down path 394 to the control word generator/extractor 350 extracts the control word, the acknowledgment command, and sends it the data packets 348 via path 394. These data packets are received as data packets 342 in the source hardware 304, and the process then proceeds to the control word generator/extractor of the source hardware to extract the acknowledgment command and the process then returns to the NORM process 1.1 Atomic Operations
1.2 Reverse Control Information According to the invention, the atomic operations are primarily performed in software, with hardware responding to software commands, greatly optimizing the system. Regarding the reverse control information, and referring to FIG. 3A, the sink 303 operations, located at the sink or receive side of the LCAS operations, govern these operations. At the sink of an LCAS connection, Orion has the capability of inserting reverse control information, such as member status (MST) and re-sequence acknowledgment (RS-ACK). This information is configured by software. Furthermore, when this information is changed by software, the change occurs at the same time on all members of a virtually concatenated group (VCG). The change is also synchronized to the beginning of a new LCAS control packet.

At the source of an LCAS connection, the source extracts reverse control information, such as MST and RS-ACK, from the incoming LCAS control packet. The source also performs CRC checks to verify the validity of this data. If this information changes, the source processor will interrupt software and allow software to read the new value received.

1.3 Forward Control Information

Regarding the forward control information, at the source of an LCAS connection, the source processor inserts forward control information, such as sequence number (SQ) and control word (CTRL). This information is configured by software. When software changes this information, the new control data must be written in the next LCAS control packet. Furthermore, the datapath changes must be synchronized to the control path changes. The new data path configuration defined by the new SQ and CTRL values must occur exactly at the beginning of the control packet following the control packet where the new SQ and CTRL values are written.

At the sink of an LCAS connection, the sink processor extracts forward control information, such as SQ and CTRL, from the incoming LCAS control packet. The sink processor also performs CRC checks to validate this data. If a new SQ or CTRL value arrives, the sink processor will interrupt software and present the new received value. If the channel has been configured by software to be in "accepted" mode, then the sink processor will use the new SQ or CTRL information from that channel to control the extraction of the actual data. The data path configuration change is synchronized so that it takes place exactly at the beginning of the control packet following the control packet with the new SQ or CTRL value.

Referring to FIGS. 3B-G, an example of operations illustrating the hardware and software split are shown.
HW/SW Division Spec
2 Overview This document describes the hardware and software interactions required for various LCAS scenarios based on the register model provided in LCAS/VCAT register documents. Reflecting the asymmetric nature of LCAS, the operations that software needs to perform are discussed separately for the sink and source side separately.

The following scenarios are covered in this document:
Sink Side
   Create VCG
   Delete VCG
   Provision New Member(s) To VCG
   De-provision Member(s) From VCG
   Increase VCG Bandwidth
   Decrease VCG Bandwidth
   Decrease VCG Bandwidth Due To Fault
   Change Reverse Control Information Extraction Configuration
Source Side
   Create VCG
   Delete VCG
   Provision New Member(s) To VCG
   De-provision Member(s) From VCG
   Increase VCG Bandwidth
   Decrease VCG Bandwidth
   Decrease VCG Bandwidth Due To Fault
   Change Reverse Control Information Insertion Configuration This document does not cover detailed analysis of error scenarios and assumes that there are no errors during configuration related transactions. It is intended to help with understanding of how to use the LCAS configuration and status interface provided by Orion to implement LCAS protocol functionality in software.

3 Sink Side Scenarios 3.1 Create VCG

NMS specifies the following operations to the sink node when it wants to create a new sink VCG:
 The receive LPID to be used for this sink VCG
 The channel type of the VCG
 The identities of the receive channel(s), if any, that should initially be provisioned as members of this sink VCG
 For each initial member channel, if any, whether or not LCAS reverse control information shall be extracted from it and if so the transmit LPID of the local source VCG it would apply to. It is possible that different member channels carry reverse control information for different local source VCGs. It is also possible that reverse control information is not extracted on some or all of the initial member channels.

The following assumptions are made:
 The receive port LPID is not in use (i.e. RX_SK_SW_CFG_EN bit for this receive LPID is set)
 The initial member channels, if any, are of the same type as the sink VCG
 The initial member channels, if any, are not in use (i.e., their RX_CH_SW_CFG_EN bits are set) and they have originated from the remote source node Software performs the following configuration steps to create the sink VCG:
1. Set the RX_SK_VCAT_EN and RX_SK_LCAS_EN bits for the receive LPID assigned to the sink VCG
2. Set the TX_SK_LCAS_INS_MST field of the sink VCG to FAIL for all possible sequence values (i.e. set this field to all ones)
3. Take the sink VCG out of reset by clearing its SK_SW_CFG_EN bit.

If any receive channels are specified to be initially provisioned into the sink VCG, the remaining configuration steps would be the same as those that would be performed when provisioning these receive channels into an existing sink VCG.

3.2 Delete VCG

NMS specifies the following operations to the sink node when it wants to delete a sink VCG:
 The receive LPID assigned to this sink VCG We assume that before a sink VCG is deleted all of its members would have been de-provisioned. In this case, software needs to perform the following operations:
1. Put the receive LPID into reset by setting its SK_SW_CFG_EN bit.

3.3 Provision New Member Channel(s) Into VCG

NMS specifies the following configuration parameters to the sink node when it wants to provision new member channels into an existing sink VCG:
 The receive LPID assigned to this sink VCG
 The identities of the receive channel(s) that should be provisioned as new members of this sink VCG
 For each new member channel, whether or not LCAS reverse control information shall be extracted from it and if so the transmit LPID of the local source VCG it would apply to. It is possible that different member channels carry reverse control information for different local source VCGs. It is also possible that reverse control information is not extracted on some or all of the new member channels.

The following assumptions are made:
 The sink VCG is already active; i.e. the RX_SK_VCAT_EN and RX_SK_LCAS_EN bits for the receive LPID are already set and the RX_SK_SW_CFG_EN bit of the receive LPID is not set.
 The new member channels are of the same type as the sink VCG
 The new member channels are not in use (i.e., their RX_CH_SW_CFG_EN bits are set) and they have originated from the remote source node Software performs the following operations to provision the new member channels:
1. Check that differential delay can be compensated with these channel(s) as members. Details of this is discussed in the VCAT scenarios document.
2. Configure each new member channel as follows:
   Set its RX_CH_LPID field to the receive LPID assigned to the sink VCG
   Clear its RX_CH_VCAT_ACCEPT bit
   If the channel will be used to extract LCAS reverse control information, then set its RX_CH_LCAS_REV_EXT_SO_LPID field to the value provided and set its RX_CH_LCAS_REV_EXT_EN bit
3. Take the new member channels out of reset by clearing their RX_CH_SW_CFG_EN bits. The order for this is not important since none of them will have their payload added before a handshake.
4. Wait until differential delay compensation is done on the sink VCG with the new member channels included. This can be determined via observation of the RX_CH_VCAT_RD_STATE bits of all (not just the new one) the member channels. When all the member channels have this bit set, differential delay compensation is done. Software can poll these bits or use their associated interrupts for this purpose.
5. Following differential delay compensation, wait for one multi-frame (duration depends on if the sink VCG is low or high order) or longer to ensure that all the channels processed at least one LCAS control packet.
6. Read the RX_CH_LCAS_CTRL, RX_CH_VCAT_SQ and RX_CH_LCAS_CRC_ERR fields of all the new member channels
   Since the NMS performs provisioning of the new member channels on the source side before the sink side, once differential delay compensation is achieved on the sink side, the sink side should bee seeing IDLE control word on all the new member channels. The sequence number of these channels should be set to a value higher than the current maximum sequence used by the sink VCG.
   However, the correct configuration or behavior of the NMS or the source side is not guaranteed, so the software should check that IDLE is being received as the control word and the sequence numbers received are higher than the current maximum of the sink VCG. If any errors are detected, the whole provisioning transaction shall be canceled by putting all the member channels into reset and NMS shall be informed of the failure.
   The RX_CH_LCAS_CRC_ERR fields should be read to make sure that the control word and the sequence number fields read are valid. We assume that there were no CRC errors and the control words and the sequence numbers are as expected.

7. Clear the RX_CH_VCAT_SQ_CHG bits of all new member channels by writing one to them This step is necessary because the reset value of RX_CH_LCAS_CTRL_SQ field is zero. When Orion processed the first control packet on a new member channel, the sequence number in that control packet would have been different than zero, causing the RX_CH_VCAT_SQ_CHG bit to be set.

At this point the provisioning transaction has completed successfully from the sink VCG point of view and the NMS can be informed of success.

3.4 De-provision Member Channel(s) From VCG

NMS specifies the following configuration parameters to the sink node when it wants to de-provision member channels from an existing sink VCG:

The receive LPID assigned to this sink VCG

The identities of the receive channel(s) that should be de-provisioned

The following assumptions are made:

The member channels are already provisioned members of the sink VCG but they are currently not used (i.e. receiving IDLE as the control word with their RX_CH_VCAT_ACCEPT bits not set)

Software performs the following operations to de-provision the new member channels:

1. Put the new member channels into reset by setting their RX_CH_SW_CFG_EN bits.

At this point the de-provisioning transaction has completed successfully from the sink VCG point of view and the NMS can be informed of success.

3.5 Increase Bandwidth of VCG

It is assumed that the remote source can add multiple member channels simultaneously. Therefore, the sink side will wait till it sees ADD control word on all member channels that are to be added before sending MST=OK status for any of them. This way the sink side will toggle RS_ACK only once after it sees NORM/EOS on all the member channels being added.

If the remote source is capable of adding only one member channel at a time, then addition of multiple members with such a source should be broken into many distinct transactions from the sink node perspective. Since this is just a special case of multiple member channel addition, this would not make any difference to an Orion based sink.

NMS specifies the following configuration parameters to the sink node when it wants to add new members to a sink VCG:

The receive LPID assigned to the local sink VCG

The identities of the member channel(s) to be added

The following assumptions are made:

The member channels are already provisioned members of the sink VCG but they are currently not used for carrying payload (i.e. receiving IDLE as the control word with their RX_CH_VCAT_ACCEPT bits not set)

Software performs the following operations to add the member channels:

1. Wait until each member channel to be added is receiving ADD control word or a protocol error or a timeout occurs.

Since we assumed that the remote source node adds all of the member channels simultaneously, software would wait to receive ADD on all member channels before sending MST=OK to any one of them.

Software can determine when all channels are receiving ADD control word via observation of the RX_CH_LCAS_CTRL fields of the member channels to be added. Software can poll these fields or use their associated interrupts for this purpose.

If a timeout occurs before ADD control word is seen on all member channels to be added, software shall cancel the transaction and report the failure to the NMS.

When software determines that the received control word has changed (either via polling or using RX_CH_LCAS_CTRL_CHG interrupt) on a member channel to be added, it should check that the new value is ADD. Also, software should read its received sequence number so that sanity of the sequence numbers assigned by the source node to these member channels can be verified. They should form a contiguous sequence starting from one higher than the largest sequence number used on the local sink VCG currently. Any protocol errors shall cause the cancellation of the transaction and reporting of failure to the NMS.

2. For each member channel to be added, set its RX_CH_VCAT_ACCEPT bit

3. Set the shadow MST bits for the sequence numbers corresponding to the member channels to be added in the TX_SK_LCAS_INS_MST field of the sink VCG to OK.

It is assumed that the shadow MST bits for other members remain the same as the active ones.

4. Toggle the TX_SK_LCAS_REV_SEL bit of the sink VCG.

5. Wait until the TX SK LCAS REV CHG DONE bit is set.

Software can either use the TX_SK_LCAS_REV_CHG_DONE interrupt or poll the TX_SK_LCAS_REV_CHG_DONE bit for this.

6. Wait until each member channel to be added is receiving NORM/EOS control word or a protocol error or a timeout occurs.

Since we assumed that the remote source node adds all of the new member channels simultaneously, we expect that the source would start sending NORM/EOS on the new member receive channels simultaneously. Software will wait until it sees NORM/EOS control on all of the new member channels before toggling the RS-ACK.

When software determines that the received control word has changed (either via polling or using RX_CH_LCAS_CTRL_CHG interrupt) on a member channel to be added, it should check that the new value is either NORM or EOS depending on whether the channel has the highest sequence number or not.

If the sink does not see NORM/EOS from all member channels within a time-out period, the transaction would need to be cancelled. In order to do so, software shall clear the RX_CH_VCAT_ACCEPT bits of all of the members to be added.

It is assumed that except for the one with the highest sequence number, the new receive member channels will now be receiving NORM. The one with the highest sequence number will now be receiving EOS. Their sequence numbers will remain as before. This should be checked as well.

Software should also check that RX_CH_LCAS_CTRL field of the member receive channel which had the highest sequence number previously is now set to NORM.

Except for the previously last member, it is also assumed that the sequence numbers and the control words for the existing member receive channels (if any) did not change.

If any protocol errors are detected during the transaction, then the VCG may need to be reset and the NMS informed of the failure.
7. Toggle the shadow copy of the TX_SK_LCAS_INS_RS_ACK bit for the local sink VCG.
8. Toggle the TX_SK_LCAS_REV_SEL bit of the sink VCG.
9. Wait until the TX_SK_LCAS_REV_SEL_CHG_DONE bit is set.

At this point the transaction has completed successfully from the local sink VCG point of view and the NMS can be informed.

3.6 Decrease Bandwidth of VCG

We assume that the sink side responds to remove requests from source side (i.e. received control word changing from NORM/EOS to IDLE) autonomously without getting a request from the NMS. The source side sends the remove requests when it gets a decrease bandwidth request from the NMS. When the source side gets proper acknowledgment from the sink (i.e. receiving MST=FAIL on removed members and seeing RS_ACK toggle), it informs the NMS, which then can ask the sink side to de-provision the members if desired.

Though not explicitly described in this document, an alternative is that the NMS may ask the sink side to remove a member channel even if the channel is in NORM/EOS state (i.e. the source side has not initiated a remove request). In this case the sink side may act as if it received an IDLE on that channel from the source side but it would not send an RS_ACK signal to the source side. Then the channel can be de-provisioned if desired as well.

It is assumed that the remote source can attempt to remove multiple channels simultaneously, i.e. the control word of multiple channels may change to IDLE in the same multi-frame Sink side software shall be able to deal with it.

When software receives RX_CH_LCAS_CTRL_CHG interrupt on a member channel of a sink VCG, it shall perform the following operations:
1. Wait for about 2K core clocks and read the RX_CH_LCAS_CTRL and RX_CH_VCAT_SQ numbers of all the members of the VCG.
   This allows software to determine if more than one member channel may be receiving IDLE control word. It also allows for checking against protocol errors.
   Depending on the sequence number of channel being removed, the sequence number and/or control words of remaining member receive channels may have changed. For example, if the channel member being removed had the highest sequence number, then the control word of the member receive channel with the next highest sequence number should have changed to EOS.
2. For each member channel receiving the IDLE control word, set the bit in the TX_SK_LCAS_INS_MST field of the sink VCG that corresponds to the previous (i.e. before it started receiving IDLE) sequence number of the member to FAIL.
3. Toggle the TX_SK_LCAS_REV_SEL bit of the sink VCG.
4. Wait until the TX SK LCAS REV SEL CHG DONE bit is set.
5. Toggle the shadow copy of the TX_SK_LCAS_INS_RS_ACK bit for the local sink VCG.
6. Toggle the TX_SK_LCAS_REV_SEL bit of the sink VCG.
7. Wait until the TX_SK_LCAS_REV_SEL_CHG_DONE bit is set.
8. Clear the RX_CH_VCAT_ACCEPT bits of the member channels removed At this point the transaction has completed successfully from the sink VCG point of view and the NMS can be notified.

3.7 Decrease Bandwidth of VCG Due To Fault

Sink side software needs to respond to failures detected on member channels that are in use (i.e. in NORM/EOS state). There are two cases to consider in dealing with a fault (e.g. LOS, LOF, LOP, OOM) that affects a member channel depending on whether the channel is known to be protected or not.

If the channel is not protected, software performs the following operations:
1. Clear the RX_CH_VCAT_ACCEPT bit of the failed channel
2. Set the shadow MST bit corresponding to the failed member channel in the SK_LCAS_INS_MST field of the sink VCG to FAIL.
3. Toggle the TX_SK_LCAS_REV_SEL bit of the sink VCG.
4. Wait until the TX_SK_LCAS_REV_SEL_CHG_DONE bit is set.

If the channel is protected, software shall wait for a defined period for the channel to be restored. If this does not happen, software shall perform the steps above for an unprotected channel.

Upon restoration of the channel either by switching to a protection channel or by the failed channel recovering, software shall perform the following operations:
1. Check that the differential delay can be compensated with this channel as a member
2. After differential delay compensation, software will detect that the control word on the channel is DNU.
3. Set the RX_CH_VCAT_ACCEPT bit for the member channel
4. Set the shadow MST bit corresponding to the member channel in the TX_SK_LCAS_INS_MST field of the sink VCG to OK.
5. Toggle the SK_LCAS_REV_SEL bit of the sink VCG.
6. Wait until the TX_SK_LCAS_REV_SEL_CHG_DONE bit is set.

3.8 Change Reverse Control Extraction Configuration

NMS specifies the following configuration parameters to the sink node when it wants to change the reverse control extraction configuration of member channels of a sink VCG
   The identities of the channel(s) whose reverse control extraction configuration needs to be changed
   For each such channel, whether or not LCAS reverse control information shall be extracted from it and if so the transmit LPID of the local source VCG it would apply to.
The following assumptions are made:
   The channels are already provisioned members of LCAS enabled sink VCGs
Software performs the following operations to change the reverse control extraction configuration of specified member channels:
1. Configure each new member channel as follows:
   If the channel will be used to extract LCAS reverse control information, then set its RX_CH_LCAS_REV_EXT_SO_LPID field to the value provided and set its RX_CH_LCAS_REV_EXT_EN bit. Otherwise, clear its RX_CH_LCAS_REV_EXT_EN bit.

4 Source Side Scenarios

It is assumed that the source node software and not the NMS manages assignment of transmit sequence numbers to member transmit channels of a transmit VCG.

4.1 Create VCG

NMS specifies the following operations to the source node when it wants to create a new source VCG:

The transmit LPID to be used for this source VCG

The channel type of the VCG

The identities of the transmit channel(s), if any, that should initially be provisioned as members of this source VCG For each initial member channel, if any, whether or not LCAS reverse control information shall be inserted to it and if so the receive LPID of the local sink VCG it would apply to. It is possible that different member channels carry reverse control information for different local sink VCGs. It is also possible that reverse control information is not inserted on some or all of the initial member channels.

The following assumptions are made:

The transmit port LPID is not in use (i.e. no transmit channel that is not in reset has its TX_CH_LPID field set to this LPID)

The initial member channels, if any, are of the same type as the source VCG

The initial member channels, if any, are not in use (i.e., their TX_CH_SW_CFG_EN bits are set) and they are routed to the remote sink node Software performs the following configuration steps to create the source VCG:

1. Set the TX_SO_VCAT_EN and TX_SO_LCAS_EN bits for the transmit LPID assigned to the source VCG If any transmit channels are specified to be initially provisioned into the source VCG, the remaining configuration steps would be the same as those that would be performed when provisioning these receive channels into an existing source VCG.

4.2 Delete VCG

We assume that before a source VCG is deleted all of its members would have been de-provisioned. The source VCG is actually deleted from a hardware perspective at that point.

4.3 Provision New Member Channel(s) Into VCG

NMS specifies the following configuration parameters to the source node when it wants to provision new member channels into an existing source VCG:

The transmit LPID assigned to this source VCG

The identities of the transmit channel(s) that should be provisioned as new members of this source VCG For each new member channel, whether or not LCAS reverse control information shall be inserted into it and if so the receive LPID of the local sink VCG it would apply to. It is possible that different member channels carry reverse control information for different local sink VCGs. It is also possible that reverse control information is not inserted on some or all of the new member channels.

The following assumptions are made:

The TX_SO_VCAT_EN and TX_SO_LCAS_EN bits of the transmit LPID are already set

The new member channels are of the same type as the source VCG

The new member channels are not in use (i.e., their TX_CH_SW_CFG_EN bits are set) and they are routed to the remote sink node Software performs the following operations to provision the new member channels:

1. Configure each new member channel as follows:

Set its TX_CH_LPID field to the transmit LPID assigned to the source VCG

If the channel will be used to insert LCAS reverse control information, then set its TX_CH_LCAS_REV_INS_SK_LPID field to the value provided and set its TX_CH_LCAS_REV_INS_EN bit 2. Take the new member channels out of reset by clearing their TX_CH_SW_CFG_EN bits. The order for this is not important since none of them will have their payload added before a handshake.

Note that it is not necessary to set the shadow copy of the TX_CH_LCAS_CTRL fields of the new member channels to IDLE and toggle the TX_SO_LCAS_FWD_SEL bit of the source VCG since the reset value of the TX_CH_LCAS_CTRL is IDLE.

4.4 De-provision Member Channel(s) From VCG

NMS specifies the following configuration parameters to the source node when it wants to de-provision member channels from an existing source VCG:

The transmit LPID assigned to this source VCG

The identities of the transmit channel(s) that should be de-provisioned

The following assumptions are made:

The member channels are already provisioned members of the source VCG but they are currently not used to transmit payload or reverse control information (i.e. the active copies of their TX_CH_LCAS_CTRL fields are set to IDLE and their TX_CH_LCAS_REV_INS_EN bits are not set)

Software performs the following operations to de-provision the new member channels:

1. Put the new member channels into reset by setting their TX_CH_SW_CFG_EN bits.

At this point the de-provisioning transaction has completed successfully from the source VCG point of view and the NMS can be informed of success.

4.5 Increase Bandwidth of VCG

It is assumed that the remote sink can add multiple members simultaneously. By this we mean that the remote sink will toggle RS_ACK once after it has acknowledged the add command on all member channels being added. When adding multiple members, the source software will set the control word of all member channels being added to ADD in the same multi-frame.

If the remote sink is capable of adding only one member channel at a time, source side software can break a transaction that needs to add multiple members into multiple single-member add sub-transactions.

In general, it may not be possible to know if the remote sink is capable of adding multiple members at a time or not. It is possible that the source may send ADD control word on multiple members simultaneously thinking that the sink will acknowledge them together but the remote sink may not do so. So the source side software should be able to deal with receiving multiple RS_ACK toggles. For the sake of simplicity, we do not discuss such cases in this document.

NMS specifies the following configuration parameters to the source node when it wants to add new members to a source VCG:

The receive LPID assigned to the local sink VCG

The identities of the member channel(s) to be added

The following assumptions are made:
The member channels are already provisioned members of the source VCG but they are currently not used for carrying payload (i.e. sending IDLE as the control word)
Software performs the following operations to add the member channels:
1. Set the TX_CH_LCAS_CTRL fields of all the member channels to be added to ADD
2. Assign sequence numbers to the members to be added starting from one higher than the current highest sequence number used in the source VCG (or zero if this is the first time members are being added)
3. Set the TX_CH_VCAT_PL_SQ and TX_CH_LCAS_OH_SQ of each member channel to be added to the sequence number assigned to it
4. Toggle the TX_SO_VCAT_FWD_SEL bit of the source VCG
5. Wait until the TX_SO_VCAT_FWD_CHG_DONE bit of the source VCG is set
   Software can either use the TX_SO_VCAT_FWD_CHG_DONE interrupt or poll the TX_SO_VCAT_FWD_CHG_DONE bit for this.
6. Wait until each member being added is receiving MST=OK status or a timeout occurs
   Since we assumed that the remote sink will send MST=OK for all new members being added before toggling the RS_ACK, software waits till it sees MST=OK on all the member channels.
   Software can determine when all channels are receiving MST=OK status via observation of the RX_SO_LCAS_EXT_MST field of the source VCG. Software can poll this field or use the associated RX_SO_LCAS_EXT_MST_CHG interrupt. The bit to look for in that field for a given member channel to be added is based on the sequence number assigned to that channel.
   If a timeout occurs before MST=OK status is seen on all member channels to be added, software shall cancel the transaction and report the failure to the NMS. To cancel the transaction software would set the control words of all members to be added to IDLE and toggle the TX_SO_VCAT_FWD_SEL bit.
7. Set the TX_CH_LCAS_CTRL fields of the member channels to be added to NORM/EOS (EOS for the member with the highest sequence number)
8. If there were active members already, set the TX_CH_LCAS_CTRL field of the existing member previously with the highest sequence to NORM
9. Toggle the TX_SO_VCAT_FWD_SEL bit of the source VCG
10. Wait until the TX_SO_VCAT_FWD_CHG_DONE bit of the source VCG is set
11. Wait until the received RS_ACK value for the local VCG toggles or RS_ACK timer expires.

At this point the increase bandwidth transaction has completed successfully from the source VCG point of view and the NMS can be informed of success.

4.6 Decrease Bandwidth of VCG

It is assumed that the remote sink can remove multiple members simultaneously. By this we mean that the remote sink will toggle RS_ACK once after it has acknowledged the remove command on all member channels being removed. When removing multiple members, the source software will set the control word of all member channels being removed to IDLE in the same multi-frame.

If the remote sink is capable of removing only one member channel at a time, source side software can break a transaction that needs to remove multiple members into multiple single-member remove sub-transactions.

In general, it may not be possible to know if the remote sink is capable of removing multiple members at a time or not. It is possible that the source may send IDLE control word on multiple members simultaneously thinking that the sink will acknowledge them together but the remote sink may not do so. So the source side software should be able to deal with receiving multiple RS_ACK toggles. For the sake of simplicity, we do not discuss such cases in this document.

NMS specifies the following configuration parameters to the source node when it wants to add new members to a source VCG:
The receive LPID assigned to the local sink VCG
The identities of the member channel(s) to be removed
The following assumptions are made:
The member channels are already provisioned and payload carrying members of the source VCG (i.e. sending NORM/EOS as the control word)
Software performs the following operations to add the member channels:
1. Set the TX_CH_LCAS_CTRL fields of all the member channels to be removed to IDLE
2. It may be necessary to re-assign sequence numbers to some or all of the remaining members so that they maintain a contiguous segment starting from zero. If so, and set the TX_CH_LCAS_OH_SQ and TX_CH_VCAT_PL_SQ fields of such members to the new sequence numbers. It may also be necessary for the remaining member with the highest sequence to change its TX_CH_LCAS_CTRL field value from NORM to EOS.
3. Toggle the TX_SO_VCAT_FWD_SEL bit of the source VCG
4. Wait until the TX_SO_VCAT_FWD_CHG_DONE bit of the source VCG is set
5. Wait until each member being removed is receiving MST=FAIL status or a timeout occurs
   Since we assumed that the remote sink will send MST=FAIL for all members being removed before toggling the RS_ACK, software waits till it sees MST=FAIL on all the member channels.
   Software can determine when all channels are receiving MST=FAIL status via observation of the RX_SO_LCAS_EXT_MST field of the source VCG. Software can poll this field or use the associated RX_SO_LCAS_EXT_MST_CHG interrupt. The bit to look for in that field for a given member channel to be added is based on the sequence number assigned to that channel before the remove took affect.
6. Wait until the received RS_ACK value for the local VCG toggles or RS_ACK timer expires.

At this point the decrease bandwidth transaction has completed successfully from the source VCG point of view and the NMS can be informed of success.

4.7 Decrease Bandwidth of VCG Due to Fault

When an unprotected member channel that is in use (i.e. in NORM/EOS state) fails, the sink side will send MST=FAIL status to the source side. When the source side detects this, it shall perform the following operations:
1. Set the TX CH LCAS CTRL field of all the failed member channel to DNU
2. If the channel that failed was not the last member of the source VCG, decrement the TX_CH_VCAT_PL_SQ fields of all members that had a higher sequence number that the channel that failed by one.

If the channel that failed was the last member of the source VCG, set the TX_CH_LCAS_CTRL field of the member with the next highest sequence to EOS.
3. Toggle the TX_SO_VCAT_FWD_SEL bit of the source VCG
4. Wait until the TX_SO_VCAT_FWD_CHG_DONE bit of the source VCG is set When a failed member channel recovers, the sink side will send MST=OK status to the source side. When the source side detects this, it shall perform the following operations:
1. If the channel that recovered was the last member, set the TX_CH_LCAS_CTRL field of the recovered member channel to EOS and that of the member with the next highest sequence to NORM.
Otherwise set the TX_CH_LCAS_CTRL field of the recovered to NORM.
2. If the channel that recovered was not the last member, increment the TX_CH_VCAT_PL_SQ fields of all members that had a higher sequence number that the channel by one.
3. Toggle the TX_SO_VCAT_FWD_SEL bit of the source VCG
4. Wait until the TX_SO_VCAT_FWD_CHG_DONE bit of the source VCG is set 4.8 Change Reverse Control Insertion Configuration NMS specifies the following configuration parameters to the source node when it wants to change the reverse control insertion configuration of member channels of a source VCG The identities of the channel(s) whose reverse control extraction configuration needs to be changed
For each such channel, whether or not LCAS reverse control information shall be inserted into it and if so the receive LPID of the local sink VCG it would apply to.
The following assumptions are made:
The channels are already provisioned members of LCAS enabled source VCGs Software performs the following operations to change the reverse control extraction configuration of specified member channels:
2. Configure each new member channel as follows:
If the channel will be used to insert LCAS reverse control information, then set its TX_CH_LCAS_REV_INS_SK_LPID field to the value provided and set its TX_CH_LCAS_REV_INS_EN bit. Otherwise, clear its TX_CH_LCAS_REV_INS_EN bit.

Alignment

Referring to FIGS. 4A to 4E, diagrammatic views of a hardware system for a receive channel configured according to the invention is illustrated. These embodiments illustrate a receive channel that embodies LCAS functions, and that embodies various novel embodiments and functions of the invention. These functions are described in further detail below in connection with alignment of channels, de-sequencing and other functions that pertain to the invention.

Figure 4A:
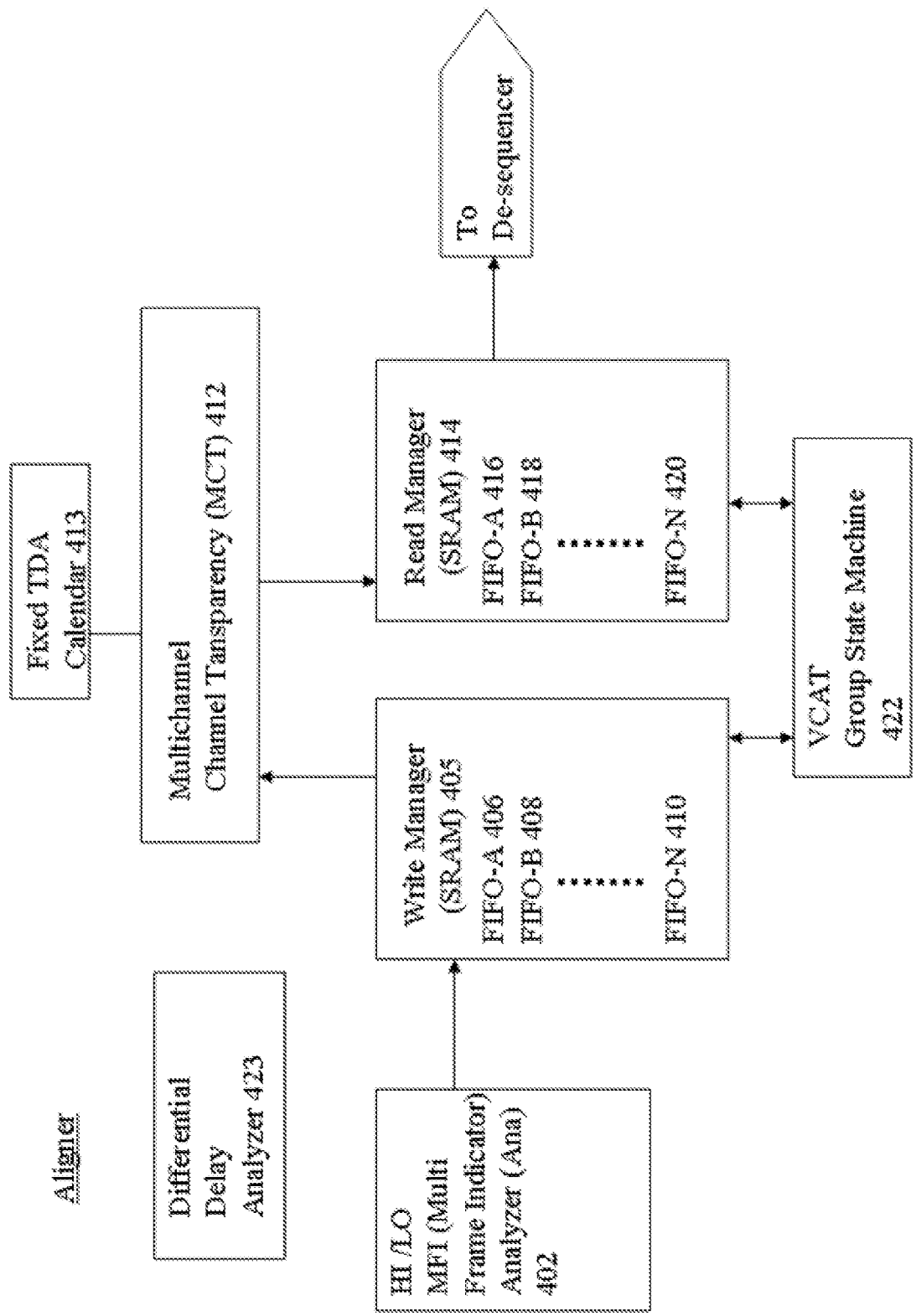

Referring to FIG. 4A, an illustration of an aligner configured according to the invention is illustrated. The system 400 includes a high order and low order (HO/LO) in a receive channel, multi-frame indicator (MFI) analyzer, collectively known as the ANA. The ANA transmits data streams to the write manager 405 and has multiple first-in/first-out (FIFO) memory storage arrangements, FIFO-A (406), FIFO-B (408), . . . , FIFO-N (410). Such configurations are well known to those skilled in the art. According to the invention, write manager receives each member of a VCG in each FIFO and writes the data to the multi-channel transparency 412. In one embodiment, the write manager is configured in a static random access memory (SRAM) and the multi-channel transparency is configured as a dynamic random access memory (DRAM). It will be known to those skilled in the art, however, that different configurations and different types of memory and storage components can be used. According to the invention, the read manager 414 is configured to read from the multi-channel transparency into memory storage. Similar to the write manager, the read manager is configured with first in and first out,-A (416),-B (418), . . . , -N (420). According to the invention, the read manager reads from the multi-channel transparency into its respective FIFO storage when the members of a virtual concatenation group (VCG), are complete and aligned in the multi-channel transparency 412. Once they are aligned, the read manager transmits the aligned VCG to the de-sequencer. In one embodiment, the read manager is configured in a static random access memory (SRAM). Those skilled in the art will understand that the memory configurations are flexible, and that other types of memory types or configurations are possible without departing from the spirit and scope of the invention, which is defined in the appended claims and their equivalents.

Figure 4B:
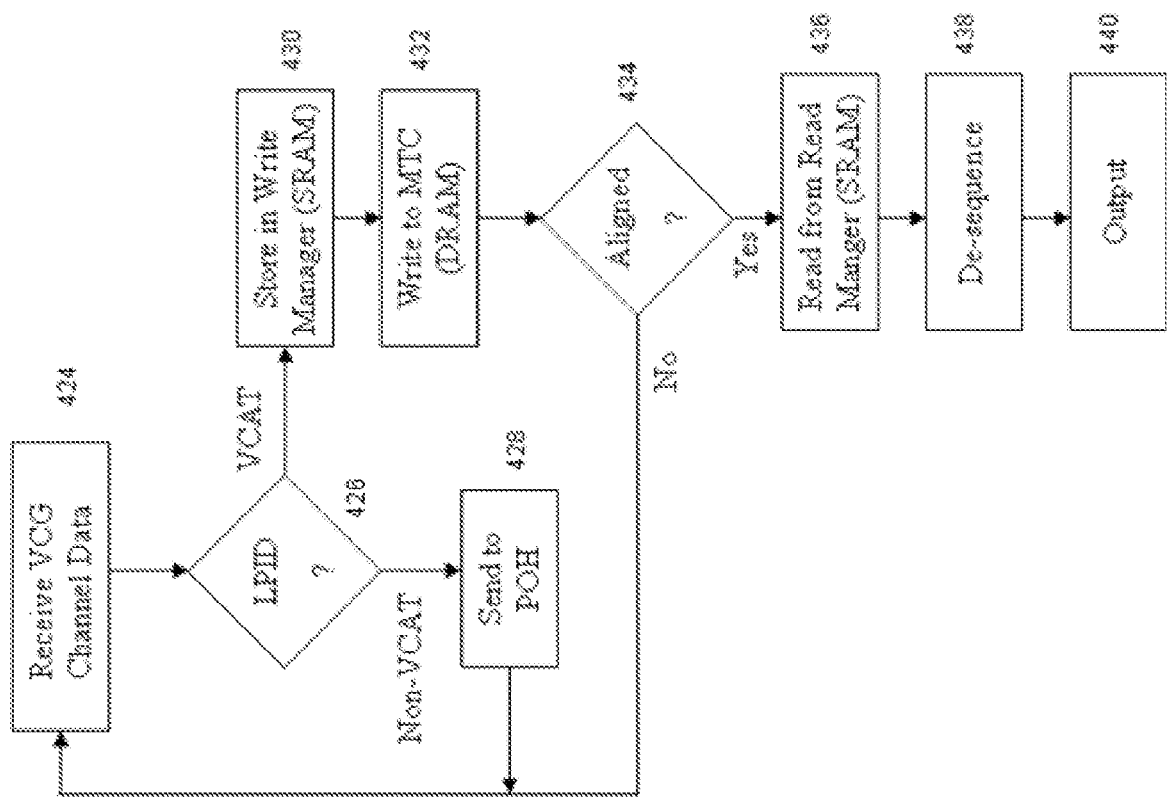

Referring to FIG. 4B, a flow chart is shown illustrating one operation of the received channel according to one embodiment of the invention. In step 424, an input VCG channel data is received, for example at the ANA 402, FIG. 4A. In step 426, the LCAS Packet Identification (LPID) is examined to see whether or not the transmission is a VCAT transmission. If it is not, then the transmission is sent to the POH, 422 in FIG. 4A, and the process returns to step 424. If the LPID does indicate that it is a VCAT transmission, the process proceeds to step 430, where the data is stored in the write manager, 405 in FIG. 4A which may be an SRAM. In step 432 the write manager writes the MTC, 412 in FIG. 4A, which may be a DRAM. In step 434, it is determined whether or not the members of a VCG are aligned. If they are not, then the process turns to step 424 to receive further data. Once they aligned in step 434. A more detailed embodiment if further described below. Then in step 436 the numbers of the VCG are read by the read manager. In step 438, the data is sent to the de-sequencer for sequential processing and the output is outputted in step 440.

Figure 4C:
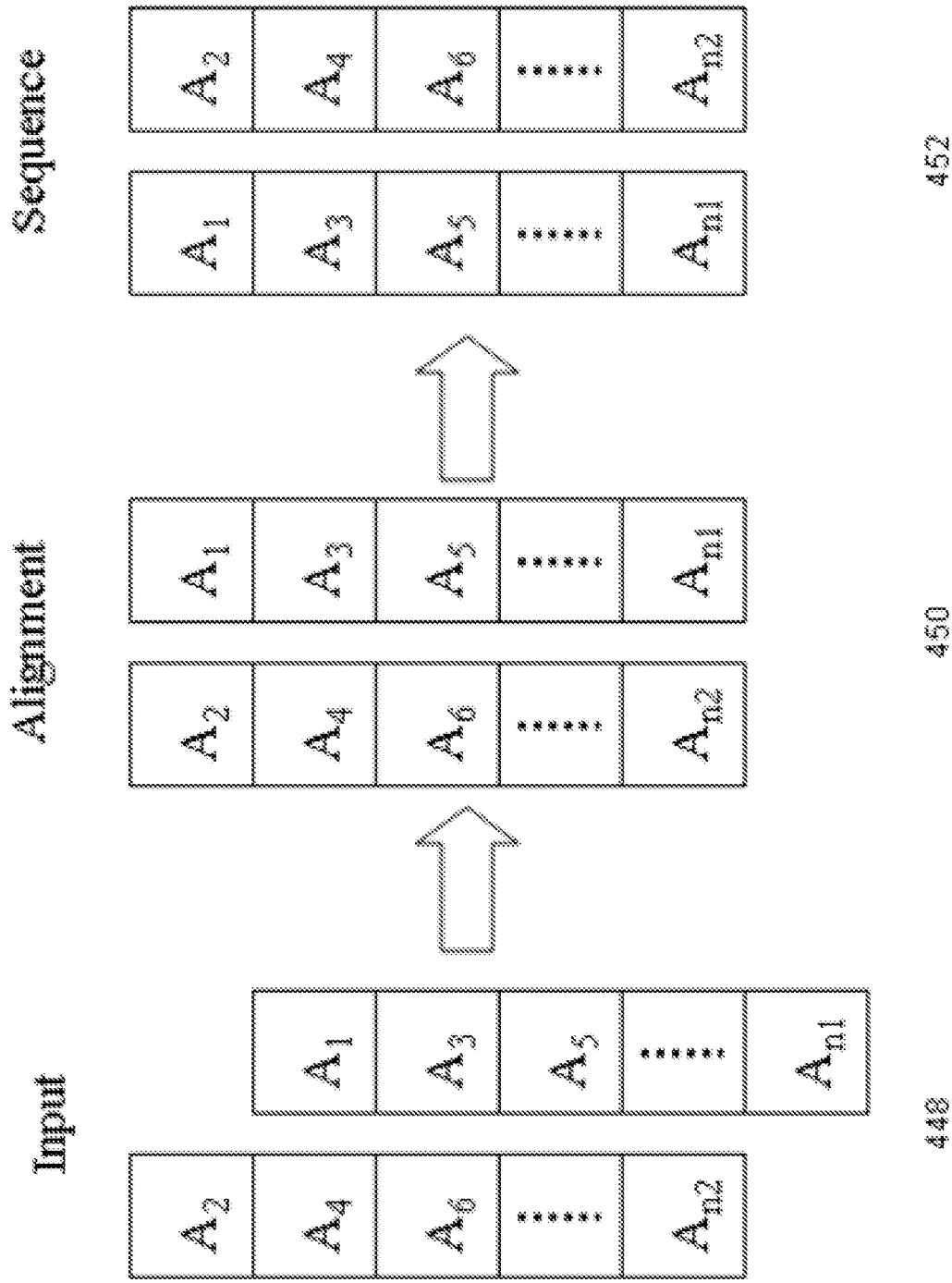

Referring to FIG. 4C, a block diagram is illustrated showing symbolically how the members of a group are aligned. In step 448, an input is received where the data input is not aligned nor in proper sequence. In step 450, the alignment is performed where the corresponding groups are aligned, two members of one group in this example. In step 452, the sequence is reordered so that the members of the VCG are aligned and in sequence.

Figure 4D:
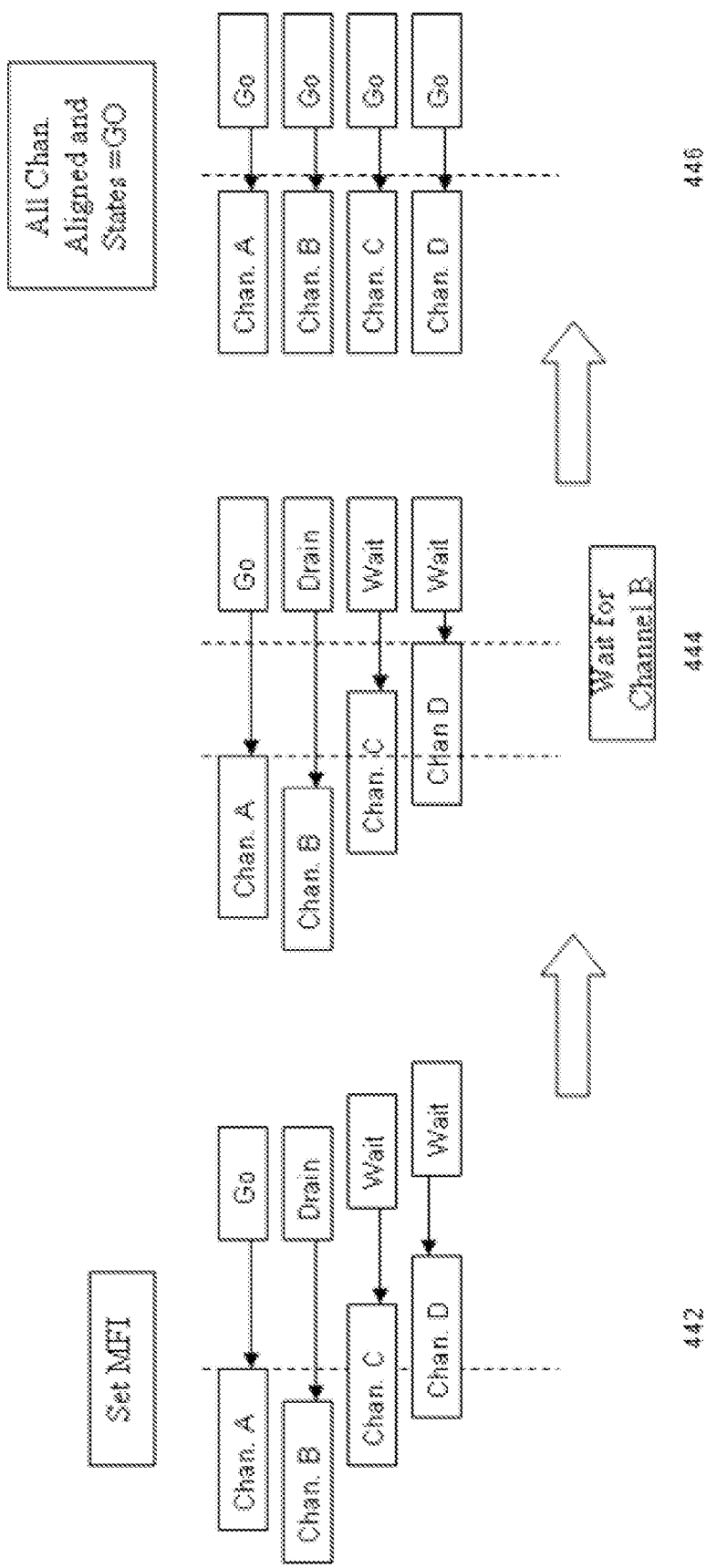

Referring to FIG. 4D, another example of the alignment process in a receive channel, also considered as de-alignment when considered from the receiving channels perspective, is shown in a diagrammatic manner. In the first step 442, individual channels A, B, C, and D are received at the multi-channel transparency from the write manager. These are initially read by the read manager, according to one embodiment of the invention, where the first channel to be received in time is read by the read manager, and the MFI number is set at a GO state. There are three states in the read manager. A GO state is a fully received channel from write manager to the MCT that is ready to be read once the other channels are completely received and aligned and, thus likewise in a Go state. The Drain state is a state of a channel in which the entirety of the channel data has not been fully received in the MCT, and still needs to receive further information to be complete. The wait or stall state is a channel that has been received prior to the initial channel but is ready past the first read channel when the MFI was set, and is set to wait until all of the channels are aligned.

As can be seen, channel A is in a go state, since it was the first channel to be received. Here at the MFI number is set. Channel B is set to a drain state, because it was received later in time and is not complete. Channel C, in contrast, is received ahead of time where it is complete and is set in a wait state to wait for the other channels to catch up to be aligned. Similar is the case for channel D, which is also set in the wait state. The MFI could possibly be reset to obviate the wait or stall state. However, the LCAS specification requires hitless operations, and resetting the MFI would cause a hit. Therefore, in a preferred embodiment, the MFI is set once the first channel member of a group is received, and subsequent members that arrive from in the group are set accordingly.

In the next step, 444, the channels are realigned by the fact that all of their data has arrived and are set to Go. In step 446, all channels A-D are set to the GO state, indicating that they are aligned up, in the GO state and ready to be read from the read manager. At this point, the read manager reads the VCG in its entirety. The VCG is then sent to the sequencer for sequencing.

According to the invention, the modularity of the hardware, whether it is implemented on a single die or in a chip set, allows for alignment of received channel data independently from the sequence of the received data. In a subsequent operation, the sequence of the received channels are reordered. This is improvement over the prior art, where these processes are done in one single step. As a result, data arrives and exits the received circuits smoothly, without jitter, which results in decoupling. In operation, the alignment is done first, and once they are all aligned, they are read from date of memory in time domain multiplex order. The operation is smoother, tedium based where each slot gets a time slot. All of the operations are preplanned. No burstinest, undue bursts of data, or uncertainty exists in the configuration. Each channel gets a periodic time slot so data travels smoothly and flows through.

This is in contrast to prior operations where the data is stored as it comes in and pulled out in the same order. The reordering or synchronization is done in chunks, resulting in problematic burstiness and uses a good deal of memory. Such a configuration changes travel patterns, and arbitration is very complicated. According to the invention, the periodic solution is smoother where the alignment is performed first and substantially obviates any burstiness or lost data.

Figure 4E:
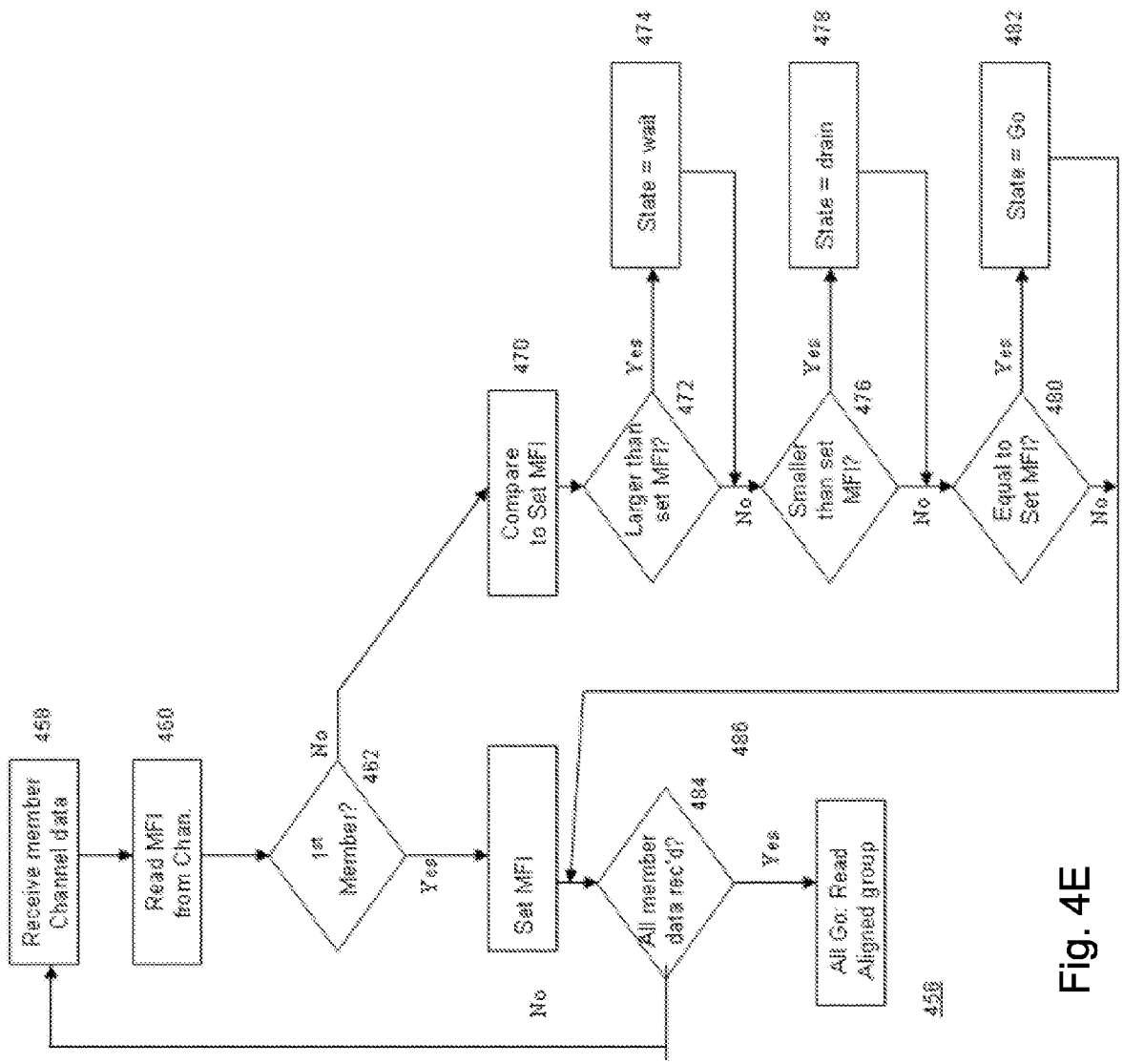

Referring to FIG. 4E, a flow chart is illustrated of a system for setting the MFI number according to the invention. In step 458, channel data is received by a member channel. In step 460 the MFI number is read from the channel. In step 462, it is determined whether or not the channel is the first channel read from the group. If it is, then the MFI number is set for the group. It is then determined in 484 if all member data has been received, if not, then the process returns back to step 458 where further member channels are written as they arrive. In step 460, the MFI from the channels read, and if it is not the first channel, the process proceeds from step 462 to step 470 where the MFI of the subsequently received channel is compared to the set MFI, which is set by the first channel established. In step 472, it is determined whether the MFI is larger than the set MFI. If it is larger than the set MFI then the state is set at wait in step 474. If not, or after the state is set it is determined in step 476 whether the MFI is smaller than the set MFI. If the answer is yes, assuming that it was probably known at prior step, the state is set to drain in step 478 and the process proceeds to step 480 to determine whether or not it is equal to the set MFI. If it is equal to the set MFI, the process sets the state at GO in step 482 and the process returns to step 484 to determine whether or not all member data is received. This process loops around step 458 and subsequent steps until all channels have been received. Referring back to FIG. 4D, this illustrates how the MFI as described in FIG. 4E sets the states after channels are received. Still referring to FIG. 4D, the process is illustrated and described in FIG. 4E illustrates how the states are set as each channel is received. As channel A arrives first in time, it is set to a GO state, establishing the first MFI. After other channels are received, such as channels B, C, and D, the MFI's are compared in order to set their state. In FIG. 4D, step 444 shows that channel A is set to GO because it is the first to arrive. The channels must all proceed to the GO state before the group can be read and further processed. The Channel B is set to drain because it is not fully received yet, and Channel C and D remain in the wait or stall state until channel B has completed its transmission. In step 446, once all channel data has arrived form all channels, A, B, C, and D, they are all set to GO and are ready to be read by the read manager.

Referring back to FIG. 4A, the read manager reads the channel data when all are set to GO receiving each channel data in FIFO 416, 418 and other FIFOs. In practice, the read manager may repeatedly read the locations in the MCT 412 repeatedly until all are in the GO state. Once in the GO state, all are read in their entirety by the read manager. In operation, the write manager receives the channel data and stores it in the MCT memory storage as the channel data arrives from ANA 402. In one embodiment, the write manager is a SRAM and the MCT is a DRAM, the read manager may also be an SRAM. Thus, the size of the write manager and the read manager can be small in comparison to the MCT, which can be a DRAM for a large amount of storage. The write manager can write a large amount of data into the MCT without requiring a great deal of storage while receiving multiple channels of data. The MCT can store the data until it is aligned. Once aligned, the read manager can read from the MCT in a time domain multiplexed manner. The output from the read manager is sent to the de-sequencing module, which reorders the channel data accordingly.

5 Overview

In one embodiment, a receive circuit, or the functions of the VCT_RX block, are distributed amongst a plurality of modules. In one embodiment, the modules include a Configuration (CFG) module, a Calendar/Failure/Register (CFR) module, a MFI Analyzer (ANA) module, an Aligner Write Manager (ALIG_WR), an Aligner Read Manager (ALIG_RD), an LCAS/VC Controller (LVC) and a Payload De-sequencer (DSQ). In a preferred embodiment, the non-VCAT packet traffic follows a different path in the VCT_RX block than the VCAT traffic.

Configuration (CFG)

5.1 Overview

The CFG module maintains all global configuration and status parameters and all interrupt status parameters. It directs CPU requests for all other configuration and status registers to the module(s) that implement it. The CFG module may generate multiple requests from a single CPU request to implement the registers where parameters from multiple modules are combined.

The CFG module implements the indirect access scheme used by all other modules in the RX_VCT block. Note that all of the configuration and status parameters in these modules use indirect access where as the parameters in the CFG block are accessed directly. The indirect access scheme is the same as the one used in the packet block, i.e. it supports the auto increment model.

The CFG module is responsible for generating interrupt summary status and generating interrupt to the top level CPU module in Orion.

5.2 Interfaces

The CFG module interfaces to all other modules in the VCT_RX block using separate point-to-point busses for passing configuration or status read/write requests from the CPU. Note that the CFG module itself maintains some configuration and status parameters, including all interrupt status parameters.

All modules except the ALIG_WR module use separate point-to-point interrupt busses to indicate interrupt events to the CFG module. The only interrupt that the ALIG_WR module can generate is for parity error on channel state memory. It indicates parity error events to the ALIG_RD module by corrupting the read pointer of the affected channel. The ALIG_RD module combines parity errors from ALIG_WR module with its own channel level parity error events. Since the ALIG_RD and LVC modules are driven by the same calendar, the CFG block can line interrupts that happen in the same clock from them (no interrupts come from DSQ).

5.3 Configuration and Status Parameters

In one embodiment, the CFG module maintains the following parameters:

- All global configuration parameters
- All channel level interrupt enable configuration parameters
- All sink port level interrupt enable configuration parameters
- All source port level interrupt enable configuration parameters
- All global status parameters
- All global interrupt status parameters
- All channel level interrupt status parameters
- All sink port level interrupt status parameters
- All source port level interrupt status parameters These parameters are implemented using storage such as flops, flip flops, or other memory devices or configurations as follows:

- Global parameters are implemented using flops.
- Sink port level or source port level interrupt enable and interrupt status parameters are implemented using flops.
- Channel level interrupt enable and interrupt status parameters are implemented using memories.

Collisions between hardware and software to parameters maintained in the CFG block are handled according to a collision algorithm that delegates the processes to hardware and software. In one embodiment, the process is as follows.

- If a write request from software for a configuration parameter collides with a read request from hardware, the value from software will be used by hardware.
- If a write request from software for a global status, or an interrupt status parameter collides with a read request from hardware, the value from hardware will be passed to software.

5.3.1 Global Configuration

The VCAT DRAM is configured according to size and the size a group.

These parameters are static. They should not be changed while the VCT_RX block is not in reset (or when any VCAT enabled channel is not in reset).

Counters are configured for getting into/out of OOM and getting into LOM. The commands are in the form of RX_VCAT_HO_OOM1_IN, RX_VCAT_HO_OOM1_OUT, RX_VCAT_LO_OOM1_IN and RX_VCAT_LO_OOM1_OUT, etc. These parameters are also static and should not be changed while the VCT_RX block is not in reset (or when any VCAT enabled channel is not in reset).

Other counters are for setting and clearing LCAS persistent CRC alarm (DCRC)

They are of the form RX_LCAS_DCRC_N1, RX_LCAS_DCRC_K1, etc. Similarly, these parameters are static and should not be changed while the VCT_RX block is not in reset (or when any VCAT enabled channel is not in reset).

The MFI capture is configured to capture the MFI value for each channel. The commands are of the form RX_VCAT_MFI_CAP_CHAN1, . . . RX_VCAT_MFI_CAP_CHAN(n), and RX_VCAT_MFI_CAP_DONE_INT_EN The group identification is similarly captured. The commands may be of the form RX_LCAS_GID_CAP_PORT, RX_LCAS_GID_CAP_DONE_INT_EN, etc.

The DRAM FIFO level measurement is configured in software for channels according to appropriate thresholds. Commands may be of the form RX_VCAT_DRAM_FIFO_LVL_CAP_CHAN, RX_VCAT_DRAM_FIFO_LVL_TH-SLD, RX_VCAT_DRAM_FIFO_LVL_CAP_DONE_INT_EN, RX_VCAT_DRAM_FIFO_BELOW_TH-SLD_CHG_INT_EN, or other similar forms.

The interrupt summary enable is configurable among various circumstances and applications. For example, interrupt enable bits may be configured for interrupt summary status bits at STS level (48 bit register). They may also be for interrupt summary status bits at VT level (48x28 bit registers). They could also be configured for interrupt summary status bits at port level (128 bit register), for Interrupt summary status bit of all channels or and interrupt enable bit Interrupt summary status bit of all ports. Those skilled in the art will understand the variety of interrupt configurations to enable different applications.

A DRAM may be configured for read request FIFO overflow using an interrupt enable. The command could be of the form RX_VCAT_DRAM_RD_REQ_FIFO_OV-FL_CNT_CHG_INT_EN.

Also, a DRAM may be configured to enable a write not ready (sticky) error interrupt enable, which could be of the form RX_VCAT_DRAM_WR_NOT_RDY_ERR_INT_EN. Similarly, a DRAM may be configured for a read not ready (sticky) error interrupt enable, which may be of the form RX_VCAT_DRAM_RD_NOT_RDY_ERR_INT_EN

5.3.2 Channel Level Interrupt Enable Configuration

Channel interrupt enable configuration parameters are grouped into a dual portion of memory, such as a 1344×12 dual port memory. This may be shared by high and low order channels. One example is the following table that shows the structure of the entries in this memory.

| Parameter | Size | Static | Value after initialization |
|---|---|---|---|
| RX_CH_VCAT_OOM1_CHG_INT_EN | 1 | N | 0 |
| RX_CH_VCAT_OOM2_CHG_INT_EN | 1 | N | 0 |
| RX_CH_VCAT_LOM_CHG_INT_EN | 1 | N | 0 |
| RX_CH_VCAT_ACC_ESL_CHG_INT_EN | 1 | N | 0 |

| Parameter | Size | Static | Value after initialization |
|---|---|---|---|
| RX_CH_NL_VCAT_SQM_CHG_INT_EN | 1 | N | 0 |
| RX_CH_LCAS_SQ_CHG_INT_EN | 1 | N | 0 |
| RX_CH_LCAS_CTRL_CHG_INT_EN | 1 | N | 0 |
| RX_CH_LCAS_CRC_ERR_CHG_INT_EN | 1 | N | 0 |
| RX_CH_LCAS_NL_SRC_INT_EN | 1 | N | 0 |
| RX_CH_CFG_PRTY_ERR_CHG_INT_EN | 1 | N | 0 |
| RX_CH_CTRL_PRTY_ERR_CHG_INT_EN | 1 | N | 0 |
| Odd parity | 1 | N/A | 1 |

In a preferred embodiment, hardware does not disable interrupts from a channel that has an entry in this memory has a parity error.

5.3.3 Sink Port Level Interrupt Enable Configuration

The following table shows the sink port interrupt enable configuration parameters.

| Parameter | Size | Static | Value after initialization |
|---|---|---|---|
| RX_SK_VCAT_RBID_CHG_DONE_INT_EN | 1 | N | 0 |
| RX_SK_LCAS_GID_ERR_CHG_INT_EN | 1 | N | 0 |

Note that since all sink port level configuration and state parameters are implemented in flops, there is no configuration or control parity at the sink port level.

5.3.4 Source Port Level Interrupt Enable Configuration

The following table shows the source port interrupt enable configuration parameters.

| Parameter | Size | Static | Value after initialization |
|---|---|---|---|
| RX_SO_LCAS_MST_CHG_INT_EN | 1 | N | 0 |
| RX_SO_LCAS_RS_ACK_CHG_INT_EN | 1 | N | 0 |

Note that since there are no configuration parameters or state variables for source ports, there is no configuration or control parity interrupt enables at the source port level.

5.3.5 Global Status

Global status may include MFI capture status, DRAM-FIFO level measurement status, Interrupt summary status, includes the following parameters, DRAM Read request FIFO overflow, DRAM write not ready error and other status information. Some examples are as follows.

MFI Capture Status
RX_VCAT_CHAN1_MFI
RX_VCAT_CHAN2_MFI
RX_VCAT_MFI_CAP_DONE
DRAM FIFO Level Measurement Status
RX_VCAT_DRAM_FIFO_LVL
RX_VCAT_DRAM_FIFO_LVL_CAP_DONE
RX_VCAT_DRAM_FIFO_LVL_BLW_THSLD_CHG
Interrupt Summary Status
Interrupt summary status bits at STS level (in 2 registers)
Interrupt summary status bits at VT level (in 48 registers)
Interrupt summary status bits at port level (in 4 registers)
Interrupt summary status bit of all channels (at STS level)
Interrupt summary status bit of all ports DRAM Read Request FIFO Overflow
RX_VCAT_DRAM_RD_REQ_FIFO_OVFL_CNT
RX_VCAT_DRAM_RD_REQ_FIFO_OVFL_CNT_CHG
DRAM Write Not Ready Error
RX_VCAT_DRAM_WRNOT_RDY_ERR The following global interrupt status bits may be grouped in one register:

RX_VCAT_MFI_CAP_DONE
RX_VCAT_DRAM_FIFO_LVL_CAP_DONE
RX_VCAT_DRAM_FIFO_LVL_BLW_THSLD_CHG
RX_VCAT_DRAM_RD_REQ_FIFO_OVFL_CNT_CHG
RX_VCAT_DRAM_WR_NOT_RDY_ERR
Interrupt summary status bit of all channels
Interrupt summary status bit of all ports 5.3.6 Channel Level Interrupt Status All channel interrupt status parameters except the RX_CH_VCAT_FAIL_STICKY may be grouped into a dual port 1344×12 memory, which is shared by high and low order channels. The following table shows and example of the structure of the entries in such a memory configuration.

| Parameter | Size | Value after initialization or channel reset |
|---|---|---|
| RX_CH_VCAT_OOM1_CHG | 1 | 0[1] |
| RX_CH_VCAT_OOM2_CHG | 1 | 0[1] |
| RX_CH_VCAT_LOM_CHG | 1 | 0[1] |
| RX_CH_ACC_ESL_CHG[2] | 1 | 0[1] |
| RX_CH_NL_VCAT_SQM_CHG | 1 | 0 |
| RX_CH_NL_VCAT_ACC_SQ_CHG | 1 | 0 |
| RX_CH_LCAS_SQ_CHG | 1 | 0 |
| RX_CH_LCAS_CTRL_CHG | 1 | 0 |

| Parameter | Size | Value after initialization or channel reset |
|---|---|---|
| RX_CH_LCAS_CRC_ERR_CHG | 1 | 0 |
| RX_CH_LCAS_NL_SRC_CHG | 1 | 0 |
| RX_CH_CFG_PRTY_ERR_CHG | 1 | 0 |
| RX_CH_CTRL_PRTY_ERR_CHG | 1 | 0 |

These bits may alternatively be reset when RX_CH_V-CAT_MFI_EN is set to zero.

Also, this parameter may be valid only for low order channels that carry extended signal label. Hardware may not be configured to check if the V5 bit indicates extended signal label is used or not when extracting extended signal label. Also, such a memory may not be protected by parity.

5.3.7 Sink Port Level Interrupt Status

The following is an example of a sink port interrupt status parameters, where the command is RX_SK_VCAT_RBID_CHG_DONE, the size is 1 bit, and the value after initialization or sink port reset is zero. If all sink port level configuration and state parameters are implemented in flops, there would be no configuration or control parity at the sink port level.

5.3.8 Source Port Level Interrupt Status

An example of source port interrupt status parameters is RX_SO_LCAS_MST_CHG and RX_SO_LCAS_RS_ACK_CHG, where each are 1 bit in size and have a value of zero after initialization. If there are no configuration parameters or state variables for source ports, there may be no configuration or control parity error interrupt status bits at the source port level. Also, if there is no source port level reset, these status variables must always be written 1 by software to be cleared.

5.4 Interrupt Summary Generation

The interrupt status summarization may be performed at several levels. For example, there may be a summary of all interrupt status parameters related to an STS-1. Note that if an STS-1 is VT mapped, then this summary covers the interrupt status parameters of all the VT channels within that STS. The STS interrupt summary bits are kept in 48 flops.

There may also be a summary of all interrupt status parameters related to a VT channel. The VT summary bits are organized by STS and kept in 48×28 flops. If an STS channel is not VT mapped, the summary status bits of VT channels corresponding to that STS will be cleared.

There may also be a summary of all interrupt status parameters related to a sink port. Note that these interrupt parameters are meaningful only if the sink port is VCAT enabled. The sink port interrupt summary bits would be kept in 128 flops.

Furthermore, there may be a summary of all interrupt status parameters related to a source port. Note that these interrupt parameters are meaningful only if the sink port is LCAS enabled. The source port interrupt summary bits would be kept in 128 flops.

When a channel is reset, the CFG clears the interrupt status bits of that channel. It does not directly clear the summary interrupt bit(s) related to that channel. When a sink port is in reset, the CFG clears the interrupt status bits of that sink port. It does not directly clear the summary interrupt bit(s) related to that sink port. There is no source port reset that clears the source port level interrupt status bits. Software needs to write 1 to both RX_SO_LCAS_MST_CHG and RX_SOL_LCAS_RS_ACK_CHG interupt status bits to clear them. If the interrupt enable configuration bit of a particular interrupt status bit is not set, then that interrupt status bit does not contribute to the summary.

5.4.1 Channel Interrupt Summary Generation

The CFG module is configured to handle simultaneous channel interrupts from two independent sources, for example, the ANA and the ALIG_RD/LVC. To handle this, the CFG may be configured to use two separate dual port memories for channel level interrupt status parameters coming from ANA and ALIG_RD/LVC. To perform interrupt summary, the CFG module may read the channel interrupt status memories and sink and source port interrupt status registers continuously. The channel interrupt summary generation process and the CPU share a port on the dual port memories, with CPU access given priority.

6 Calendar Fail Register Module (CFR)

6.1 Overview

The CFR module may have a plurality of functions. For example, it may have the following functions. First, storing all channel level configuration. Also, calculating the start and end address of DRAM space allocated to a channel based on the overall DRAM space allocated to VCAT, the type of the channel and the DRAM diagnostic mode. Further, it may be configured for generating the internal free running calendars (1x, 2x, 56x and 62x) used throughout the VCT_RX block based on the channel structure configuration. It may also be configured to distribute channel configuration and fail/reset state to other modules along with calendar information. And it may also be configured for VCAT alignment failure handling. The calendar generation, DRAM space allocation and failure handling functions are described in the "VCT_Aligner" document.

6.2 Interfaces

The CFR module interfaces to the ANA, ALIG_WR, ALIG_RD and the CFG modules. See the "vct_rx_cfr" micro architecture document for the interface signals.

6.2.1 Interface to the ANA

The interface to the ANA is primarily for the ANA to get channel configuration information. But the response to the configuration request from the ANA includes a channel fail bit in addition to the configuration parameters.

The ANA module does not process the channel fail indication from the CFR module. It just passes this signal to the ALIG_WR module, which uses it to determine if data should be written to staging FIFO of the associated channel and if the write pointer of the associated channel shall be corrupted. Note that the channel fail condition can exist even if the ANA module is not reporting an alarm on the channel.

The CFR passes the CH_CFG_PRTY_ERR condition as part of the configuration response to the ANA. Although this is not required by ANA to function, ANA stores this bit in its state memory. When it detects a change it will generate an interrupt to the CFG.

6.2.2 Interface to the ALIG_WR

The CFR interface to the ALIG_WR has two independent groups of signals based on the 1x can 2x calendars:

Signal group based on the 2x calendar for CFR to pass the TID of the channel in the current calendar cycle and its fail condition to the ALIG_WR, which uses them to move data from staging FIFO and to the main FIFO.

Signal group based on the 62x calendar for CFR to pass the TID of the channel in the current calendar cycle, its fail condition and the start and end addresses of the space allocated to it in DRAM to the ALIG_WR, which uses them to move data from the main FIFO to DRAM.

6.2.3 Interface to the ALIG_RD

In one embodiment, the CFR interface to the ALIG_RD has five independent groups of signals. Four of these signals may be based on the 56x, 62x and 1x calendars.

One signal group based on the 56x calendar for CFR to pass the TID of the channel in the current calendar cycle, its reset and fail conditions and the start and end addresses of the space allocated to it in DRAM to the ALIG_RD, which uses them to move data from DRAM to the main FIFO of the channel and to reset the main FIFO of the channel.

Another signal group based on the 2x calendar for CFR to pass the TID of the channel in the current calendar cycle and its reset and fail conditions to the ALIG_RD, which uses them to move data from the main FIFO of the channel to the staging FIFO of the channel and to reset the staging FIFO of the channel.

Another signal group based on the 1x calendar for CFR to pass the TID of the channel in the current calendar cycle, its reset and fail conditions, its configuration, its type, the reset state of the VCG it is a member of, the parity status of its configuration memory entries, and the current calendar generation counters to the ALIG_RD, which uses them to move data from the staging FIFO to the LVC and reset the channel and VCG states it maintains.

The channel configuration data passed with the 1x calendar may include data that is needed not only by the ALIG_RD but also the downstream LVC and DSQ modules. The channel type and calendar generation counters are used by ALIG_RD as well as DSQ.

Another signal group may be based on the 1x calendar for ALIG_RD to pass the TID of the channel in the current calendar cycle, its DRAM overflow error or alarm detection status to the CFR, which uses them to update the channel and VCG fail states. The other signal group may not be based on a calendar but is used by the ALIG_RD to get the fail status of a channel from the CFR.

In interfacing between the CFR and the CFG, the CFG accesses the CFR to read and write channel configurations. The CFR is configured to send interrupt events to the CFG.

6.3 Configuration

The CFR module maintains all per channel configuration parameters and STS channel structure configuration parameters. It also maintains all sink port level configuration parameters except the reorder buffer ids (RX_SK_VCAT_RBID0/1). The configuration information is piped to the blocks that need it along with the 1x calendar.

6.3.1 STS Channel Structure Configuration

STS channel structure configuration registers are implemented using 48×9 flops.

| Parameter | Size | Static | Value after initialization |
|---|---|---|---|
| RX_CH_STS_VT | 1 | $Y^1$ | 0 |
| RX_CH_STS_VC4 | 1 | $Y^1$ | 0 |
| RX_CH_STS_VTG_TYPES | 7 | $Y^1$ | 0 |

Note 1:
The channel structure configuration parameters are static in the sense that they should not be changed while any current channel(s) that would be affected by the changed are out of reset. Also, changing of these parameters in the VCT_RX block should be done in coordination with corresponding configuration in the SONET/SDH receive block.

6.3.2 Channel Level Configuration

Since the ANA module needs to access configuration information asynchronously with respect to the free running 1x calendar that drives the other modules, the configuration information required by the ANA is duplicated in a separate dual port memory. When software updates these parameters, both memories will be updated. When software reads them, the values in the memory used by 1x calendar will be fetched.

6.3.2.1 Memory For Channel Configuration Accessed By 1x Calendar

All of the channel level configuration parameters are grouped into a 1344×25 dual port memory, which is shared by high and low order channels. The following table shows the structure of the entries in this memory.

| Parameter | Size | Static | Value after initialization |
|---|---|---|---|
| RX_CH_SW_CFG_EN | 1 | N/A | 1 |
| RX_CH_VCAT_MFI_EN | 1 | $N^3$ | 1 |
| RX_CH_SK_LPID | 7 | Y | $0^1$ |
| RX_CH_VCAT_ACCEPTED | 1 | N | $0^2$ |
| RX_CH_LCAS_REV_EXT_EN | 1 | N | 0 |
| RX_CH_LCAS_REV_EXT_SO_LPID | 7 | N | $0^1$ |
| RX_CH_NL_VCAT_EXP_SQ | 6 | N | $0^1$ |
| Odd parity | 1 | N/A | 1 |

Note 1:
These parameters do not need to have an initial value for operational purposes. However, for parity protection, they are set to zeroes.
Note 2:
During an operation cycle, the RX_CH_VCAT_ACCEPTED parameter should be set to 0 before a channel is brought out of reset if the channel is to belong to an LCAS enabled VCG.
Note 3:
The RX_CH_VCAT_MFI_EN is used independently of the RX_CH_SW_CFG_EN. See the discussion in section 7.4

6.3.2.2 Memory For Channel Configuration Accessed by ANA

The following configuration parameters required by the ANA are grouped into a 1344×10 dual port memory, which is shared by high and low order channels. The following table shows the structure of the entries in this memory.

| Parameter | Size | Static | Value after initialization |
|---|---|---|---|
| RX_CH_SW_CFG_EN | 1 | N/A | 1 |
| RX_CH_VCAT_MFI_EN | 1 | $N^2$ | 1 |
| RX_CH_SK_LPID | 7 | Y | $0^1$ |
| Odd parity | 1 | N/A | 1 |

Note 1:
This parameter does not need to have an initial value for operational purposes. However, for parity protection, they are set to zeroes.

6.3.3 Sink Port Level Configuration

The following sink port configuration parameters are implemented using 128×4 flops.

| Parameter | Size | Static | Value after initialization or sink port reset |
|---|---|---|---|
| RX_SK_SW_CFG_EN | 1 | N/A | 1 |
| RX_SK_VCAT_EN | 1 | $Y^1$ | 0 |
| RX_SK_LCAS_EN | 1 | $Y^1$ | 0 |
| RX_SK_VCAT_RBID_SEL | 1 | N | 0 |

Note 1.
While there are channels out of reset that are mapped to this port or while the RX_SK_SW_CFG_EN is not set, the RX_SK_VC_EN and RX_SK_LCAS_EN configuration parameters should not be changed.

6.4 Status

Parity errors in the channel configuration memories are passed to the ALIG_RD module, which stores them in its own channel status memories. This avoids the need to have a status memory in this module.

The RX_CH_VCAT_FAIL_STICKY status parameters are implemented in the CFR block using 1344 flops because they need to be accessed by all three calendars in the CFR block.

| Parameter | Size | Value after initialization |
|---|---|---|
| RX_CH_VCAT_FAIL_STICKY | 1 | 0 |

Note that RX_CH_VCAT_FAIL_STICKY is not a typical status parameter in the sense that it is not a live status of failure. It is more like an interrupt status parameter in the sense that it is latched value but also in that software needs to write 1 to it to clear it. However, it is not exactly like the other interrupt status parameters in that it does not generate and interrupt and hence does not have an associated interrupt enable parameter. This is intentional because the underlying cause of a failure will generate an interrupt.

6.5 State

The CFR module uses flops to maintain failure state of channels and VCGs. Also, the CFR module maintains a counter for each channel to clear its failure/reset state to ensure that channel resets/failures are held long enough for all modules to see it. These counters are implemented using a 1344×7 dual port memory (without parity protection). See "vct_rx_cfr" micro architecture document for more details.

6.6 Interrupt Events

The CFR generates the following interrupt events to the CFG:

RX_CH_CFG_PRTY_ERR_CHG 6.7 Calendar Generation

Calendar generation is based on the STS channel structure configuration and four internal counters. See the "VCT_Aligner" architecture and "vct_rx_cfr" micro architecture.

6.8 Failure Handling

See the "VCT_Aligner" architecture and "vct_rx_cfr".

7. The MFI Analyzer (ANA)

7.1 Overview

Figure 5:
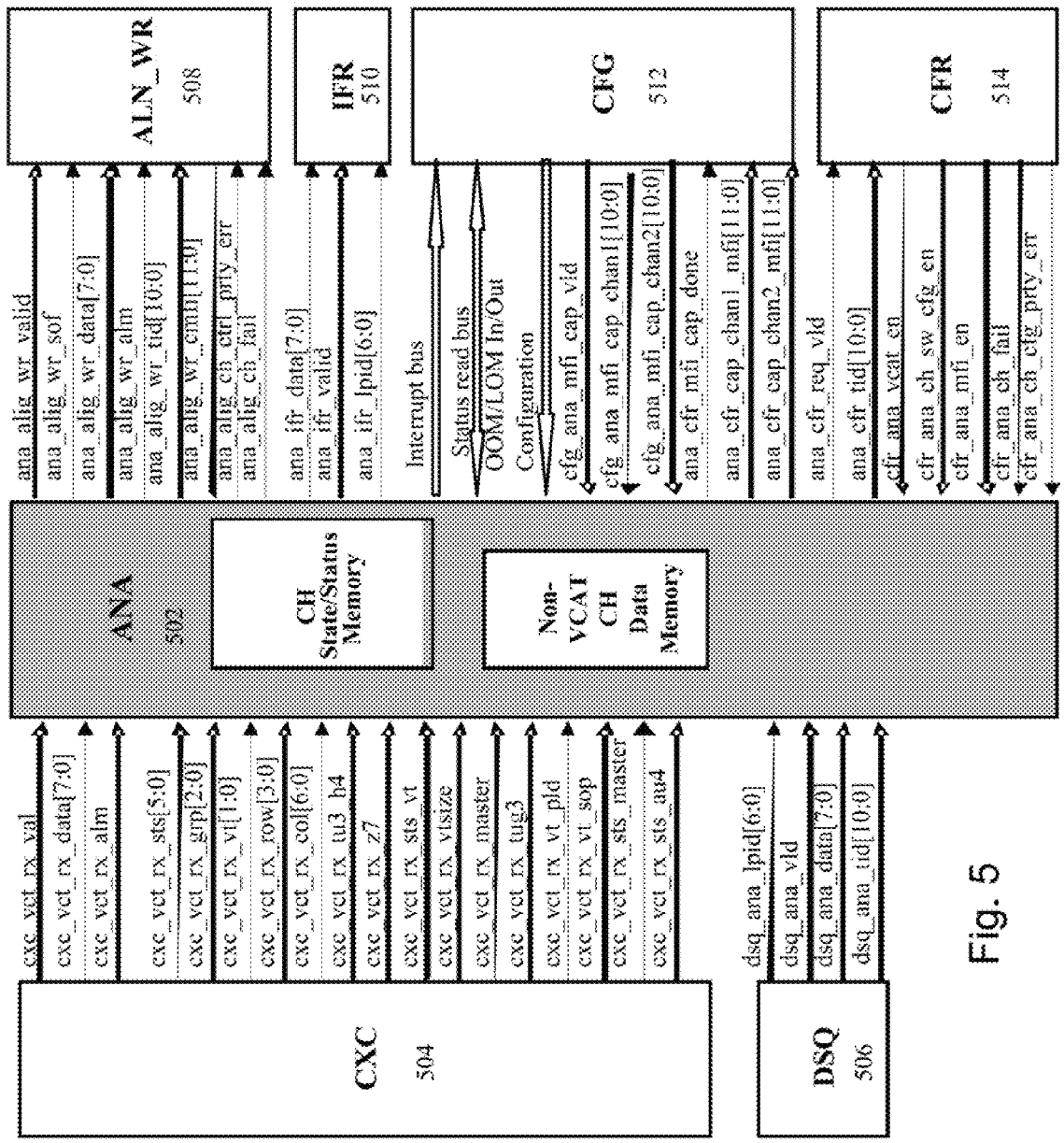
FIG. 5 is an illustration of an ANA.

Referring to FIG. 5, an embodiment of an MFI analyzer is illustrated. The ANA 502 interfaces with the cross connect (CXC) 504, the desequencer 506, the align writer 508, the input frame module (IFR) 510, the configuration module (CFG) 512 and the CFR (514). The ANA further includes a Channel (CH) State/status memory and Non-VCAT Ch data memory. In one embodiment, the ANA performs the following functions:

Split VCAT packet traffic from non-VCAT packet traffic based on the configuration stored in CFR module On VCAT channels, strip all overhead and stuff bytes except for H4/K4 bytes used for VCAT/LCAS before passing them to the ALIG_WR On non-VCAT packet channels, strip all overhead and stuff bytes before writing them to the internal data buffer For VCAT channels, implement MFI lock state machine based on globally programmed match and mismatch counters stored in CFG module Combine CXC alarms indicated on VCAT channels with MFI loss of alignment to indicate a single alarm condition to ALIG_WR module Provide current MFI value of a channel to ALIG_WR module along with data bytes (when the channel is not in alarm condition)

Provide MFI lock status on each channel to software

Capture a snapshot of the MFI values on a VCAT channel pair when requested by the CFG block Extract extended signal label on low order channels Merge VCAT packet traffic from DSQ with non-VCAT packet traffic before delivering them to IFR 7.2 Interface to CFR When ANA module gets a valid request from the CXC for a given channel, it asks the CFR for configuration of that channel. The channel is identified by an 11-bit ana_cfr_tid signal constructed based on the channel id and type signals from the CXC. The configuration information returned by CFR for the channel includes the following:

If MFI analysis is enabled on this channel or not (RX_CH_MFI_EN)

If the channel is in reset in the rest of the VCT_RX block or not (RX_CH_SW_CFG_EN)

If the channel is associated with a VCAT enabled logical port or not

The ana_cfr_tid signal is derived from CXC signals as follows:

```
If (cxc_vct_rx_sts_vt) {
    ana_alig_wr_tid = cxc_vct_rx_sts * 28 + cxc_vct_rx_grp * 4 +
    cxc_vct_rx_vt
}
Else {
    ana_cfr_tid = cxc_vct_rx_sts_master * 28
}
```

Note that ana_cfr_tid is always set based on cxc_vct_rx_sts_master. This way for a VC4-Nc contiguous concatenation group (where N>=2) carrying non-VCAT data, a single channel configuration entry is used.

The CFR passes the CH_CFG_PRTY_ERR condition as part of the configuration response to the ANA. Although this is not required by ANA to function, ANA stores this bit in its state memory. When it detects a change it will generate an interrupt to the CFG.

7.3 Interface to ALIG_WR

If the configuration result from CFR indicates that a channel belongs to a VCG, the ANA will generate a request to the ALIG_WR.

The ana_alig_wr_alm is a combination of the alarm signal that the ANA GOt from the CXC for this channel and the OOM1/2 status of that channel.

The ana_alig_wr_tid signal is derived from CXC signals as follows:

```
If (cxc_vct_rx_sts_vt) {
    ana_alig_wr_tid = cxc_vct_rx_sts * 28 + cxc_vct_rx_grp * 4 +
    cxc_vct_rx_vt
}
Else If (! cxc_vct_rx_sts_au4) {
    ana_alig_wr_tid = cxc_vct_rx_sts * 28
}
Else {
    ana_alig_wr_tid = (cxc_vct_rx_sts % 16) * 28
}
```

The ana_alig_wr_sof signal is derived from CXC signals as follows:

```
If (cxc_vct_rx_sts_vt) {
    ana_alig_wr_sof = cxc_vct_rx_vt_sof
}
Else {
    ana_alig_wr_sof = (cxc_vct_rx_row == 0) &&
    (cxc_vct_rx_col == 0)
}
```

The ana_alig_wr_ch_ctrl_prty_err and ana_alig_wr_cur_mfi signals are based on the value of the current MFI field and the parity error bit, respectively, of the state memory entry at the location indexed by the value of ana_alig_wr_tid signal.

7.4 Channel MFI Enable vs. Channel Reset

Channel MFI enable operation is independent of the channel reset operation. The channel reset does not affect the MFI state machine and MFI capture functions of the ANA module. Only MFI enable controls those functions. The ANA module uses channel reset to determine if any data should be passed through.

If MFI analysis is enabled even when the channel is in reset, the ANA processes MFI information and performs MFI capture functions. This mode is useful to measure differential delay changes that could occur on an existing VCG due to new channel addition without actually impacting data flow on that VCG. This is discussed in more detail in section 7.8.

MFI analysis may be disabled when the channel is not in reset. This would not be used under normal operation. It is useful for fast lock operation during verification. In this mode, the ANA will be initially indicating alarm condition to the ALIG_WR manager since OOM/LOM status bits are set by default (i.e. when MFI enable is not set). For fast lock operation, when the bench detects the first H4/K4 byte that should be used, it sets the RX_CH_MFI_EN with back-door write.

If the channel is reset, the ANA does not send any requests to the ALIG_WR or write any data to the non-VCAT data buffer whether RX_VCAT_MFI_EN is set or not.

If a control parity error is detected on a channel, note that both the RX_VCAT_MFI_EN and RX_CH_SW_CFG_EN bits need to be toggled. This is because the source of the parity error could be in the state memory of ANA or state memory of other modules.

7.5 Interface to CFG

ANA module interfaces to the CFG module for the following purposes:
- To send interrupt events (i.e. OOM1/2, LOM, or CFG_PRTY_ERR status of a channel has changed)
- To get the global configuration parameters used by MFI lock state machine
- To provide access to the channel MFI lock status stored in ANA module
- To receive MFI capture requests and to send captured values

7.5.1 Channel Status

The LVC provides the following channel status information to the CFG:
RX_CH_VCAT_OOM1
RX_CH_VCAT_OOM2
RX_CH_VCAT_LOM
RX_CH_ACC_ESL (only for low order channels)
RX_CH_CFG_PRTY_ERR Note that even though the ANA does not have any channel level configuration it gets the parity error condition for the channel configuration memories of the CFR and stores it in its state and state memories on behalf of the CFR. As shown below it also generates an interrupt when there is a change.

Although the channel state memory of the ANA is protected, the ANA does not provide control parity error status or generate interrupt for it. Instead, it passes the channel control parity error condition to the ALIG_WR, which will pass it to the ALIG_RD, which will then provide channel control parity error status and generate an interrupt.

7.5.2 Interrupt

The LVC generates channel interrupt status set requests to the CFG for the following events:
RX_CH_VCAT_OOM1_CHG
RX_CH_VCAT_OOM2_CHG
RX_CH_VCAT_LOM_CHG
RX_CH_ACC_ESL_CHG (only for low order channels)
RX_CH_CFG_PRTY_ERR_CHG

7.6 Interface to DSQ

ANA module gets VCAT data from DSQ to merge it with non-VCAT data before IFR. The interface from the DSQ includes the dsq_ana_tid signal that ANA uses to pull data from its internal data buffers for non-VCAT channels. This is explained below in section 7.14.

7.7 MFI Lock State Machine

Refer to the "vct_mfi_ana_uarch" document.

Note that while not in LOM, the ANA passes the expected MFI values to the ALIG_WR and not the values received in H4/K4 bytes.

7.8 MFI Capture

7.8.1 Differential Delay Measurement

During provisioning, it is necessary to determine if the differential delay between candidate member channels of a VCG can be supported given the DRAM capacity allocated for VCAT. Orion provides a mechanism to take a snapshot of the MFI values of two channels. By doing this for all appropriate member pair combinations, software can determine the maximum differential delay in the VCG.

When a new channel is to be added to a given LCAS VCG, it is desirable to determine the maximum differential delay that would be experienced in the VCG without actually associating the channel with that VCG. Doing so could impact the data flow on that VCG (potentially cause stalls at least). If an unused receive logical port were available, this channel can first be mapped to such a port when it is brought out of reset to avoid this issue. However, this may not be always possible.

The solution for this is to make the RX_CH_VCAT_MFI_EN bit independent of the RX_CH_SW_CFG_EN bit. The ANA uses the RX_CH_VCAT_MFI_EN as reset bit for all MFI analysis based functions (including extended signal label extraction). It uses the RX_CH_SW_CFG_EN bit as a reset bit only for overhead/stuff pruning, data splitting and data merging functions.

With this scheme, when differential delay measurement is to be made on a channel that is to be added to a VCG, only the RX_CH_VCAT_MFI_EN bit of that VCG will be set initially. Once delay measurement is done and it is OK to add this channel to the real VCG, the RX_CH_VCAT_SW_CFG_EN bit can be cleared.

7.8.2 Interface & Operation

When software writes to the global RX_VCAT_MFI_CAP_CHAN1/2 register in the CFG module, the CFG module will send an MFI capture request to the ANA module along with the identities of the two channels. In response, the ANA reads the MFI values it has in its state memory for these two channels based on the CXC requests and sends a done signal to the CFG along with the values it read.

The MFI analyzer does not check if the channels are in MFI lock or not when it responds to the CFG module with the MFI values of the two channels stored in its state memory. Software would check that both channels are in MFI lock before generating a capture request. However, if either of the channels goes out of MFI lock by the time ANA gets the request, the MFI value may not be valid. It is up to software to ensure that no MFI loss of lock is present after the capture is done.

Note that the MFI analyzer does not check if the channels are MFI enabled or whether they are VCAT channels. If software tries to perform a capture on such channels, it will get junk data back.

It is not possible for software to generate write requests fast enough for the CFG to send ANA a capture request while a previous one was in progress. So the ANA does not need to worry about this case.

7.9 Extended Signal Label Extraction

On low order channels, ANA extracts the extended signal label from 32-bit frames (aligned based on the 12-bit MFAS pattern) formed out of the first bit of the K4 byte. If the same value is received three times in a row on a channel, ANA writes that value as the accepted extended signal label in the status memory entry of that channel.

Extended signal label extraction on a given channel is obviously dependent on the OOM1 state of that channel. While the channel is in OOM1 state, the ANA does not perform extraction.

When in IM1 state, the ANA knows if a K4 byte is carrying an ESL bit or not based on the MFI1 counter (i.e. has to be between 11 and 18).

7.10 Configuration

The ANA module does not have any configuration parameters of its own.

7.11 State

7.11.1 Common State

The first MFI value read from channel state memory in response to an MFI capture request needs to be stored in a common register while waiting for the CXC calendar to hit the second channel.

7.11.2 Channel State

The channel state parameters are grouped into a 1344×45 dual port memory. Both write and read accesses to it are driven by CXC requests.

Some of the state parameters are applicable only to low order. Hence there are two different views of the entries in the channel state memory depending on if the entry is for a high or low order channel The RX_CH_CFG_PARITY_ERR_COPY bit stored in this memory is not really a state parameter that ANA uses. While all the other state bits are reset when RX_CH_VCAT_MFI_EN is cleared by software, this bit is reset when RX_CH_SW_CFG_EN is set.

7.11.3 High Order View of Channel State Memory Entries

The following table shows the structure of entries in this memory.

| Parameter | Size | Value after initialization or when MFI_EN (SW_CFG_EN for PRTY_ERR) of channel is set to zero (1 for PRTY_ERR) |
| --- | --- | --- |
| RX_CH_VCAT_CUR_MFI | 12 | 0 |
| RX_CH_VCAT_MFI1_STATE | 1 | 0 |
| RX_CH_VCAT_MFI1_MATCH_MISMATCH_CNT | 3 | 0 |
| RX_CH_VCAT_MFI2_STATE | 1 | 0 |
| RX_CH_VCAT_MFI2_MISMATCH | 1 | 0 |
| RX_CH_VCAT_MFI2_MATCH_MISMATCH_CNT | 3 | 0 |
| RX_CH_VCAT_LOM_FRM_CNT | 8 | 0 |
| RX_CH_CFG_PRTY_ERR_COPY | 1 | 0 |
| Unused | 14 | 0 |
| Odd parity | 1 | 1 |

7.11.4 Low Order View of Channel State Memory Entries

| Parameter | Size | Value after initialization or when MFI_EN (SW_CFG_EN for PRTY_ERR) of channel is set to zero (1 for PRTY_ERR) |
| --- | --- | --- |
| RX_CH_VCAT_CUR_MFI | 10 | 0 |
| RX_CH_VCAT_MFI1_STATE | 4 | 0 |
| RX_CH_VCAT_MFI1_MATCH_MISMATCH_CNT | 3 | 0 |
| RX_CH_VCAT_MFI2_STATE | 1 | 0 |
| RX_CH_VCAT_MFI2_MISMATCH | 1 | 0 |
| RX_CH_VCAT_MFI2_MATCH_MISMATCH_CNT | 3 | 0 |
| RX_CH_VCAT_LOM_FRM_CNT | 8 | 0 |
| RX_CH_LAST_ESL_RPT_CNT | 4 | 0 |
| RX_CH_LAST_ESL_RCVD | 8 | 0 |
| RX_CH_ESL_MISMATCH | 1 | 0 |
| RX_CH_CFG_PRTY_ERR_COPY | 1 | 0 |
| Odd parity | 1 | 1 |

7.12 Status

The status parameters related to MFI capture are kept in the CFG block since they are global.

The channel status parameters are grouped into a 1344×12 dual port memory.

| Parameter | Size | Value after initialization or when MFI_EN (SW_CFG_EN for PRTY_ERR) of channel is set to zero (1 for PRTY_ERR) |
|---|---|---|
| RX_CH_VCAT_OOM1 | 1 | 1 |
| RX_CH_VCAT_OOM2 | 1 | 1 |
| RX_CH_VCAT_LOM | 1 | 1 |
| RX_CH_ACC_ESL | 8 | 0[1] |
| RX_CH_CFG_PRTY_ERR | 1 | 0 |

Note 1:
This parameter is applicable only to low order channels. Also, if the channel is in OOM1 state, its value will not be valid.

7.13 Non-VCAT Channel Data Buffer

The Non-VCAT channel data buffer is implemented using two memories. The first one is a 1344×8 dual port memory that is shared between low order channels and high order channels except for VC4. The second one is a 256×8 dual port memory that is used for VC4 channels.

A separate memory is used for VC4 channels because it makes it easier to implement a single FIFO view for VC4-Nc applications. A single FIFO view is required for the VC4-Nc (N>=2) case to support the scenario where the receive framers are configured in 4xOC-3/12 mode. In this case, the CXC would present the bytes received on different framers to the VCT_RX block in an interleaved fashion. However, the 1x calendar used in the VCT_RX to pull non-VCAT data from the ANA assumes that the VC4 channels are interleaved as if on an OC-48 line. Without the use a single FIFO for a given VC4-Nc, this could cause data ordering to be corrupted when the CXC does not provide a byte during a timeslot for that VC4-Nc (i.e. an idle slot).

The memory for VC4 channels is used to implement 16 FIFOs, each 16 bytes deep, to handle all possible VC4-Nc combinations (including N=1 so as not to create a special case).

Writes to both memories are driven by CXC requests. For high-order timeslots associated with VC4 channels (i.e. sts_vt=0, sts_vc4=1 from the CXX), the ANA uses the VC4 buffer memory. The CXC indicates the master STS channel id of a slave STS within a VC4-Nc (N>=1). The ANA can use this to determine which VC4 FIFO to write the data to.

The reads from the buffer memories are driven by the DSQ, which in turn is driven by the 1x calendar. For timeslots associated with VC4 channels, the ANA cannot determine which FIFO to use in the VC4 buffer memory from the TID provided by the DSQ. The ANA keeps track of the information provided by the CXC to determine this. The ANA stores one bit for each VC4 to indicate if that VC4 is a slave or master of a VC4-Nc. For a slave VC4, the id of the master VC4 can be determined from these state bits.

Note that a VC4 channel in VCT_RX have to be brought out of reset after at least one calendar rotation from the time that the channel is brought out of reset on basic SDH receive side (including CXC). This is necessary because of the VC4 master state bits that ANA stores must be set before we attempt to read from the VC4 data buffer.

The ANA pipeline shall provide bypass for read and write collisions for the single byte buffers to avoid overflow. The ANA uses 1344 flops to have a data valid bit per channel. When a channel is reset (RX_CH_SW_CFG_EN is set), its data valid bit shall be cleared.

It is not necessary to provide read and write bypass for the 16-byte VC4 FIFOs.

7.14 Merging VCAT and Non-VCAT Data

Merging of VCAT and Non-VCAT data is driven by the dsq_ana_tid signal from the de-sequencer (DSQ). The ANA reads the non-VCAT data buffer corresponding to the value of this signal. If the dsq_ana_vld is not asserted and the non-VCAT data buffer is not empty, then the data from the VCAT data buffer is passed to the IFR. If the dsq_ana_vld is asserted, then the dsq_ana_data is passed to the IFR. In both cases, the data is qualified using the dsq_ana_lpid as the LPID. If the dsq_ana_vld is not asserted and the non-VCAT data buffer is empty, no data is passed to IFR.

Note that to prevent overflow of the non-VCAT data buffer, we ensure that when the VCT_RX block comes out of reset, all channels will be in reset (RX_CH_SW_CFG_EN=1) initially.

8 LCAS/VC Controller (LVC)

8.1 Overview

Figure 6:
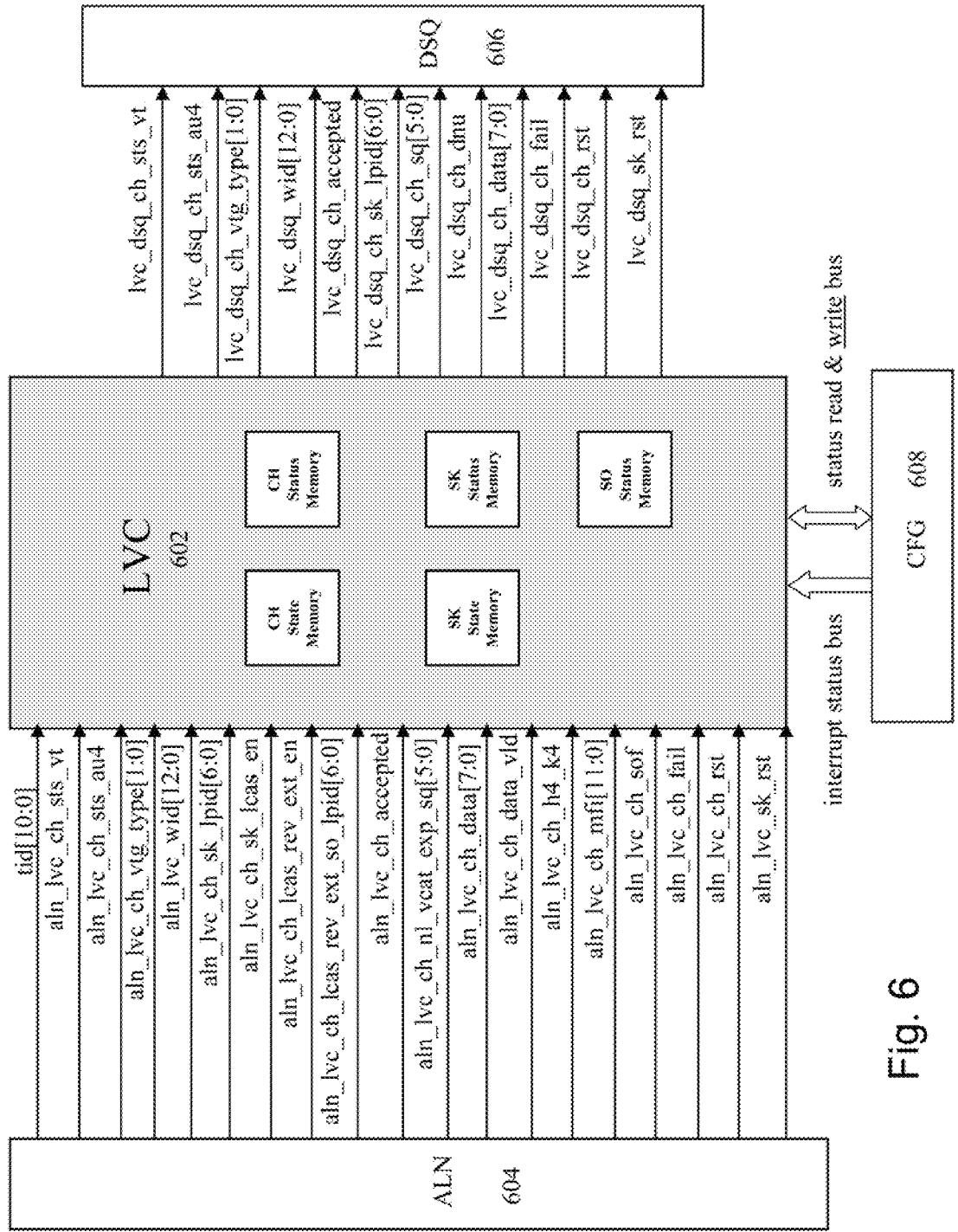
FIG. 6 is an illustration of an LVC.

Referring to FIG. 6, an LVC 602 is illustrated, which interfaces with the alignment module (ALN), the configuration (CFG) 608 and the desequencer 606. The LVC includes a CH state memory, a CH status memory, a SK state memory, a SK Status memory and a SO status memory. The LVC module interfaces to the ALIG_RD, DSQ and CFG modules. The basic functions of the LVC module are as follows:

- Extract forward control information (SQ and CTRL in LCAS case) from H4/K4 bytes
- Extract LCAS reverse control information from H4/K4 bytes
- Perform CRC check on LCAS control packets
- Perform dCRC set/clear function for each LCAS VCG
- Perform GID check on LCAS VCGs
- Capture GID values received by members of a given LCAS VCG
- Synchronize control (i.e. sequence) and data passed to the DSQ
- Handle LCAS channel reset and failure conditions based on accepted configuration of channels
- Detection of non-LCAS source while sink is configured as LCAS FIG. 4G: LVC Module

8.2 Interface To ALIG_RD

The ALIG_RD provides the following configuration and control information to the LVC in each clock cycle along with the id of the channel (i.e. TID), whether or not a valid data (not just payload but also H4/K4) byte is available to pass to the LVC on that channel in that cycle.

8.2.1 Configuration Information

Since all the configuration memories in the VCT_RX block are maintained in the CFR module, the CFR module needs to pipe the configuration (with the exception of RX_SHORT_FRAME_EN) that LVC and downstream DSQ needs to the LVV through the ALIG_RD. For each request from the ALIG_RD to the LVC for a given channel, the LVC needs the following configuration parameters that relate to that channel for its own operation:

RX_CH_STS_VT
RX_CH_SK_LPID
RX_SK_LCAS_EN
RX_CH_NL_VCAT_EXP_SQ
RX_CH_VCAT_ACCEPTED
RX_CH_LCAS_REV_REV_EN
RX_CH_LCAS_REV_REV_SO_LPID

The following calendar information that is required only by the DSQ buffer flipping also needs to be provided to the VLC so that it can pipe them to the DSQ. The VLC just passes these parameters through without any processing. This is not to say that these are the only parameters passed to the DSQ.

RX_WID
RX_CH_VC4
RX_CH_STS_VTG_TYPE

The above calendar and configuration information shall be provided to the LVC even when a channel is in fail state.

The DSQ needs to invalidate the current write buffer when an accepted member channel enters fail or reset state. In order to do so, the RX_SK_LPID configuration parameter needs to be passed to the DSQ at least in the first clock cycle that a member channel enters reset state. When software resets a channel, before changing the configuration of that channel, it should wait long enough for the DSQ to see a channel reset on that channel.

The CFR passes configuration and fail information for non-VCAT channels to the ALIG_RD, which does not know if a channel is a VCAT channel or not. But note that the channel fail condition will never be set for such channels since the ALIG_WR never writes to DRAM for a non-VCAT channel and the ALIG_RD will never read any data from DRAM. The ALIG_RD will simply never have valid data for these channels to provide to the LVC but it will still pipe the calendar and channel configuration to the LVC.

Note that CFR turns VCG fail into channel fail for all member channels. Channel and VCG reset are passed separately to LVC through ALIG_RD.

8.2.2 Control Information

The ALIG_RD provides the following control information to the ALIG_RD in every clock cycle:

Data valid
Channel fail condition
Channel reset condition
Sink port reset condition
H4/K4 byte indication
HO/LO MFI
SOF The H4/K4 byte indication, HO/LO MFI and SOF is only meaningful when data valid is true and channel is not in reset/fail state.

The HO/LO MFI counters should be provided not only in H4/K4 byte clock cycles but also in SOF clock cycles (or in general in all clock cycles when a channel is not in failure)

8.2.2.1 H4

The ALIG_RD sets the H4/K4 indication bit to the VLC when the current channel is a high order channel and the current byte is an H4 byte for that channel. All other bytes for high order channels are payload bytes since TOH, other HO POH and stuff bytes in the STS-1 frame are stripped before writing its content to DRAM.

For an VC4/STS-3c type VCG, the ALIG_RD passes the H4 byte only for the master STS-1 to the LVC.

8.2.2.2 K4

The ALIG_RD sets the H4/K4 indication bit to the VLC when the current channel is a low order channel and the current byte is a K4 byte for that channel. All other bytes for low order channels are payload bytes since TOH, other HO/LO POH, and stuff bytes in a VT mapped the STS-1 frame are stripped before writing its content to DRAM.

8.3 Interface to DSQ

The LVC provides the following calendar, configuration and control information to the DSQ in each clock cycle along with a payload byte, if any.

8.3.1 Calendar & Configuration Information

RX_CH_STS_VT
RX_CH_STS_VTG_TYPE
RX_CH_VC4
RX_WID (The concatenated positions of all wheels)
RX_CH_SK_LPID
RX_SK_VCAT_EN Note LVC does not use the RX_CH_STS_VTG_TYPE, RX_CH_VC4 and RX_WID information; it just passes them to the DSQ without any processing, which uses them for buffer flipping.

The structure of the 13-bit RX_WID signal is as follows:

| VC4_WID | VC3_WID | VC2_WID | VC11_WID | WC12_WID |
|---------|---------|---------|----------|----------|
| (4)     | (2)     | (3)     | (2)      | (2)      |

8.3.2 Control Information

Payload data valid
Channel fail condition
Channel reset condition
DNU
SQ

8.4 Interface to CFG

The LVC generates interrupt status set requests to the CFG. The CFG directs software status read (and write in the case of source port status memory) requests to the LVC.

8.4.1 Status

The LVC provides the following status information to the CFG:

RX_CH_LCAS_SQ/RX_CH_NL_VCAT_ACC_SQ (different views)
RX_CH_LCAS_CTRL
RX_CH_LCAS_CRC_ERR
RX_CH_NL_VCAT_SQM
RS_SK_LCAS_GID_ERR
RX_SO_LCAS_MST
RX_SO_LCAS_RS_ACK

8.4.2 Interrupt Status

The LVC generates interrupt status set requests to the CFG for the following events:

RX_CH_LCAS_SQ_CHG/RX_CH_NL_VCAT_ACC_SQ_CHG
RX_CH_LCAS_CTRL_CHG
RX_CH_LCAS_ERR_CHG
RX_CH_LCAS_NL_SRC_CHG
RX_CH_NL_VCAT_SQM_CHG
RX_SK_LCAS_GID_ERR_CHG
RX_SO_LCAS_MST_CHG
RX_SO_LCAS_RS_ACK_CHG

8.5 State and Status Parameters

All of the state and status memories are dual ported. State memories are accessed only by hardware.

One port of the status memories is dedicated for CPU access. Note that CPU needs to write to the source port status memory to initialize it. If a status read request from software collides with a write request from hardware, new values from the write request are passed as read results.

In the case of source port status memory, if a status write from software collides with a status write request from hardware, then software values should be written to memory. This should not happen with proper software behavior (software should disable LCAS reverse control information for that source port before), but hardware should be ready to deal with a collision.

Hardware will not access the same channel state memory entry more than once every 16-clock cycles (for STS-3c VCGs). Similarly, hardware will not write to the same channel status memory entry more than once every 16-clock cycles. The micro-architecture design can take advantage of this if necessary.

The channel state and status memory entries have a different view depending if a channel is mapped to an LCAS or non-LCAS VCG. Note that the reset values are such that the parity is the same for both cases. Actually, to do this for the status memories, a dummy bit is used.

The port level state and status parameters are applicable for port configured for LCAS only.

Detailed descriptions on how these memories are used by hardware are provided in the following sections.

8.5.1 Channel State

The channel state parameters are grouped into 1344×40 dual-port memory, shared by high order and low order channels. The following tables show LCAS and non-LCAS view of the entries in this memory.

8.5.1.1 LCAS View of Channel State Memory Entries

| Parameter | Size | Value after initialization or channel reset |
|---|---|---|
| RX_CH_LCAS_NEXT_SQ | 8 | 0[1] |
| RX_CH_LCAS_SQ_CHG | 1 | 0 |
| RX_CH_LCAS_NEXT_CTRL | 6 | 0[1] |
| RX_CH_LCAS_CTRL_CHG | 1 | 0 |
| RX_CH_LCAS_CRC_ALIGNED | 1 | 0 |
| RX_CH_LCAS_CRC_VLD | 1 | 0 |
| RX_CH_LCAS_CRC | 8 | 0 |
| RX_CH_LCAS_CRC_ERR_COPY | 1 | 0[1] |
| RX_CH_LCAS_GID | 1 | 0[1] |
| RX_CH_LCAS_MST | 8 | 0[1] |
| RX_CH_LCAS_MST_CHG | 1 | 0[1] |
| RX_CH_LCAS_RS_ACK | 1 | 0[1] |
| RX_CH_LCAS_RS_ACK_CHG | 1 | 0[1] |
| RX_CH_LCAS_ZERO_CRC | 1 | 0[1] |
| RX_CH_LCAS_NL_SRC_COPY | 1 | 0[1] |
| Odd parity | 1 | 0 |

Note 1:
These parameters do not need to have an initial value for operational purposes. However, for parity protection, they are set to zeroes.

8.5.1.2 Non-LCAS View of Channel State Memory Entries

| Parameter | Size | Value after initialization or channel reset |
|---|---|---|
| RX_CH_NL_VCAT_PREV_SQ | 8 | 0[1] |
| RX_CH_NL_VCAT_PREV_SQ_MATCH | 1 | 0 |
| RX_CH_NL_VCAT_PREV_SQ_RPT_CNT | 2 | 0 |
| RX_CH_NL_VCAT_SQM_COPY | 1 | 1 |
| RX_CH_NL_VCAT_ACC_SQ_CHG | 1 | 0 |
| Unused | 26 | 0 |
| Odd parity | 1 | 0 |

Note 1:
These parameters do not need to have an initial value for operational purposes. However, for parity protection, they are set to zeroes.

8.5.2 Channel Status

The channel status parameters are grouped into 1344×15 dual-port memory, shared by high order and low order channels. The following tables show LCAS and non-LCAS view of the entries in this memory.

8.5.2.1 LCAS View of Channel Status Memory Entries

| Parameter | Size | Value after initialization or channel reset |
|---|---|---|
| RX_CH_LCAS_CUR_SQ | 8 | 0 |
| RX_CH_LCAS_CUR_CTRL | 4 | IDLE (0x5) |
| RX_CH_LCAS_CRC_ERR | 1 | 0 |
| RX_CH_LCAS_NL_SRC | 1 | 0 |
| Unused | 1 | 1 |

In the case of LCAS VCGs, software always reads from channel status memory to determine the sequence and control fields received on a channel. This is important since unlike the VCT_TX block, LCAS control information changes do not happen under the control of the software and it would be difficult for software to first determine which memory has the new forward control information for a given channel/VCG.

8.5.2.2 Non-LCAS View of Channel Status Memory Entries

| Parameter | Size | Value after initialization or channel reset |
|---|---|---|
| RX_CH_NL_VCAT_ACC_SQ | 8 | 0 |
| RX_CH_NL_VCAT_SQM | 1 | 1 |
| Unused | 6 | 0 |

8.5.3 Sink Port State

The sink port state parameters are implemented using 128×3 flops.

| Parameter | Size | Value after initialization or sink port reset |
|---|---|---|
| RX_SK_LCAS_GID_VLD | 1 | 0 |
| RX_SK_LCAS_GID | 1 | Undefined |
| RX_SK_LCAS_GID_MFI2_LSB | 1 | Undefined |
| RX_SK_LCAS_GID_ERR_COPY | 1 | 0 |

8.5.4 Sink Port Status

The sink port status parameters are implemented using 128×1 flops.

| Parameter | Size | Value after initialization or sink port reset |
|---|---|---|
| RX_SK_LCAS_GID_ERR | 1 | 0 |

8.5.5 Source Port Status

The source port status parameters are grouped into 128×65 dual-port memory. The table below shows the structure of the entries in this memory.

| Parameter | Size | Value after initialization |
|---|---|---|
| RX_SO_LCAS_MST | 64 | Undefined[1] |
| RX_SO_LCAS_RS_ACK | 1 | Undefined[1] |

Note
[1] These parameters do not need to have an initial value for operational purposes. There is no source port reset but software can write the initial values.

8.6 Operation for Non-VCAT Channels

For non-VCAT channels, the ALIG_RD will never have valid data for the LVC. However, the sink port LPID and the accepted configuration of the channel will be passed to the LVC along with the channel type and calendar information. Since there will be no valid data, the LVC will not perform any status or state update operations either for the channel, or associated sink port and (dummy) source port.

8.7 LCAS Operation

LCAS operations are performed if the aln_rd_lv_ch_sk_lcas_en signal is asserted in a given clock cycle. In this section, we assume this is the case and do not explicitly show it as part of conditions for updating state and status information.

We divide specification of LCAS operations into the following two areas:

- Updating of state and status information
- Passing of control information and payload data to the DSQ We also describe handling of resets/failures in detail.

8.7.1 State and Status Update

8.7.1.1 High Order

Table 8-1 specifies the LCAS state and status update operations performed by LVC for high order channels (we assume ALIG_RD_STS_VT is false).

TABLE 8-1

| LCAS State/Status Update Operations On HO Channels | |
|---|---|
| Timeslot type | HO LCAS State and Status Update Operations |
| SOF-LCP Payload | |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_SOF && (ALIG_RD_LVC_MFI[3:0] == 8) | Read CH_LCAS_CRC_VLD, CH_LCAS_CRC_ERR_COPY, CH_LCAS_NEXT_SQ and CH_LCAS_NEXT_CTRL<br>If (CH_LCAS_CRC_VLD && ~CH_LCAS_CRC_ERR_COPY) {<br>    CH_LCAS_CUR_SQ = CH_LCAS_NEXT_SQ<br>    CH_LCAS_CUR_CTRL = CH_LCAS_NEXT_CTR<br>    Write CH_LCAS_CUR_SQ and CH_LCAS_CUR_CTRL<br>} |
| Non-SOF-LCP Payload | |
| ~ALIG_RD_LVC_CH_RST && ~ALIG_RD_LVC_CH_FAIL && ~ALIG_RD_LVC_SK_RST && ALIG_RD_LVC_DATA_VLD && ~ALIG_RD_LVC_SOF && ~ALIG_RD_LVC_H4_K4 MST[7:4] | Read CH_LCAS_CUR_CTRL, CH_LCAS_CUR_SQ |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 8) MST[3:0] | Read CH_LCAS_CRC<br>CH_LCAS_CRC = NEXT_CRC8 (CH_LCAS_CRC, ALIG_RD_LVC_H4_K4[7:4])<br>CH_LCAS_MST[7:4] = ALIG_RD_LVC_H4_K4[7:4]<br>CH_LCAS_CRC_ALIGNED = 1<br>CH_LCAS_CRC_VLD = 1<br>Write CH_LCAS_CRC, CH_LCAS_CRC_ALIGNED, CH_LCAS_CRC_VLD, CH_LCAS_MST[7:4] |
| ~ALIG_RD_LVC_CH_RST && ~ALIG_RD_LVC_CH_FAIL && ~ALIG_RD_LVC_SK_RST && ALIG_RD_LVC_DATA_VLD && | Read CH_LCAS_CRC, CH_LCAS_MST[7:4] and SO_LCAS_MST<br>CH_LCAS_CRC = NEXT_CRC8 (CH_LCAS_CRC, ALIG_RD_LVC_H4_K4[7:4])<br>CH_LCAS_MST[3:0] = ALIG_RD_LVC_H4_K4[7:4]<br>CH_LCAS_MST_CHG = 0<br>If (ALIG_RD_LVC_MFI[8:7] == 0) {<br>    MST_CHUNK_LSB_POS = { ALIG_RD_LVC_MFI[6:0], 3'b0}<br>    MST_CHUNK_MSB_POS = MST_CHUNK_LSB_POS + 7 |

TABLE 8-1-continued

LCAS State/Status Update Operations On HO Channels

| Timeslot type | HO LCAS State and Status Update Operations |
|---|---|
| ALIG_RD_LVC_H4_K4 && (ALIG_RD_LVC_MFI[3:0] == 9) <br><br><br><br><br>RS_ACK | If (SO_LCAS_MST[MST_CHUNK_MSB_POS:MST_CHUNK_LSB_POS] != CH_LCAS_MST) { <br>    CH_LCAS_MST_CHG = 1 <br>  } <br>} <br>Write CH_LCAS_CRC, CH_LCAS_MST[3:0] and CH_LCAS_MST_CHG |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 10) <br>Reserved | Read CH_LCAS_CRC and SO_LCAS_RS_ACK <br>CH_LCAS_CRC = NEXT_CRC8 (CH_LCAS_CRC, ALIG_RD_LVC_H4_K4[7:4]) <br>CH_LCAS_RS_ACK = ALIG_RD_LVC_H4_K4[4] <br>CH_LCAS_RS_ACK_CHG = (CH_LCAS_RS_ACK != SO_LCAS_RS_ACK) <br>Write CH_LCAS_CRC, CH_LCAS_RS_ACK and CH_LCAS_RS_ACK_CHG |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] >= 11) && (ALIG_RD_LVC_MFI[3:0] <= 13) <br>SQ[7:4] | Read CH_LCAS_CRC <br>CH_LCAS_CRC = NEXT_CRC8 (CH_LCAS_CRC, ALIG_RD_LVC_H4_K4[7:4]) <br>Write CH_LCAS_CRC |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 14) <br>SQ[3:0] | Read CH_LCAS_CRC <br>CH_LCAS_CRC = NEXT_CRC8 (CH_LCAS_CRC, ALIG_RD_LVC_H4_K4[7:4]) <br>CH_LCAS_NEXT_SQ[7:4] = ALIG_RD_LVC_H4_K4[7:4] <br>Write CH_LCAS_CRC, and CH_LCAS_NEXT_SQ[7:4] |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 15) <br>MFI2 | Read CH_LCAS_CRC, CH_LCAS_NEXT_SQ, CH_CUR_SQ <br>CH_LCAS_CRC = NEXT_CRC8 (CH_LCAS_CRC, ALIG_RD_LVC_H4_K4[7:4]) <br>CH_LCAS_NEXT_SQ[3:0] = ALIG_RD_LVC_H4_K4[7:4] <br>CH_LCAS_SQ_CHG = (CH_LCAS_NEXT_SQ != CH_LCAS_CUR_SQ) <br>Write CH_LCAS_CRC, CH_LCAS_NEXT_SQ[3:0] and CH_LCAS_CTRL_CHGG |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_O_MFI1 >= 0) && (ALIG_RD_LVC_MFI[3:0] <= 1) <br>CTRL | Read CH_LCAS_CRC <br>CH_LCAS_CRC = NEXT_CRC8 (CH_LCAS_CRC, ALIG_RD_LVC_H4_K4[7:4]) <br>Write CH_LCAS_CRC |
| ~ALIG_RD_LVC_CH_RST && | Read CH_LCAS_CRC, CH_LCAS_CUR_CTRL <br>CH_LCAS_CRC = NEXT_CRC8 (CH_LCAS_CRC, |

TABLE 8-1-continued

LCAS State/Status Update Operations On HO Channels

| Timeslot type | HO LCAS State and Status Update Operations |
|---|---|
| ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 2) GID | ALIG_RD_LVC_H4_K4[7:4]) CH_LCAS_NEXT_CTRL = ALIG_RD_LVC_H4_K4[7:4] CH_LCAS_CTRL_CH = (CH_LCAS_NEXT_CTRL != CH_LCAS_CUR_CTRL) Write CH_LCAS_CRC, CH_LCAS_NEXT_CTRL and CH_LCAS_CTRL_CHG |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 3) Reserved | Read CH_LCAS_CRC CH_LCAS_CRC = NEXT_CRC8 (CH_LCAS_CRC, ALIG_RD_LVC_H4_K4[7:4]) CH_LCAS_GID = ALIG_RD_LVC_H4_K4[4] Write CH_LCAS_CRC and CH_LCAS_GID |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (MFI[3:0] >= 4) && (MFI[3:0] <= 5) CRC[7:4] | Read CH_LCAS_CRC CH_LCAS_CRC = NEXT_CRC8 (CH_LCAS_CRC, ALIG_RD_LVC_H4_K4[7:4]) Write CH_LCAS_CRC |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (MFI[3:0] == 6) | Read CH_LCAS_CRC CH_LCAS_CRC = NEXT_CRC8 (CH_LCAS_CRC, ALIG_RD_LVC_H4_K4[7:4]) CH_LCAS_ZERO_CRC = (ALIG_RD_LVC_H4_K4[7:4] == 0) Write CH_LCAS_CRC and CH_LCAS_ZERO_CRC |
| | Read CH_LCAS_CRC_ALIGNED, CH_LCAS_CRC_VLD, CH_LCAS_CRC, CH_LCAS_CRC_ERR_COPY, CH_LCAS_NEXT_SQ, CH_LCAS_SQ_CHG, CH_LCAS_NEXT_CTRL, CH_LCAS_CTRL_CHG, CH_LCAS_MST, CH_LCAS_MST_CHG, CH_LCAS_RS_ACK, CH_LCAS_RS_ACK_CHG, CH_LCAS_GID, CH_LCAS_ZERO_CRC, CH_LCAS_NL_SRC_COPY, SK_LCAS_GID_VLD, SK_LCAS_GID, SK_LCAS_GID_MFI2_LSB, SK_LCAS_GID_ERR, LCAS_GID_CAP_VLD, LCAS_GID_CAP_PORT, LCAS_GID_CAP_STARTED, LCAS_GID_CAP_START_MFI2_LSB, LCAS_GID_CAP_STOP_MFI2_LSB, CH_LCAS_GID_CAP_IDX CH_LCAS_CRC = NEXT_CRC8 (CH_LCAS_CRC, ALIG_RD_LVC_H4_K4[7:4]) If (~CH_LCAS_CRC_ALIGNED) {   CH_LCAS_CRC_ALIGNED = 1 } Else If (~CH_LCAS_CRC_VLD) {   CH_LCAS_CRC_VLD = 1 } // CRC Count Capture If (LCAS_CRC_CNT_CAP_VLD = If (CH_LCAS_CRC_VLD) {   CH_LCAS_CRC_ERR = (CH_LCAS_CRC != 0)   If (CH_LCAS_CRC_ERR == 0) {     If (CH_LCAS_SQ_CHG) { |

TABLE 8-1-continued

LCAS State/Status Update Operations On HO Channels

| Timeslot type | HO LCAS State and Status Update Operations |
|---|---|
| | Generate CH_LCAS_SQ_CHG interrupt for this channel<br>}<br>If (CH_LCAS_CTRL_CHG) {<br>  Generate CH_LCAS_SQ_CHG interrupt for this channel<br>}<br>If (CH_LCAS_LCAS_REV_EXT_EN) {<br>  MST_CHUNK_LSB_POS = {ALIG_RD_LVC_MFI[2:0], 3'b0}<br>  MST_CHUNK_MSB_POS = MST_CHUNK_LSB_POS + 7<br>  SO_LCAS_MST[MST_CHUNK_MSB_POS:MST_CHUNK_LSB_POS] = CH_LCAS_MST |
| Channel Fail Only | |
| ALIG_RD_LVC_CH_FAIL | CH_LCAS_CRC_ALIGNED = 0<br>CH_LCAS_CRC_VLD = 0<br>CH_LCAS_CRC = 0<br>Write CH_LCAS_CRC_ALIGNED, CH_LCAS_CRC_VLD and CH_LCAS_CRC |
| Channel Reset | |
| ALIG_RD_LVC_CH_RST | CH_LCAS_CRC_ALIGNED = 0<br>CH_LCAS_CRC_VLD = 0<br>CH_LCAS_CRC = 0<br>CH_LCAS_CRC_ERR = 0<br>CH_LCAS_CRC_ERR_COPY = 0<br>CH_LCAS_NL_SRC = 0<br>CH_LCAS_NL_SRC_COPY = 0<br>CH_LCAS_CUR_CTRL = IDLE<br>Write CH_LCAS_CRC_ALIGNED, CH_LCAS_CRC_VLD, CH_LCAS_CRC, CH_LCAS_CRC_ERR, CH_LCAS_NL_SRC, CH_LCAS_NL_SRC_COPY and CH_LCAS_CUR_CTRL |
| Sink Port Reset | |
| ALIG_RD_LVC_SK_RST && ~ALIG_RD_LVC_CH_RST | SK_LCAS_GID_VLD = 0<br>SK_LCAS_GID_ERR = 0<br>Write SK_LCAS_GID_VLD and SK_LCAS_GID_ERR |

Based on the update operation specifications in Table 8-1, Table 8-2 summarizes the memory access requirements to update the state and status memories for LCAS operation for high order channels. It should be noted, for any type of request from ALIG_RD, hardware does not need to access the status memories for both reading and writing. Therefore, one port of the status memories can be dedicated for CPU access. If software tries to read a status memory entry at the same time that hardware is trying to update it, the value about to be written by hardware should be passed to the software.

TABLE 8-2

Memory Access Patterns For LCAS State/Status Update Operations on HO Channels

| Timeslot Type | Hardware Memory Access Pattern For LCAS HO | | |
|---|---|---|---|
| | Channel State | Channel Status | Source Port Status |
| SOF-LCP Payload | | | |
| ~ALIG_RD_LVC_CH_RST &&<br>~ALIG_RD_LVC_CH_FAIL &&<br>~ALIG_RD_LVC_SK_RST &&<br>ALIG_RD_LVC_DATA_VLD &&<br>ALIG_RD_LVC_SOF &&<br>(ALIG_RD_LVC_MFI[3:0] == | R | W | — |
| 8)<br>Non-SOF-LCP Payload | | | |
| ~ALIG_RD_LVC_CH_RST &&<br>~ALIG_RD_LVC_CH_FAIL &&<br>~ALIG_RD_LVC_SK_RST &&<br>ALIG_RD_LVC_DATA_VLD &&<br>~ALIG_RD_LVC_SOF &&<br>~ALIG_RD_LVC_H4_K4<br>MST[7:4] | — | R | — |
| ~ALIG_RD_LVC_CH_RST &&<br>~ALIG_RD_LVC_CH_FAIL &&<br>~ALIG_RD_LVC_SK_RST &&<br>ALIG_RD_LVC_H4_K4 &&<br>(MFI[3:0] == 8)<br>MST[3:0], RS_ACK | RW | — | — |
| ~ALIG_RD_LVC_CH_RST &&<br>~ALIG_RD_LVC_CH_FAIL &&<br>~ALIG_RD_LVC_SK_RST &&<br>ALIG_RD_LVC_DATA_VLD &&<br>ALIG_RD_LVC_H4_K4 && | RW | — | R |

TABLE 8-2-continued

Memory Access Patterns For LCAS State/Status Update Operations on HO Channels

| Timeslot Type | Hardware Memory Access Pattern For LCAS HO | | |
|---|---|---|---|
| | Channel State | Channel Status | Source Port Status |
| (ALIG_RD_LVC_MFI[3:0] >= 9) && (ALIG_RD_LVC_MFI[3:0] <= 10) Reserved, SQ[7:4] | | | |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] >= 11) && (ALIG_RD_LVC_MFI[3:0] <= 14) SQ[3:0] | RW | — | — |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 15) MFI2 | RW | R | — |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] >= 0) && (ALIG_RD_LVC_MFI[3:0] <= 1) CTRL | RW | — | — |
| ~ALIG_RD_LVC_CH_RST && ~ALIG_RD_LVC_CH_FAIL && ~ALIG_RD_LVC_SK_RST &&ALIG_RD_LVC_DATA_VLD && ALIG_RD_LVC_H4_K4 && (ALIG_RD_LVC_MFI[3:0] == 2) GID, Reserved, CRC[7:4] | RW | R | — |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] >= 3) && (ALIG_RD_LVC_MFI[3:0] <= 6) CRC[3:0] | RW | — | — |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 7) Channel Fail | RW | W | W |
| ALIG_RD_LVC_CH_FAIL Channel Reset | W | — | — |
| ALIG_RD_LVC_CH_RST Sink Port Reset | W | W | — |
| ALIG_RD_LVC_SK_RST && ~ALIG_RD_LVC_CH_RST | — | — | — |

Note that the tables above show that either a read or write access is happening to a status memory for a given request from ALIG_RD. In order for design to work with hardware using a single port of the dual port status memories, the read or write access to a given status memory needs to happen in the same pipeline stage. The following table shows an example of this.

TABLE

Example LVC Pipeline

| Req. From ALIG_RD | Rd. Req. To Ch. State Mem. | -------→ | Ch. State Ava. | Rd/Wr Req. To Ch. Status Mem. | -------→ | CH. Status Ava. | Wr. Req. To Ch. State Mem. |
| | | | | Rd/Wr Req. To So. Status Mem. | -------→ | So. Status Ava. | |

Note that the channel state memory is storing information about whether forward or reverse information has changed. Therefore, its update has to wait until these memories are read. At the same time, the decision to whether to write to the status memory has to wait until the state memory is read and CRC calculation is performed. Since read and write access to the status memories need to be lined up, it can be seen that the order of memory accesses in the pipeline must be as shown above.

8.7.1.1.1 CRC Check

When a VCG gets aligned after initialization or after recovery from a VC failure, the ALIG_RD will pass data to the VLC always starting at a frame boundary. However, that frame may not correspond to the frame where an LCAS control packet starts (i.e. HO_MFI1 is 8) or the channel may come out of reset after the H4 byte is received in that frame. If that's the case, the VLC needs to wait for the beginning of an LCAS control packet before performing CRC checks. For each channel, a CH_LCAS_CRC_ALIGNED state bit is used for this purpose.

If a channel came out of reset/failure such that the first H4 byte it saw was not for HO_MFI1=8, then the channel will have to wait till the H4 byte for HO_MFI1 is 7 before the CH_LCAS_CRC_ALIGned bit is set. But at this point there would not be a valid CRC yet. So any LCAS control packet fields that have been extracted cannot be used. Once a complete LCAS control packet is processed, CH_LCAS_CRC_VLD state variable will be set.

When the LVC is initialized, the CH_LCAS_CRC_ALIGNED and CH_LCAS_CRC_VLD state bits of all channels are cleared. During normal operation, when a VCG is reset or a failure is indicated on it, the LVC clears the CH_LCAS_CRC_ALIGNED and CH_CRC_VLD bits of that channel. Section 8.7.2 provides more information on reset and failure handling.

Whenever an H4 byte is received for a given channel, LVC reads the CH_LCAS_CRC state variable for that channel and computes the next value of the LCAS_CRC variable based on the high nibble of the received H4 byte. If the ALIG_RD indicates HO_MFI1 value of 15 and the CH_LCAS_CRC_ALIGNED is already set, then the LVC checks to see that the updated LCAS_CRC value is equal to zero or not. If not, this indicates that a CRC error has happened. In either case, the LVC sets the CH_LCAS_CRC state variable to zero to prepare for the next LCAS control packet.

At the end of CRC check, before updating the CH_LCAS_CRC_ERR status bit, the LVC reads the current value of CH_LCAS_CRC_ERR_COPY state bit to see there is a change from the previous value. If so, CH_LCAS_CRC_ERR_CHG interrupt request is sent to the CFR for this channel.

Note that the reason for keeping a copy of the CH_LCAS_CRC_ERR status bit in the channel state memory is to avoid having to read the status memory to determine if an interrupt request should be generated or not.

The LCAS_CRC_ERR status variable and its mirroring CH_LCAS_CRC_ERR_COPY state variable are initialized to zeros. When a channel goes into reset/fail condition, these variables are reset as well.

8.7.1.1.2 Persistent CRC Defect Check (dCRC)

Persistent CRC defects are counted at VCG level using moving windows. The sizes of the set/clear windows and set/clear thresholds are fixed globally for all VCGs. The window length is specified in terms of number of multi-frames. For each VCG, Orion counts the total number of LCAS CRC errors detected on any of its members.

When the LVC is initialized, the SK_LCAS_DCRC status bit, SK_LCAS_CRC_CNT and SK_LCAS_DCRC_WD-W_CNT fields of all ports are cleared. During normal operation, when a sink port is reset, the LVC will clear these fields for that port.

Whenever CRC of the current control packet is checked on a given channel, the SK_LCAS_DCRC_WDW_CNT of the containing LCAS sink VCG is incremented by one. If a CRC error were detected, then the CRC count of the LCAS sink VCG would be incremented by one.

If the SK_LCAS_DCRC status bit were not set when the SK_LCAS_DRC_WDW_CNT reaches the RX_LCAS_D-CRC_N1 value, then the CRC count is checked against the LCAS_DCRC_K1 value. If the CRC count is equal or higher, then the LCAS_DRCR status bit is set.

If the SK_LCAS_DCRC status bit were set when the SK_LCAS_DCRC_WDW_CNT reaches the LCAS_D-CRC_N2 value, then the SK_LCAS_CRC_CNT is checked against the LCAS_DCRC_K2 value. If the SK_LCAS_CRC_CNT is equal or higher, then the LCAS_DRCR status bit is set.

At the end of either a set or a clear window, the SK_LCAS_DRC_WDW_CNT and SK_LCAS_CRC_CNT are reset to zero. Also, if the value of SK_LCAS_DCRC changed, then the SK_LCAS_DCRC_CHANGED interrupt status bit is set.

8.7.1.1.3 Probing CRC Errors on Members of a VCG

The LVC can indicate that a dCRC defect is set/cleared on a particular VCG. But unless software watches the LCAS CRC status of all member channels at every multi-frame (hard to do), it is not possible to determine underlying conditions such as if one member had all most of the errors or the errors were uniformly distributed over all members. One sink VCG at a time may be selected for counting CRC errors on all its members in detail.

Software selects the VCG to count member CRC errors or by writing its port id to the global LCAS_DCRC_CAP_PORT register. Software also specifies the window (in multi-frames) that the CRC error counts should be collected using the global LCAS_DCRC_WS register. To initiate the count, software clears the LCAS_DCRC_CAP_VLD bit.

When the counting window expires, Orion sets the LCAS_DCRC_CAP_DONE interrupt status bit. The CRC counts for up to 64 member channels are available from the LCAS_CRC_CNT registers using indirect memory which is addresses using the sequence numbers.

Note that hardware does not check if the selected port is out of reset or not, and if so if it is an LCAS configured port or not. If software does this by mistake, the CRC count capture process will not start. Software can write a sane value to the LCAS_DCRC_CAP_PORT to recover.

Hardware should not write to the LCAS_DCRC_CAP_PORT or LCAS_DCRC_CAP_WS registers if there is a CRC capture active (i.e. LCAS_DCRC_CAP_VLD=0).

8.7.1.1.4 Forward Control Information Update

Hardware writes the sequence and control fields received in the current LCAS control packet into CH_LCAS_NEXT_SQ and CH_LCAS_NEXT_CTRL state variables, respectively. If this control packet did have a valid CRC and it did not have a CRC error, then at the start of the frame that begins the next LCAS control packet, hardware copies the values of CH_LCAS_NEXT_SQ and CH_LCAS_NEXT_CTRL parameters to CH_LCAS_CUR_SQ and CH_LCAS_CUR_CTRL parameters, respectively. But if there is a CRC error, the status parameters will not be updated.

For controlling the passing of payload bytes to the DSQ, the LVC uses the CH_LCAS_CUR_SQ and CH_LCAS_CUR_CTRL status parameters. Therefore in the SOF byte, which is a payload byte, the LVC does not read the channel status memory but instead it uses the sequence and control parameters to use from the state memory for this purpose. This ensures that only one access is required to the channel status memory in the SOF cycle.

When the LVC receives the SQ and CTRL fields, it reads the CH_LCAS_CUR_SQ and CH_LCAS_CUR_CTRL status parameters and compares them with the received values. If there is a difference, LVC sets the CH_LCAS_SQ_CH and/or CH_LCAS_CTRL_CH bits.

At the end of the LCAS control packet, if there is valid CRC and the CRC check is OK, and the CH_LCAS_SQ_CHG and/or CH_LCAS_CTRL_CHG bits are set the LVC will generate an interrupt status set request to the CFR for sequence and/or control word change.

The above discussion applies to the case where a channel is not in reset/fail state. If a channel is in reset/fail state, hardware will behave as described in section 8.7.2.

8.7.1.1.5 Reverse Control Information Update

Reverse control information update is performed only if the RX_CH_LCAS_REV_EXT_EN parameter of a channel is set. In the descriptions below, we assume this is the case.

No attempt is made to check that the MST and RS_Ack values received on the channels carrying reverse information for the same source port in the same HO_MFI2 are all the same. Note that any errors that hit these fields are likely to be detected by CRC checks.

The discussion in this section applies to the case where a channel is not in reset/fail state. If a channel is in reset/fail condition, hardware will not attempt to update the reverse control state/status and it will not generate interrupts for changes on the channel's associated source port, if any.

Software can write to source port status memory to initialize MST and RS_ACK values. Typically, the MST bits would be initialized to all ones (MST=Fail). The initial value of RS_ACK does not matter except that software should know what it is.

8.7.1.1.5.1 MST

The MST field received in an LCAS control packet on a given channel is saved in the channel state memory entry for that channel. As the low nibble of the MST field is received on a given channel, depending on the MFI2 value, the LVC also compares it to the corresponding MST bits in the source port status associated with this channel. If the comparison indicates a difference, the CH_LCAS_MST_CHG state bit for the channel is set.

Since the maximum number of channels we support is limited to 64 in Orion, some LCAS control packets do not carry any useful MST information. This is determined based on MFI2. The MST chunk from source port status memory entry, if any, that will be used for comparison and will be updated after is determined as follows:

```
If (ALIG_RD_LVC_MFI[8:7] == 0) {
    MST_Chunk_LSB_Pos = {ALIG_RD_LVC_MFI[6:4], 3b'0}
    MST_Chunk_MSB_Pos = MST_Chunk_LSB_Position + 7
    MST_Chunk = SO_LCAS_MST[MST_Chunk_MSB_Pos:-
    MST_Chunk_LSB_Pos]
}
// Else do not perform MST comparison and update
```

At the end of the LCAS control packet, if there is valid CRC and the CRC check is OK and if LCAS reverse control extraction is enabled on this channel, the LVC updates the corresponding MST bits in the associated source port status with the MST field received on this channel. If the CH_LCAS_MST_CHG bit is set, the LVC also generates an SO_LCAS_MST_CHG interrupt for the source port associated with this channel.

8.7.1.1.5.2 RS_ACK

The RS_ACK bit received in an LCAS control packet on a given channel is saved in the channel state memory entry for that channel. At that time, the LVC also compares it to the RS_ACK bit in the source port status associated with this channel. If the comparison indicates a difference, the CH_LCAS_RS_ACK_CHG state bit for the channel is set.

At the end of the LCAS control packet, if there is valid CRC and the CRC check is OK and if LCAS reverse control extraction is enabled on this channel, the LVC updates the RS_ACK bit in associated source port status with the RS_ACK bit received on this channel. If the CH_LCAS_RS_ACK_CHG bit is set, the LVC also generates an SO_LCAS_RS_ACK_CHG interrupt for the source port associated with this channel.

8.7.1.1.6 GID Check

The LVC checks whether or not every accepted member channel of a sink port have received the same GID bit in the same LCAS control packet (i.e. the last one each member received). If the GID bits on different channels do not match, then LVC sets the SK_LCAS_GID_ERR status bit and generates a sink port GID interrupt request if the status bit has changed value. In addition to this status bit, the LVC keeps the following sink port level state bits:

SK_LCAS_GID_VLD
SK_LCAS_GID
SK_LCAS_GID_MFI2_LSB
SK_LCAS_GID_ERR_COPY

Although the SK_LCAS_GID_ERR_COPY state bit is used in the design to avoid reading the sink port status to determine if an interrupt should be generated, it is not necessary to have it. Since the sink port status bits are in flops, they can be read at the same time as the sink port state status bits are being read without worrying about conflicts with software reads. The pseudo code does not show the use of SK_LCAS_GID_ERR_COPY.

When the GID bit is received on a given channel, it is stored in the channel state memory because LVC cannot act on it till the CRC is verified on the LCAS control packet.

At the end of the LCAS control packet, if there is valid CRC and the CRC check is OK, the LVC first checks to see if the channel is accepted (and also that it has not just received IDLE as the control word). If so, the LVC then looks at the sink level GID state.

If SK_LCAS_GID_VLD is not set, it means that this is the first time that GID comparison is being performed on this sink port. In that case, the LVC sets SK_LCAS_GID_VLD, copies CH_LCAS_GID to SK_LCAS_GID and sets the SK_LCAS_GID_MFI2_LSB to HO_MFI2 [0]. No error check can be performed yet.

If SK_LCAS_GID_VLD is set, the LVC compares SK_LCAS_GID_MFI2_LSB with HO_MFI2 [0]. If they are different, it means that we have moved to a new LCAS control packet cycle for this sink port and the current channel is the first channel that is at the end of the LCAS control packet. In this case, the LVC sets the SK_LCAS_GID to CH_LCAS_GID and sets the SK_LCAS_GID_MFI2_LSB to HO_MFI2 [0]. Again, no error check can be performed yet.

If SK_LCAS_GID_VLD is set and SK_LCAS_GID_MFI2_LSB is equal to LSB of HO_MFI2, it means that the current channel is not the first channel in the sink port to compare the GID it received to the sink port GID (which is set the GID received on the first channel). In this case, the LVC compares CH_LCAS_GID with SK_

LCAS_GID. If they were different, SK_LCAS_GID_ERR and SK_LCAS_GID_ERR_COPY would be set. But before doing so the LVC compares the new value of SK_LCAS_GID_ERR with SK_LCAS_GID_ERR_COPY. If they are different, then the LVC generates an SK_LCAS_GID_ERR_CHG interrupt for the associated sink port.

8.7.1.1.7 Probing GID Values on Members of a VCG

The LVC reports when a GID error is detected on a particular VCG. At this level it is not possible to determine the exact condition that causes the GID error. For example, if one member had a GID value different than the others, it would not be possible to identify that member. One sink VCG at a time may be selected for probing GID values of its members in detail. Hardware captures the GID bits for all members of the selected VCG and makes it available to the software.

Software selects the VCG on which capture member writing its port id to the global LCAS_GID_CAP_PORT register. The GID capture is initiated by setting the global LCAS_GID_CAP_VLD bit.

During the next control packet cycle, hardware will write the received GID value of each member into the global LCAS_GID_CAP status register based on its received sequence number. Since the maximum size of a sink VCG in Orion is 64, two 32-bit registers are used for this purpose. After this, hardware will clear the LCAS_GID_CAP_VLD bit and set the LCAS_GID_CAP_DONE interrupt status bit.

Note that hardware does not check if the selected port is out of reset or not, and if so if it is an LCAS configured port or not. If software does this by mistake, the GID capture process will not start. Software can write a sane value to the LCAS_GID_CAP_PORT to recover.

Hardware should not write to the LCAS_GID_CAP_PORT register if there is a GID probe active (i.e. LCAS_GID_CAP_VLD=0).

8.7.1.2 Low Order

The table below specifies the LCAS state and status update operations performed by LVC for low order channels (we assume ALIG_RD_STS_VT is true).

TABLE 8-3

LCAS State/Status Update Operations On LO Channels

| Timeslot Type | LO LCAS State and Status Update Operations |
|---|---|
| SOMF Payload | |
| ~ALIG_RD_LVC_CH_RST && <br> ~ALIG_RD_LVC_CH_FAIL && <br> ~ALIG_RD_LVC_SK_RST && <br> ALIG_RD_LVC_DATA_VLD && <br> ALIG_RD_LVC_SOF && <br> (ALIG_RD_LVC_MFI[4:0] == 0) | Read CH_LCAS_CRC_VLD, CH_LCAS_CRC_ERR_COPY, CH_LCAS_NEXT_SQ and CH_LCAS_NEXT_CTRL <br> If (CH_LCAS_CRC_VLD && ~CH_LCAS_CRC_ERR_COPY) { <br>   CH_LCAS_CUR_SQ = CH_LCAS_NEXT_SQ <br>   CH_LCAS_CUR_CTRL = CH_LCAS_NEXT_CTRL <br>   Write CH_LCAS_CUR_SQ and CH_LCAS_CUR_CTRL <br> } |
| Non-SOMF Payload | |
| ~ALIG_RD_LVC_CH_RST && <br> ~ALIG_RD_LVC_CH_FAIL && <br> ~ALIG_RD_LVC_SK_RST && <br> ALIG_RD_LVC_DATA_VLD && <br> ~ALIG_RD_LVC_SOF && <br> ~ALIG_RD_LVC_H4_K4 <br> MFI2[4] | Read CH_LCAS_CUR_CTRL, CH_LCAS_CUR_SQ |
| ~ALIG_RD_LVC_CH_RST && <br> ~ALIG_RD_LVC_CH_FAIL && <br> ~ALIG_RD_LVC_SK_RST && <br> ALIG_RD_LVC_DATA_VLD && <br> ALIG_RD_LVC_H4_K4 && <br> (ALIG_RD_LVC_MFI[4:0] == 0) <br> MFI2[3:0] | Read CH_LCAS_CRC <br> CH_LCAS_CRC = NEXT_CRC3 (CH_LCAS_CRC, ALIG_RD_LVC_H4_K4[6]) <br> CH_LCAS_CRC_ALIGNED = 1 <br> CH_LCAS_CRC_VLD = 1 <br> Write CH_LCAS_CRC, CH_LCAS_CRC_ALIGNED, CH_LCAS_CRC_VLD |
| ~ALIG_RD_LVC_CH_RST && <br> ~ALIG_RD_LVC_CH_FAIL && <br> ~ALIG_RD_LVC_SK_RST && <br> ALIG_RD_LVC_DATA_VLD && <br> ALIG_RD_LVC_H4_K4 && <br> (ALIG_RD_LVC_MFI[4:0] >= 1) && <br> (ALIG_RD_LVC_MFI[4:0] <= 4) <br> SQ[5:1] | Read CH_LCAS_CRC <br> CH_LCAS_CRC = NEXT_CRC3 (CH_LCAS_CRC, ALIG_RD_LVC_H4_K4[6]) <br> Write CH_LCAS_CRC |
| ~ALIG_RD_LVC_CH_RST && <br> ~ALIG_RD_LVC_CH_FAIL && <br> ~ALIG_RD_LVC_SK_RST && <br> ALIG_RD_LVC_DATA_VLD && | Read CH_LCAS_CRC <br> CH_LCAS_CRC = NEXT_CRC3 (CH_LCAS_CRC, ALIG_RD_LVC_H4_K4[6]) <br> BIT_POS = 10 − ALIG_RD_LVC_MFI[4:0] |

TABLE 8-3-continued

LCAS State/Status Update Operations On LO Channels

| Timeslot Type | LO LCAS State and Status Update Operations |
|---|---|
| ALIG_RD_LVC_H4_K4 && (ALIG_RD_LVC_MFI[4:0] >= 5) && (ALIG_RD_LVC_MFI[4:0] <= 9) SQ[0] | CH_LCAS_NEXT_SQ[BIT_POS] = ALIG_RD_LVC_H4_K4[6] Write CH_LCAS_CRC and CH_LCAS_NEXT_SQ[BIT_POS] |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] == 10) CTRL[3:1] | Read CH_LCAS_CRC, CH_LCAS_CUR_SQ CH_LCAS_CRC = NEXT_CRC3 (CH_LCAS_CRC, ALIG_RD_LVC_H4_K4[6]) CH_LCAS_NEXT_SQ[0] = ALIG_RD_LVC_H4_K4[6] CH_LCAS_SQ_CHG = (CH_LCAS_NEXT_SQ != CH_LCAS_CUR_SQ) Write CH_LCAS_CRC, CH_LCAS_NEXT_SQ[SQ_BIT_POS] and CH_LCAS_SQ_CHG |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] >= 11) && (ALIG_RD_LVC_MFI[4:0] <= 13) CTRL[0] | Read CH_LCAS_CRC CH_LCAS_CRC = NEXT_CRC3 (CH_LCAS_CRC, ALIG_RD_LVC_H4_K4[6]) BIT_POS = 14 − ALIG_RD_LVC_MFI[4:0] CH_LCAS_NEXT_CTRL[BIT_POS] = ALIG_RD_LVC_H4_K4[6] Write CH_LCAS_CRC and CH_LCAS_NEXT_CTRL[BIT_POS] |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] == 14) GID | Read CH_LCAS_CRC, CH_LCAS_CUR_CTRL CH_LCAS_CRC = NEXT_CRC3 (CH_LCAS_CRC, ALIG_RD_LVC_H4_K4[6]) CH_LCAS_NEXT_CTRL[0] = ALIG_RD_LVC_H4_K4[6] CH_LCAS_CTRL_CHG = (CH_LCAS_NEXT_CTRL != CH_LCAS_CUR_CTRL) Write CH_LCAS_CRC, CH_LCAS_NEXT_CTRL[SQ_BIT_POS] and CH_LCAS_CTRL_CHG |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] == 15) Reserved | Read CH_LCAS_CRC CH_LCAS_CRC = NEXT_CRC3 (CH_LCAS_CRC, ALIG_RD_LVC_H4_K4[6]) CH_LCAS_GID = ALIG_RD_LVC_H4_K4[6] Write CH_LCAS_CRC and CH_LCAS_GID |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] >= 16) && (ALIG_RD_LVC_MFI[4:0] <= 19) RS_ACK | Read CH_LCAS_CRC CH_LCAS_CRC = NEXT_CRC3 (CH_LCAS_CRC, ALIG_RD_LVC_H4_K4[6]) Write CH_LCAS_CRC |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] == 20) MST[7:1] | Read CH_LCAS_CRC and SO_LCAS_RS_ACK CH_LCAS_CRC = NEXT_CRC3 (CH_LCAS_CRC, ALIG_RD_LVC_H4_K4[6]) CH_LCAS_RS_ACK = ALIG_RD_LVC_H4_K4[6] CH_LCAS_RS_ACK_CHG = (CH_LCAS_RS_ACK != SO_LCAS_RS_ACK) Write CH_LCAS_CRC, CH_LCAS_RS_ACK and CH_LCAS_RS_ACK_CHG |
| ~ALIG_RD_LVC_CH_RST && ~ALIG_RD_LVC_CH_FAIL && ~ALIG_RD_LVC_SK_RST && ALIG_RD_LVC_DATA_VLD && | Read CH_LCAS_CRC CH_LCAS_CRC = NEXT_CRC3 (CH_LCAS_CRC, ALIG_RD_LVC_H4_K4[6]) BIT_POS = 28 − ALIG_RD_LVC_MFI[4:0] |

TABLE 8-3-continued

LCAS State/Status Update Operations On LO Channels

| Timeslot Type | LO LCAS State and Status Update Operations |
|---|---|
| ALIG_RD_LVC_H4_K4 &&<br>(ALIG_RD_LVC_MFI[4:0] >=<br>21) &&<br>(ALIG_RD_LVC_MFI[4:0] <=<br>27)<br>MST[0] | CH_LCAS_MST[BIT_POS] = ALIG_RD_LVC_H4_K4[6]<br>Write CH_LCAS_CRC and CH_LCAS_MST[BIT_POS] |
| ~ALIG_RD_LVC_CH_RST &&<br>~ALIG_RD_LVC_CH_FAIL &&<br>~ALIG_RD_LVC_SK_RST &&<br>ALIG_RD_LVC_DATA_VLD &&<br>ALIG_RD_LVC_H4_K4 &&<br>(ALIG_RD_LVC_MFI[4:0] ==<br>28)<br><br>CRC[2:1] | Read CH_LCAS_CRC and SO_LCAS_MST<br>CH_LCAS_CRC = NEXT_CRC3 (CH_LCAS_CRC,<br>ALIG_RD_LVC_H4_K4[6])<br>CH_LCAS_MST[0] = ALIG_RD_LVC_H4_K4[6]<br>MST_CHUNK_LSB_POS = {ALIG_RD_LVC_MFI[7:5], 3'b0}<br>MST_CHUNK_MSB_POS = MST_CHUNK_LSB_POS + 7<br>CH_LCAS_MST_CHG = (CH_LCAS_MST !=<br>SO_LCAS_MST[MST_CHUNK_MSB_POS: MST_CHUNK_LSB_POS])<br>Write CH_LCAS_CRC, CH_LCAS_MST[0] and CH_LCAS_MST_CHG |
| ~ALIG_RD_LVC_CH_RST &&<br>~ALIG_RD_LVC_CH_FAIL &&<br>ALIG_RD_LVC_SK_RST &&<br>ALIG_RD_LVC_DATA_VLD &&<br>ALIG_RD_LVC_H4_K4 &&<br>(MFI[4:0] >=<br>29) &&<br>(MFI[4:0] <=<br>30) | Read CH_LCAS_CRC and CH_LCAS_ZERO_CRC<br>CH_LCAS_CRC = NEXT_CRC3 (CH_LCAS_CRC,<br>ALIG_RD_LVC_H4_K4[6])<br>CH_LCAS_ZERO_CRC = (ALIG_RD_LVC_H4_K4[6] == 0) &&<br>CH_LCAS_ZERO_CRC<br>Write CH_LCAS_CRC and CH_LCAS_ZERO_CRC<br><br>Read CH_LCAS_CRC_ALIGNED, CH_LCAS_CRC_VLD,<br>CH_LCAS_CRC, CH_LCAS_CRC_ERR_COPY, CH_LCAS_NEXT_SQ,<br>CH_LCAS_SQ_CHG, CH_LCAS_NEXT_CTRL,<br>CH_LCAS_CTRL_CHG, CH_LCAS_MST, CH_LCAS_MST_CHG,<br>CH_LCAS_RS_ACK, CH_LCAS_RS_ACK_CHG, CH_LCAS_GID,<br>CH_LCAS_ZERO_CRC, CH_LCAS_NL_SRC_COPY,<br>SK_LCAS_GID_VLD, SK_LCAS_GID, SK_LCAS_GID_MFI2_LSB,<br>CH_LCAS_CRC = NEXT_CRC3 (CH_LCAS_CRC,<br>ALIG_RD_LVC_H4_K4[6])<br>If (~CH_LCAS_CRC_ALIGNED) {<br>CH_LCAS_CRC_ALIGNED = 1<br>}<br>Else If (~CH_LCAS_CRC_VLD) {<br>CH_LCAS_CRC_VLD = 1<br>}<br>If (CRC_VLD) {<br>  CH_LCAS_CRC_ERR = (CH_LCAS_CRC != 0)<br>  If (CH_LCAS_CRC_ERR == 0) {<br>    If (CH_LCAS_SQ_CHG) {<br>      Generate CH_LCAS_SQ_CHG interrupt for this channel<br>    }<br>    If (CH_LCAS_CTRL_CHG) {<br>      Generate CH_LCAS_SQ_CHG interrupt for this channel<br>    }<br>    If (CH_LCAS_LCAS_REV_EXT_EN) {<br>      MST_CHUNK_LSB_POS = {ALIG_RD_LVC_MFI[7:5], 3'b0}<br>      MST_CHUNK_MSB_POS = MST_CHUNK_LSB_POS + 7<br>      SO_LCAS_MST[MST_CHUNK_MSB_POS:MST_CHUNK_LSB_POS] =<br>CH_LCAS_MST<br>        If (CH_LCAS_MST_CHG) {<br>          Generate SO_LCASMST_CHG interrupt for<br>            CH_LCAS_REV_EXT_SO_LPID source port<br>        }<br>      SO_LCAS_RS_ACK = CH_LCAS_RS_ACK<br>      If (CH_LCAS_RS_ACK_CHG) |
| Channel Fail | |
| ALIG_RD_LVC_CH_FAIL | CH_LCAS_CRC_ALIGNED = 0<br>CH_LCAS_CRC_VLD = 0<br>CH_LCAS_CRC = 0<br>Write CH_LCAS_CRC_ALIGNED, CH_LCAS_CRC_VLD and<br>CH_LCAS_CRC |
| Channel Reset | |
| ALIG_RD_LVC_CH_RST | CH_LCAS_CRC_ALIGNED = 0<br>CH_LCAS_CRC_VLD = 0<br>CH_LCAS_CRC = 0<br>CH_LCAS_CRC_ERR = 0<br>CH_LCAS_CRC_ERR_COPY = 0 |

TABLE 8-3-continued

LCAS State/Status Update Operations On LO Channels

| Timeslot Type | LO LCAS State and Status Update Operations |
|---|---|
| Sink Port Reset | CH_LCAS_NL_SRC = 0<br>CH_LCAS_NL_SRC_COPY = 0<br>CH_LCAS_CUR_CTRL = IDLE<br>Write CH_LCAS_CRC_ALIGNED, CH_LCAS_CRC_VLD, CH_LCAS_CRC, CH_LCAS_CRC_ERR, CH_LCAS_NL_SRC, CH_LCAS_NL_SRC_COPY and CH_LCAS_CUR_CTRL |
| ALIG_RD_LVC_SK_RST && ~ALIG_RD_LVC_CH_RST | SK_LCAS_GID_VLD = 0<br>SK_LCAS_GID_ERR = 0<br>Write SK_LCAS_GID_VLD and SK_LCAS_GID_ERR = 0 |

The difference between high order and low order channels are that the LCAS control packet is received one bit at a time instead of 4 bits at a time. But since some of the fields are larger than 4 bits anyway, this does not cause additional complexity for LO compared to HO.

Note that the approach is the same for both high and low order channels in terms of when update operations are performed. It should also be noted that a different pipeline design is not needed for LO channels.

8.7.2 Handling Sink Port Reset, Channel Failure and Channel Reset

In discussing LVC behavior for VCG reset, channel failure and channel reset, it is useful to review the ALIG_RD and software behavior first.

8.7.2.1 ALIG_RD and Software Behavior

The following summarizes the failure/reset behavior of ALIG_RD in coordination with software:

Failure or reset on an accepted member channel triggers failure on the VCG, which then triggers failure on all member channels whether they are accepted, or not.

Failure or reset on a non-accepted member channel does not trigger failure on the VCG. During the timeslots of the failed channel, the ALIG_RD does not pass valid data to the LVC but continues to indicate the channel fail state to the LVC. Unaccepted channels do not come out of failure automatically. Software has to clear the sticky failure status bit.

Software initiated sink port reset triggers channel fail (not reset) on all member channels whether they are accepted or not. Note that the ALIG_RD modules passes sink port reset condition to the LVC separately.

For both reset and failure conditions that affect a VCG (i.e. software sink port reset or accepted channel failure/reset), it is guaranteed (by the failure handler in CFR) that the condition will be asserted long enough for all member channels of a VCG to see it.

If an accepted member channel goes into failure and the channel is not protected, the software clears the accepted bit of that channel so the data from remaining member channels, once they are realigned, will be passed to the LVC and DSQ. Since the failed channel is reconfigured as unaccepted, the failure state of that channel will not cause the DSQ to invalidate the buffers.

This is necessary for implementing the DNU mechanism in LCAS. If the channel that failed were an active member of the VCG, i.e. source was sending NORM/EOS on that channel, then the source would start sending DNU as the control word when it gets the member channel fail status from the sink. The sink would obviously not see the DNU control word but it has to operate as if it did. This requires the sink to be able to extract data from the remaining member channels.

If a failed accepted member channel is known by software to be protected, then software will not clear the accepted bit of that channel and it will not send a fail status to the source. When the protect channel kicks in, the VCG will realign with all the members and ALIG_RD will start sending data to the LVC from all member channels again. The assumption behind this approach is that during provisioning, software may have established that the differential delay change due to switching to the protected path remains within system limits. For pre-computed protection path applications, this assumption would hold.

A channel needs to be reset before it first becomes member of an LCAS VCG. If such a channel is already an accepted member of an LCAS VCG, then the LCAS protocol will be used to delete that channel from that VCG first. At that point software will clear the accepted bit of the channel before putting the channel in reset.

Note that if an accepted channel of an LCAS VCG is put into reset, it will cause VCG to be put into reset condition. Normally, this would not be done. An accepted channel will first be removed using the LCAS delete procedure and then the accepted bit on that channel will be cleared by software before it puts the channel in reset. But an accepted channel may be reset without following these steps when non-recoverable VCG level errors are detected. However, before a channel is brought out of by software reset, software should clear its accepted bit.

It may not be possible to recover from some network failures automatically. For example, the differential delay may become excessive (typically after a network reconfiguration that may or may not be triggered by a protection mechanism) or a protocol error (e.g. invalid sequence number and/or sequence number combinations on accepted channels) may be detected by software. In these cases, the VCG may also be reset by software (or all channels may be put into reset) without following planned member removal procedures. Note that software may still send fail status on all member channels of this VCG by configuring the VCT_TX block.

Note that in a given clock cycle, sink port reset is meaningful only of the channel is not in reset. This is because if the channel is in reset, then its RX_CH_SK_LPID parameter is not valid.

8.7.2.2 LVC Behavior

Depending on the accepted configuration bit of a channel, the LVC behaves as follows in response to channel reset/failure indications on that channel from the ALIG_RD:

When the LVC sees a channel failure indication on a channel (accepted or not), it sets the channel's CH_LCAS_CRC_ALIGNED, CH_LCAS_CRC_VLD and CH_LCAS_CRC state variables to zero respectively.

When a channel is reset, the LVC resets the channel's state and status variables to their initial values.

While a channel remains in fail or reset state or the associated sink port is in a reset state, the LVC does not process the H4/K4 bytes on that channel to update state/status variables (channel or port level) associated with that channel. However, the LVC passes the calendar information and the configuration, reset and fail state of the channel to the DSQ in the clock cycles for that channel.

When the sink port is reset, the RX_SK_GID_VLD state bit and RX_SK_GID_ERR status bit are reset.

The channel failure/reset or sink port reset may be indicated to the LVC at any point within a frame. During such clock cycles, instead of the state/status update operations discussed in the section 8.7.1, the hardware shall set the state and status variables as described above.

8.7.3 Passing Control and Payload Data to DSQ

The following pseudo-code formally specifies how the LVC passes control and payload data to the DSQ:

way it is done SQ module in the VCT_TX block. For example, all STS-1 type VCGs flip their read/write buffers every time STS number generated by the calendar is zero. This is possible because the ALIG_RD read manager ensures that a VCG never stalls in the middle of a calendar rotation.

There is one important difference between the receive side and transmit side with respect to buffer flipping though. On the transmit side buffer flipping is done only when the current byte pulled by the CXC is a payload byte. The receive side cannot use current byte pushed by ALIG_RD being a payload byte as a condition. This is because if a channel is in failure, the timeslots for that channel cannot be classified as a payload or an H4 byte timeslot.

To deal with this issue, the LVC sends request to the DSQ in every clock cycle whether or not there is a valid data from the ALIG_RD in that cycle, and if so whether or not the data is a payload or H4/K4 byte. However, the DNU bit is set for all cases but payload cycles for accepted channels that are not in reset/fail state and that do not have their CUR_CH_SQ state variables set to DNU (or NEXT_CH_SQ if SOF is true).

When the DSQ tries to set the DNU bit of the current write buffer location indicated by the CH_CUR_SQ for non-accepted channels, it might see that the value of CH_CUR_SQ

```
If (~ALIG_RD_LVC_CH_RST) {
  If (ALIG_RD_LVC_CH_ACCEPTED) {
    If (~ALIG_RD_LVC_DATA_VLD | ALIG_RD_LVC_H4_K4) {
      LVC_DSQ_DNU = 1
    }
    Else {
      If ((ALIG_RD_LVC_SOF == 1) &&
          ((~ALIG_RD_LVC_STS_VT && (ALIG_RD_LVC_MFI[3:0] == 8))
          ||
          (ALIG_RD_LVC_STS) && (ALIG_RD_LVC_MFI[4:0] == 0))) {
        If ((CH_LCAS_NEXT_CTRL == NORM) | (CH_LCAS_NEXT_CTRL == EOS)) {
          LVC_DSQ_DNU = 0
        }
        Else {
          LVC_DSQ_DNU = 1
        }
        LVC_DSQ_CH_SQ = CH_LCAS_NEXT_SQ
      }
      Else {
        If ((CH_LCAS_CUR_CTRL == NORM) | (CH_LCAS_CUR_CTRL == EOS)) {
          LVC_DSQ_DNU = 0
        }
        Else {
          LVC_DSQ_DNU = 1
        }
        LVC_DSQ_CH_SQ = CH_CUR_LCAS_SQ
      }
    }
  }
}
Else {
  LVC_DSQ_DNU = 1 // Dummy since channel in reset
  LVC_DSQ_CH_SQ = 0 // Dummy since channel in reset
}
LVC_DSQ_CH_DATA = ALIG_RD_LVC_CH_DATA
LVC_DSQ_CH_FAIL = ALIG_RD_LVC_CH_FAIL
LVC_DSQ_CH_RST = ALIG_RD_LVC_CH_RST
LVC_DSQ_SK_RST = ALIG_RD_LVC_SK_RST
LVC_DSQ_CH_ACCEPTED = ALIG_RD_LVC_CH_ACCEPTED
LVC_DSQ_SK_LPID = ALIG_RD_LVC_SK_LPID
LVC_DSQ_WID = ALIG_RD_LVC_WID
LVC_DSQ_CH_STS_VT = ALIG_RD_LVC_CH_STS_VT
LVC_DSQ_CH_STS_VC4 = ALIG_RD_LVC_CH_STS_VC4
LVC_DSQ_CH_STS_VTG_TYPE = ALIG_RD_LVC_CH_STS_VTG_TYPE
```

As described in section 9, read/write buffer flipping in the DSQ module is based on calendar rotations, similar to the may be greater than the size of the reorder buffer of the associated VCG. In such a case, the DSQ silently ignores the request. If this happens for accepted channels, this would be a protocol error. See section 8.7.4 for LCAS protocol error handling.

During timeslots where an accepted channel does not have valid data or the data is an H4/K4 byte, the LVC sets the DNU bit to the DSQ. Except for the first payload byte of the frame in which an LCAS control packet starts, during payload timeslots of an accepted channel, the LVC sets the DNU bit only when the channel has its CH_CUR_CTRL status variable set to DNU, the LVC sets the DNU bit for that channel.

Note that the LVC passes both the accepted configuration and channel fail condition to the DSQ. If a channel is not accepted, then the DSQ ignores the fail condition. It will also not update the data buffer in that timeslot. This ensures that if an unaccepted channel has a sequence number that collides with that of an accepted channel, this will not cause the VCG data flow to fail. While the above condition is not legal in LCAS protocol, doing so will prevent unnecessary data corruption. Note that for unaccepted channels, the DSQ will pass the calendar and the sink port of the channel to the ANA.

8.7.4 LCAS Protocol Error Handling

All LCAS protocol errors besides CRC and GID errors will be detected by software. The following is a list of possible LCAS protocol errors:

Invalid control word (e.g. illegal or unexpected value)

Out of range sequence numbers (e.g. value on accepted channel greater than VCG size)

Invalid combination of sequence numbers and/or control words on accepted members (e.g. gaps or overlap in sequence numbers, sequence number not compatible with the control word, etc)

8.8 Non-LCAS Operation
8.8.1 State and Status Update

In non-LCAS operation, i.e. when the LVC determines that a channel is mapped to a non-LCAS sink port, the LVC does not extract and process control word, GID, MST and RS_ACK fields received in the H4/K4 bytes and it does not perform any CRC checks.

The LVC extracts and processes only the SQ field for non-LCAS channels. The LVC stores the extracted SQ field in the CH_PREV_SQ state variable. Before updating it when a new SQ value is received, the LVC reads the previous value in that state variable to compare it with the received value.

If the two are the same, then LVC increments the CH_NL_VCAT_PREV_SQ_RPT_CNT state variable for that channel. If the counter value reaches three, than the received value is copied over to the CH_VC_ACC_SQ status parameter. Note that counter does not roll over from three. Based on if the CH_VC_ACC_SQ status parameter is the same or different than the expected sequence for this channel, then LVC sets or clears the CH_VC_SQM status variable. If the value of the status variable changed, then LVC will generate a CH_VC_SQM_CHG interrupt for this channel.

If the two are different, then LVC sets the CH_NL_VCAT_PREV_SQ_RPT_CNT to zero. This counter is also reset when a channel is in reset/fail state.

Note that even though the memory access requirements are not the same for non-LCAS channels, the same pipeline is used for both LCAS and non-LCAS channels. The non-LCAS case is a subset of LCAS case in that it has less required memory accesses (e.g. no need to read channel status memory).

8.8.1.1 High Order

The table below specifies the non-LCAS state and status update operations performed by LVC for high order channels.

TABLE 8-4

| Non-LCAS VCAT State/Status Update Operations On HO Channels | |
|---|---|
| Timeslot Type | HO Non-LCAS State and Status Update Operations |
| Payload | |
| ~ALIG_RD_LVC_CH_RST && <br> ~ALIG_RD_LVC_CH_FAIL && <br> ~ALIG_RD_LVC_SK_RST && <br> ALIG_RD_LVC_DATA_VLD && <br> ~ ALIG_RD_LVC_H4_K4 <br> MFI2, Reserved | — |
| ~ALIG_RD_LVC_CH_RST && <br> ~ALIG_RD_LVC_CH_FAIL && <br> ~ALIG_RD_LVC_SK_RST && <br> ALIG_RD_LVC_DATA_VLD && <br> ALIG_RD_LVC_H4_K4 && <br> (ALIG_RD_LVC_MFI[3:0] >= 0) && <br> (ALIG_RD_LVC_MFI[3:0] <= 13) <br> SQ[7:4] | — |
| ~ALIG_RD_LVC_RST && <br> ALIG_RD_LVC_DATA_VLD && <br> ALIG_RD_LVC_H4_K4 && <br> (ALIG_RD_LVC_MFI[3:0] == 14) | Read CH_NL_VCAT_PREV_SQ and CH_LCAS_PREV_SQ_MATCH <br> CH_NL_VCAT_PREV_SQ_MATCH = (CH_NL_VCAT_PREV_SQ[7:4] == ALIG_RD_LVC_H4_K4[7:4]) <br> CH_NL_VCAT_PREV_SQ[7:4] = ALIG_RD_LVC_H4_K4[7:4] <br> Write CH_NL_VCAT_PREV_SQ[7:4] and CH_NL_VCAT_PREV_SQ_MATCH |
| SQ[3:0] | |
| ~ALIG_RD_LVC_CH_RST && <br> ~ALIG_RD_LVC_CH_FAIL && <br> ~ALIG_RD_LVC_SK_RST && | Read CH_NL_VCAT_PREV_SQ, <br> CH_NL_VCAT_PREV_SQ_MATCH, <br> CH_NL_VCAT_PREV_SQ_RPT_CNT and |

TABLE 8-4-continued

Non-LCAS VCAT State/Status Update Operations On HO Channels

| Timeslot Type | HO Non-LCAS State and Status Update Operations |
|---|---|
| ALIG_RD_LVC_DATA_VLD && ALIG_RD_LVC_H4_K4 && (ALIG_RD_LVC_MFI[3:0] == 15) | CH_NL_VCAT_SQM_COPY<br>If (CH_NL_VCAT_PREV_SQ_MATCH) {<br>  CH_NL_VCAT_PREV_SO_MATCH =<br>    (CH_NL_VCAT_PREV_SQ[3:0] ==<br>  ALIG_RD_LVC_H4_K4[7:4])<br>}<br>If (CH_NL_VCAT_PREV_SQ_MATCH) {<br>  If (CH_NL_VCAT_PREV_SQ_RPT_CNT < 3) {<br>    CH_NL_VCAT_PREV_SQ_RPT_CNT++<br>  }<br>}<br>CH_NL_VCAT_PREV_SQ_MATCH = 0<br>CH_NL_VCAT_PREV_SQ[3:0] =<br>ALIG_RD_LVC_H4_K4[7:4]<br>If (CH_NL_VCAT_PREV_SQ_RPT_CNT == 3) {<br>  CH_NL_VCAT_SQM = (ALIG_RD_LVC_EXP_SQ !=<br>CH_NL_VCAT_PREV_SQ)<br>  If (CH_NL_VCAT_SQM != CH_NL_VCAT_SQM_COPY)<br>{<br>    Generate CH_NL_VCAT_SQM interrupt for this channel<br>}<br>  CH_NL_VCAT_SQM_COPY = CH_NL_VCAT_SQM<br>  CH_NL_VCAT_ACC_SQ = CH_NL_VCAT_PREV_SQ<br>}<br>Write CH_NL_VCAT_PREV_SQ[7:4],<br>CH_NL_VCAT_SQM_COPY, CH_NL_VCAT_SQM,<br>CH_NL_VCAT_PREV_SQ_RPT_CNT<br>Write CH_NL_VCAT_ACC_SQ if<br>(CH_NL_VCAT_PREV_SQ_RPT_CNT == 3) |
| Channel Fail | |
| ALIG_RD_LVC_CH_FAIL | CH_NL_VCAT_PREV_SQ_RPT_CNT = 0<br>CH_NL_VCAT_PREV_SQ_MATCH = 0<br>Write CH_NL_VCAT_PREV_SQ_RPT_CNT and<br>CH_NL_VCAT_PREV_SQ_MATCH |
| Channel Reset | |
| ALIG_RD_LVC_CH_RST | CH_NL_VCAT_PREV_SQ_RPT_CNT = 0<br>CH_NL_VCAT_PREV_SQ_MATCH = 0<br>CH_NL_VCAT_SQM = 1<br>CH_NL_VCAT_ACC_SQ = 0<br>Write CH_NL_VCAT_PREV_SQ_RPT_CNT,<br>CH_NL_VCAT_PREV_SQ_MATCH, CH_NL_VCAT_SQM and<br>CH_NL_VCAT_ACC_SQ |
| Sink Port Reset | |
| ALIG_RD_LVC_SK_RST && ~ALIG_RD_LVC_CH_RST | — |

Based on the update operation specifications in Table 8-4, Table 8-5 below summarizes the memory access requirements to update the state and status memories for non-LCAS VCAT operation for high order channels.

TABLE 8-5

Memory Access Patterns For State/Status Update on Non-LCAS VCAT HO Channels

| | Hardware Memory Access Pattern For Non-LCAS HO | |
|---|---|---|
| Timeslot Type | Channel State | Channel Status |
| Payload | | |
| ~ALIG_RD_LVC_CH_RST && ~ALIG_RD_LVC_CH_FAIL && ~ALIG_RD_LVC_SK_RST && | — | — |
| ALIG_RD_LVC_DATA_VLD && ~ALIG_RD_LVC_H4_K4 MFI2, Reserved | | |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && | — | — |

TABLE 8-5-continued

Memory Access Patterns For State/Status Update on Non-LCAS VCAT HO Channels

| Timeslot Type | Hardware Memory Access Pattern For Non-LCAS HO | |
|---|---|---|
| | Channel State | Channel Status |
| (ALIG_RD_LVC_MFI[3:0] >= 0) && (ALIG_RD_LVC_MFI[3:0] <= 13) SQ[7:4] | | |
| ~ALIG_RD_LVC_CH_RST && ~ALIG_RD_LVC_CH_FAIL && ~ALIG_RD_LVC_SK_RST &&ALIG_RD_LVC_DATA_VLD && ALIG_RD_LVC_H4_K4 && (ALIG_RD_LVC_MFI[3:0] == 14) SQ[3:0] | RW | — |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[3:0] == 15) Channel Fail | RW | W |
| ALIG_RD_LVC_RST Channel Reset | W | — |
| ALIG_RD_LVC_RST Sink Port Reset | W | W |
| ALIG_RD_LVC_SK_RST && ~ALIG_RD_LVC_CH_RST | — | — |

8.8.1.2 Low Order

The table below specifies the non-LCAS VCAT state and status update operations performed by LVC for low order channels (we assume ALIG_RD_STS_VT is true).

TABLE 8-6

Non-LCAS VCAT State/Status Update Operations On LO Channels

| Timeslot Type | LO Non-LCAS VCAT State and Status Update Operations |
|---|---|
| Payload | |
| ~ALIG_RD_LVC_CH_RST && ~ALIG_RD_LVC_CH_FAIL && ~ALIG_RD_LVC_SK_RST && ALIG_RD_LVC_DATA_VLD && ~ALIG_RD_LVC_H4_K4 MFI2 | — |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] >= 0) && (ALIG_RD_LVC_MFI[4:0] <= 4) SQ[5:1] | — |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] >= 5) && (ALIG_RD_LVC_MFI[4:0] <= 9) | Read CH_NL_VCAT_PREV_SQ and CH_NL_VCAT_PREV_SQ_MATCH BIT_POS = 10 − ALIG_RD_LVC_MFI[4:0] If (! CH_NL_VCAT_PREV_SQ_MATCH) {  CH_NL_VCAT_PREV_SQ_MATCH =   (CH_NL_VCAT_PREV_SQ[BIT_POS] == ALIG_RD_LVC_H4_K4[6]) } CH_NL_VCAT_PREV_SQ[BIT_POS] = ALIG_RD_LVC_H4_K4[6] Write CH_NL_VCAT_PREV_SQ[BIT_POS] and CH_NL_VCAT_PREV_SQ_MATCH |
| SQ[0] | |
| ~ALIG_RD_LVC_CH_RST && ~ALIG_RD_LVC_CH_FAIL && ~ALIG_RD_LVC_SK_RST && ALIG_RD_LVC_DATA_VLD && | Read CH_NL_VCAT_PREV_SQ, CH_NL_VCAT_PREV_SQ_MATCH, CH_NL_VCAT_PREV_SQ_RPT_CNT and CH_NL_VCAT_SQM_COPY |

TABLE 8-6-continued

Non-LCAS VCAT State/Status Update Operations On LO Channels

| Timeslot Type | LO Non-LCAS VCAT State and Status Update Operations |
|---|---|
| ALIG_RD_LVC_H4_K4 && (ALIG_RD_LVC_MFI[4:0] == 10) | If (CH_NL_VCAT_PREV_SQ_MATCH) {<br>  CH_NL_VCAT_PREV_SO_MATCH =<br>    (CH_NL_VCAT_PREV_SQ[0] ==<br>ALIG_RD_LVC_H4_K4[6])<br>}<br>If (CH_NL_VCAT_PREV_SQ_MATCH) {<br>  If (CH_NL_VCAT_PREV_SQ_RPT_CNT < 3) {<br>    CH_NL_VCAT_PREV_SQ_RPT_CNT++<br>  }<br>}<br>CH_NL_VCAT_PREV_SQ_MATCH = 0<br>CH_NL_VCAT_PREV_SQ[0] = ALIG_RD_LVC_H4_K4[6]<br>If (CH_NL_VCAT_PREV_SQ_RPT_CNT == 3) {<br>  CH_NL_VCAT_SQM = (ALIG_RD_LVC_EXP_SQ !=<br>CH_NL_VCAT_PREV_SQ)<br>  If (CH_NL_VCAT_SQM != CH_NL_VCAT_SQM_COPY) {<br>    Generate CH_NL_VCAT_SQM interrupt for this channel<br>  }<br>  CH_NL_VCAT_SQM_COPY = CH_NL_VCAT_SQM<br>  CH_NL_VCAT_ACC_SQ = CH_NL_VCAT_PREV_SQ<br>}<br>Write CH_NL_VCAT_PREV_SQ[0],<br>CH_NL_VCAT_SQM_COPY, CH_NL_VCAT_SQM,<br>CH_NL_VCAT_PREV_SQ_RPT_CNT<br>Write CH_NL_VCAT_ACC_SQ if<br>(CH_NL_VCAT_PREV_SQ_RPT_CNT == 3) |
| Reserved | |
| ~ALIG_RD_LVC_CH_RST && ~ALIG_RD_LVC_CH_FAIL && ~ALIG_RD_LVC_SK_RST && ALIG_RD_LVC_DATA_VLD && ALIG_RD_LVC_H4_K4 && (ALIG_RD_LVC_MFI[4:0] >= 16) && (ALIG_RD_LVC_MFI[4:0] <= 19) | — |
| Channel Fail | |
| ALIG_RD_LVC_CH_FAIL | CH_NL_VCAT_PREV_SQ_RPT_CNT = 0<br>CH_NL_VCAT_PREV_SQ_MATCH = 0<br>Write CH_NL_VCAT_PREV_SQ_RPT_CNT and<br>CH_NL_VCAT_PREV_SQ_MATCH |
| Channel Reset | |
| ALIG_RD_LVC_CH_RST | CH_NL_VCAT_PREV_SQ_RPT_CNT = 0<br>CH_NL_VCAT_PREV_SQ_MATCH = 0<br>CH_NL_VCAT_SQM = 1<br>CH_NL_VCAT_ACC_SQ = 0<br>Write CH_NL_VCAT_PREV_SQ_RPT_CNT,<br>CH_NL_VCAT_PREV_SQ_MATCH, CH_NL_VCAT_SQM and<br>CH_NL_VCAT_ACC_SQ |
| Sink Port Reset | |
| ALIG_RD_LVC_SK_RST && ~ALIG_RD_LVC_CH_RST | — |

8.8.2 Passing Control and Data to DSQ

For non-LCAS channels, the LVC uses the configured expected sequence numbers when passing data bytes to the DSQ. The expected sequence number of such a channel is kept in the CFG block and piped to the LVC in each clock cycle associated with that channel.

To keep the data passing design as similar as possible between LCAS and non-LCAS VCGs, the LVC behaves the same way with respect to passing control and data to the DSQ except for the following differences:

- Expected sequence number received from ALIG_RD is passed to the DSQ as the sequence number for all payload bytes
- DNU is set only for non-payload timeslots and never for payload timeslots
- All channels are treated as accepted members (i.e. the alig_rd_lvc_ch_accepted signal is ignored)

The following pseudo-code formally specifies how the LVC passes control and payload data to the DSQ:

```
If (~ALIG_RD_LVC_CH_RST) {
  If (~ALIG_RD_LVC_DATA_VLD || ALIG_RD_LVC_H4_K4) {
    LVC_DSQ_DNU = 1
  }
```

-continued

```
Else {
    LVC_DSQ_DNU = 0
}
LVC_DSQ_CH_SQ = CH_NL_VCAT_EXP_SQ
LVC_DSQ_CH_ACCEPTED = 1
}
Else {
    LVC_DSQ_CH_SQ = 0 // Dummy since channel in reset
    LVC_DSQ_DNU = 1 // Dummy since channel in reset
    LVC_DSQ_CH_ACCEPTED = 0 // Dummy since channel in reset
}
LVC_DSQ_CH_FAIL = ALIG_RD_LVC_CH_FAIL
LVC_DSQ_CH_RST = ALIG_RD_LVC_CH_RST
LVC_DSQ_SK_RST = ALIG_RD_LVC_SK_RST
LVC_DSQ_CH_DATA = ALIG_RD_LVC_CH_DATA
LVC_DSQ_SK_LPID = ALIG_RD_LVC_SK_LPID
LVC_DSQ_WID = ALIG_RD_LVC_WID
LVC_DSQ_CH_STS_VT = ALIG_RD_LVC_CH_STS_VT
LVC_DSQ_CH_STS_VC4 = ALIG_RD_LVC_CH_STS_VC4
LVC_DSQ_CH_STS_VTG_TYPE =
ALIG_RD_LVC_CH_STS_VTG_TYPE
```

8.9 Sink Configured as LCAS Interworking with Non-LCAS Source

When an LCAS channel detects that both the CRC and the control word is zero, it sets the RX_CH_LCAS_NL_SRC status bit. This is likely to happen due to network management configuration error where a non-LCAS source is associated with an LCAS sink. In this case, software should see this status bit set on all channels of the VCG. Note that this does not change any other LCAS operation.

Software can then reset the channels and the sink port to reconfigure them as a non-LCAS VCG. Normally, for each member of a non-LCAS VCG, the expected sequence number needs to be configured by the NMS. However, in this case, it may be desirable for software to use the received sequence numbers. In order to do, software first may enable the VCG with dummy expected sequence numbers assigned to the member channels. Software will then determine the actual sequence numbers that the software is using through the accepted sequence number status parameters. During this time, the accepted bits of the channels can be turned off (or the associated IFR port may be disabled). Finally, software will reconfigure the expected sequence numbers of the channels based on the accepted status variables in the previous step.

9. De-Sequencer (DSQ)

On its input data path, the DSQ module interfaces to the LVC. The payload data bytes coming out of the DSQ after reordering is multiplexed with payload data from non-VC channels before passing them to IFR.

The function of the DSQ is to reorder payload bytes arriving from the network for a VCG according to the receive slot order of its member channels to match the VC sequence order of those channels. In the case of LCAS VCGs, the VC sequence numbers to use for reordering are extracted from H4/K4 overhead bytes. In the case of non-LCAS VCGS, the configured expected sequence numbers are used. Note that the DSQ module itself does not know if a VCG is in LCAS or non-LCAS mode.

The data (both payload and H4/K4) bytes received on channels that are members of a VCG are pushed to the DSQ using the fixed 1344×1 calendar in the common configuration and calendar generator block. The same calendar is also used to pull reordered data from it.

In every timeslot assigned to a given channel that is a member of a VCG, a pull request is always made whether or not a byte is pushed. When a payload byte is pushed to DSQ, the DSQ may not have a byte available to pass to the packet side. The converse is also true.

Figure 7:
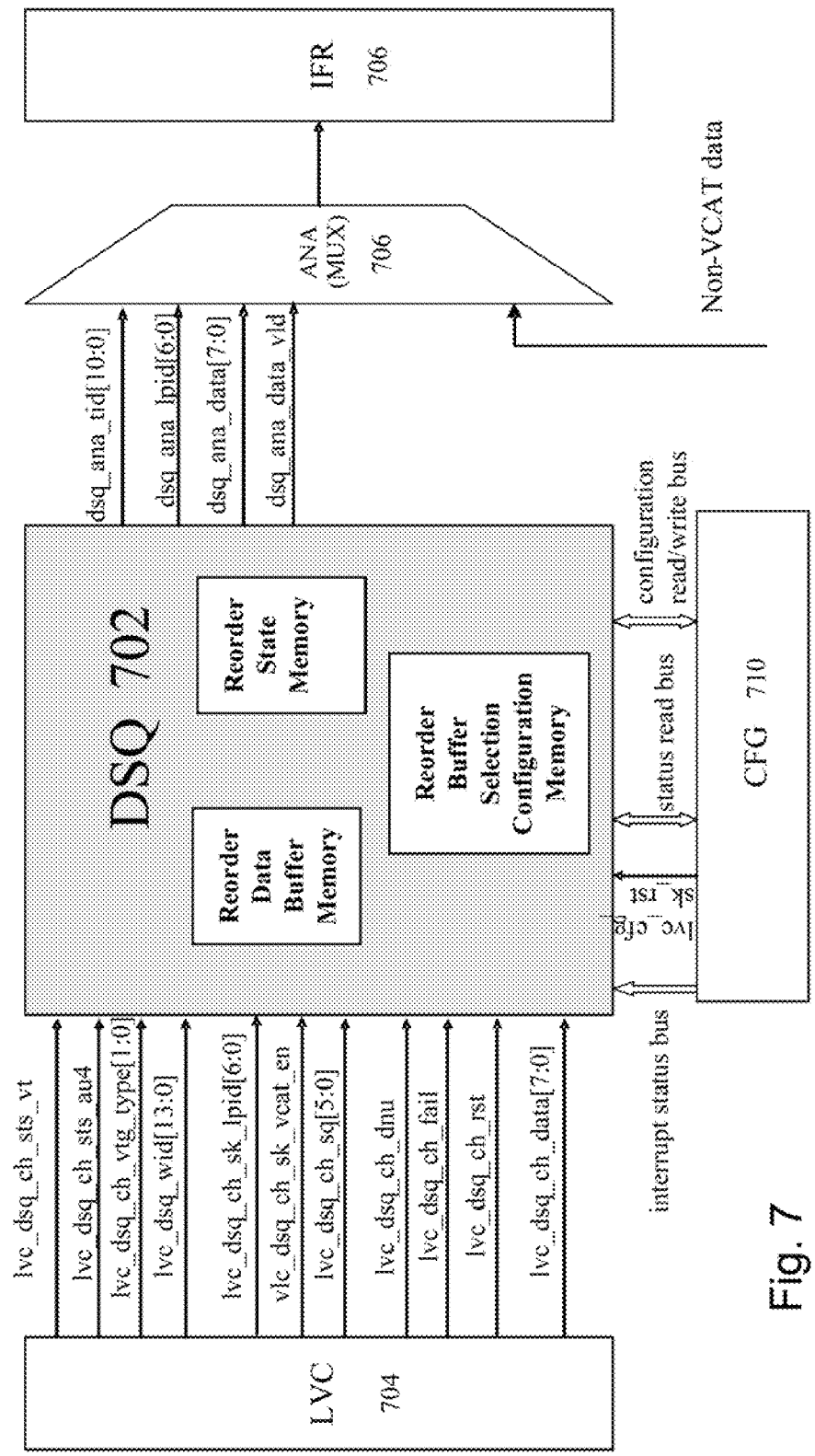
FIG. 7 is an illustration of a DSQ.

FIG. 7 shows the interfaces of the DSQ module and the memories contained in it. The desequencer 702 interfaces with the LVC 704, the ANA multiplexer 706 (Which outputs to the input frame (IFR) 708), and the CFG 710. The DSQ includes a reorder data buffer memory, a reorder state memory and a reorder buffer selection configuration memory.

9.1 Interface to LVC

The DSQ receives the following calendar, configuration and control information from LVC in each clock cycle along with a payload byte, if any.

9.1.1 Calendar and Configuration Information

RX_CH_STS_VT
RX_CH_STS_VTG_TYPE
RX_CH_VC4
RX_WID
RX_CH_SK_LPID 9.1.2 Control Information Payload data valid
Channel fail condition
Channel reset condition
DNU
SQ 9.2 Interface to ANA The DSQ provides the following configuration and control information to the ANA in each clock cycle along with a payload byte, if any:

RX_CH_LPID
RX_CH_DATA_VLD 9.3 Interface to CFR

The DSQ generates interrupt status set requests to the CFR for the following events:

RX_SK_RBID_CHG_DONE

There are no status variables kept in the DSQ.

9.4 Interface to CFG

The DSQ maintains the following configuration parameters for each VCG:

RX_SK_RBID_0
RX_SK_RBID_1

The CFG module directs read and write requests for these parameters to the DSQ module.

The DSQ does not have any status parameters.

The DSQ passes sink port reset signal it receives from LVC to the CFG whenever it generates an interrupt to it. Note that the DSQ does not use the sink port reset signal for its own operation.

9.4.1 Interrupt Events

The DSQ generates the following interrupt events to the CFG:

RX_CH_VCAT_SK_RBID_CHG_DONE 9.5 Configuration

The following configuration parameters are implemented using 128×20 flops.

RX_VCAT_SK_RBID_SEL parameter.

| Configuration Parameter | Size | Value after initialization |
|---|---|---|
| RX_VCAT_SK_RBID_0 | 10 | Undefined |
| RX_VCAT_SK_RBID_1 | 10 | Undefined |

Note that before any channels that map to a VC enabled sink port are brought out of reset, the reorder buffer configuration parameters for that port shall be configured properly.

Note that the DSQ module implements active/shadow access scheme for these parameter to stay compatible with the VCT_TX architecture. While there is no pending change involved, the RX_VCAT_SK_RBID_SEL parameter identifies the active copy. Software should be able to read only the active copy. Software can read from or write to the shadow copy. Software requests active and shadow copies to be switched by toggling the RX_VCAT_SK_RBID_SEL parameter. When the change is done, the DSQ module will generate a change done interrupt.

9.6 State

The following sink port level state parameters are implemented using 128×11 flops.

| State Variable | Size | Value after initialization |
|---|---|---|
| WR_BUF_SEL | 1 | 0 |
| BUF0_VLD | 1 | 0 |
| BUF1_VLD | 1 | 0 |
| NEXT_RD_POS | 6 | 0 |
| RBID_RD_COPY | 1 | 0 |
| RBID_WR_COPY | 1 | 0 |

9.7 Reorder Buffer Data Memory

The structure of the reorder buffer memory is the same as the reorder buffer memory in the VCT_TX block except that the data width is 9 bits. One bit is used as DNU bit.

9.8 Payload De-Sequencing Algorithm

The algorithm used by DSQ is similar to the payload-sequencing algorithm used in the VCT_TX block in many aspects, including the reorder buffer and the buffer flipping based on calendar rotations. However, there are some important differences as well. The payload de-sequencing algorithm uses the channel sequence numbers when writing to the reorder buffer and keeps track of next read position for each VCG. Additionally, the DSQ needs to deal with stalls, channel failures and DNU conditions.

The ALIG_RD may stall not only because data is read faster than it arrives but also data flow from existing members of an LCAS VCG may have to be stalled when adding a new member that has a longer delay than existing members. However, The ALIG_RD design guarantees that a VCG will not stall in the middle. In other words, during a calendar rotation of the corresponding type (and in absence of member channel failures), all members of the VCG will pass data to the LVC/DSQ or none of them will pass data. This alleviates the need to keep track of number of bytes written in each VCG and allows calendar rotations to be used for buffer flipping.

Failures on accepted channels need to be handled by the DSQ. In such a case, the DSQ will invalidate the current write buffer. The LVC masks failures on unaccepted channels but sets the DNU bit.

As discussed in section 8.7.3, the LVC passes data to the DSQ in every clock whether there is available data, whether it is payload or H4/K4 or whether a channel is in fail/reset condition or not. However, the LVC sets the DNU bit in all cases but the one where there is a valid payload byte from an accepted channel whose current control word is not set to DNU. This way, the DSQ does need to care if a byte that is written to it is really a valid payload byte or not.

The DSQ does not process data or update its state in clock cycles for channels that are either in reset or unaccepted. Note that non-VCAT channels will typically have their accepted configuration bit set to zero.

9.9 Reorder Buffer

Each VCG is assigned a reorder buffer from one of four pools based on the current size of the VCG. Logically, a reorder buffer contains two buffers, both of which have one byte of space for each possible member of the VCG. While payload bytes are written to one buffer, payload bytes, if any available, are read from the other buffer. The buffers of a given VCG are swapped at calendar rotation point corresponding to the type of that VCG.

The same reorder data buffer core used on the VCT_TX block can be used in DSQ with the exception that the data width is 9 bits to accommodate the DNU bit. This core presents four single port memories as a logical dual port memory that can be addressed using a reorder buffer id and a relative position within the specified reorder buffer.

When the size of a VCG needs to grow beyond the capacity of the current reorder buffer assigned to it, the VCG needs to be assigned to a bigger reorder buffer. As discussed in the VCT_TX architecture, the pool capacities are dimensioned such that any combination of VCGs can be accommodated.

The payload de-sequencing algorithm handles reorder buffer changes as in the payload-sequencing algorithm used in the VCT_TX block. First, the write process switches to the new reorder buffer at the beginning of the next calendar rotation for that VCG, followed by the read process in the next round.

The DSQ block synchronizes the reorder buffer changes by itself. Software configures the reorder buffer ids and which one of them the DSQ shall use for a given VCG. In any member channel timeslot of a VCG, when DSQ sees that the current one it is using is different than the new value configured by software, it starts the change at the beginning of the next round. At the end of that round, the switch will be done and the DSQ will provide a reorder buffer done change signal to the CFR block.

9.10 Buffer Flipping Based on Calendar Rotations

Since the calendar generator state encoded in RX_WID signal is provided to the DSQ explicitly, the DSQ flips buffers of VCGs of a given type when it sees the wheel position for the corresponding type become zero.

The following table shows the global buffer flipping conditions for different VCG types.

| VCG Type | Global Buffer Select Flipped When |
|---|---|
| VC-4 | When RX_WID[13:10] is zero (VC-4 wheel position is zero) |
| VC-3 | When RX_WID[13:8] is zero (VC-4 and VC-3 wheel position are zero) |
| TU-3 | When RX_WID[13:8] is zero (VC-4 and VC-3 wheel position are zero) |
| VC-12 | When RX_WID[13:2] is zero (VC-4, VC-3, VC-2 and VC-11 wheel positions are zero |
| VC-11 | When RX_WID[13:4] and RX_WID[1:0] are zero (VC-4, VC-3, VC-2 and VC-12 wheel positions are zero |

For each VCG type, the DSQ maintains a global WR_BUF_SEL state variable. These variables are flipped according to the above conditions.

In addition, each VCG maintains its own WR_BUF_SEL state variable. When the first member channel of a VCG that sees the WR_BUF_SEL variable of that VCG different than the corresponding global state variable, the VCG state variable is toggled. This ensures that the VCG state variable is toggled only once during a corresponding calendar rotation.

9.11 TID for ANA

The DSQ module generates the dsq_ana_tid signal it provides to the ANA based on the calendar and channel type information it receives from the LVC module as follows:

```
If (lvc_dsq_sts_VC4) {
    lVC_dsq_tid = alig_rd_lvc_wid[12:9] * 84
}
Else If (~lvc_dsq_sts_vt) {
    dsq_ana_tid = lvc_dsq_wid[12:9] * 84 + lvc_dsq_wid[8:7] * 28
}
Else If (lvc_dsq_sts_vtg_type) { // VC-11
    dsq_ana_tid = lvc_dsq_wid[12:9] * 84 + lvc_dsq_wid[8:7] * 28 +
                  lvc_dsq_wid[6:4] * 4 + lvc_dsq_wid[1:0]
}
Else { // VC-12
    dsq_ana_tid = lvc_dsq_wid[12:9] * 84 + lvc_dsq_wid[8:7] * 28 +
                  lvc_dsq_wid[6:4] * 4 + lvc_dsq_wid[3:2]
}
```

The "vct_rx_uarch" document has an optimized implementation of these equations.

The TID generation is done in every clock cycle whether or not the channel associated with that timeslot is associated with a VCAT sink port and whether or not the channel is in fail/reset condition.

Note that whether a channel is in reset condition or not doesn't affect the channel structure. The channel structure information is kept in separate STS level registers.

9.12 Pseudo-Code

```
// Global Write Buffer Select Update Check
If (~lvc_dsq_ch_sts_vt) {
    If (lvc_dsq_ch_VC4) {
        If (lvc_dsq_wid[13:10] == 0) {
            RX_VCAT_VC4_WR_BUF_SEL = ~RX_VCAT_VC4_WR_BUF_SEL
        }
    }
    Else {
        If (lvc_dsq_wid[13:10] == 0) {
            RX_VCAT_VC3_WR_BUF_SEL = ~RX_VCAT_VC3_WR_BUF_SEL
        }
    }
}
Else {
    If (lvc_dsq_ch_vtg_type == 0) { // VT12
        If (lvc_dsq_wid[13:2] == 0) {
            RX_VCAT_VC12_WR_BUF_SEL = ~RX_VCAT_VC12_WR_BUF_SEL
        }
    }
    Else {
        If ((lvc_dsq_wid[13:4] == 0) && (lvc_dsq_wid[1:0] == 0)) {
            RX_VCAT_VC11_WR_BUF_SEL = ~RX_VCAT_VC11_WR_BUF_SEL
        }
    }
}
// For channels in reset or that are not accepted don't
// process data and update state
If (~lvc_dsq_ch_rst && lvc_ch_accepted) {
    // Read the configuration memory entry for this VCG
    {Rbid0, Rbid1, Rbid_Sel} = DSQ_CFG_MEM[lvc_dsq_ch_sk_lpid]
    // Read the state memory entry for this VCG
    {Wr_Buf_Sel,
     Buf0_Vld,
     Buf1_Vld,
     Next_Rd_Pos
     Rbid_Wr_Copy,
     Rbid_Rd_Copy} = DSQ_STATE_MEM[lvc_dsq_ch_sk_lpid]
    // Determine if we are flipping the VCG of this channel or not
    Flip = 0
    If (~lvc_dsq_ch_sts_vt) {
        If (lvc_dsq_ch_VC4) {
            If (lvc_dsq_wid[13:10] == 0) {
                Flip = (RX_VCAT_VC4_WR_BUF_SEL != Wr_Buf_Sel)
            }
        }
        Else {
            If (lvc_dsq_wid[13:10] == 0) {
                Flip = (RX_VCAT_VC3_WR_BUF_SEL != Wr_Buf_Sel)
            }
        }
    }
    Else {
        If (lvc_dsq_ch_vtg_type == 0) { // VT12
            If (lvc_dsq_wid[13:2] == 0) {
                Flip = (RX_VCAT_VC12_WR_BUF_SEL != Wr_Buf_Sel)
            }
        }
```

```
            Else {
                If ((lvc_dsq_wid[13:4] == 0) && (lvc_dsq_wid[1:0] == 0)) {
                    Flip = (RX_VCAT_VC11_WR_BUF_SEL != Wr_Buf_Sel)
                }
            }
        }
    }
    If (Flip) {
        // Flip the buffers
        Wr_Buf_Sel = ~Wr_Buf_Sel
        // Initially buffer is valid
        Wr_Buf_Vld = 1
        // Next read position starts at zero at the beginning of a
        // calendar rotation
        Next_Rd_Pos = 0
        // Update reorder buffer copy used by write and read side
        // if a change requested and generate interrupt when change
        // is done
        If (Rbid_Sel != Rbid_Wr_Copy) {
            Rbid_Wr_Copy = Rbid_Sel
        }
        Else If (Rbid_Sel != Rbid_Rd_copy) {
            Rbid_Rd_Copy = Rbid_Sel
            Generate RX_SK_RBID_CHG_DONE interrupt for
            lvc_dsq_ch_sk_lpid
        }
    }
    // Determine the read and write buffer ids to use in this cycle
    If (Rbid_Wr_Copy) {
        Wr_Rbid= Rbid1
    }
    Else {
        Wr_Rbid = Rbid0
    }
    If (Rbid_Rd_Copy) {
        Rd_Rbid= Rbid1
    }
    Else {
        Rd_Rbid= Rbid0
    }
    // A fail condition on an accepted channel causes current
    // write buffer to be invalidated
    If (lvc_dsq_ch_fail) {
        Wr_Buf_Vld = 0
    }
    // Do the write
    If (lvc_dsq_ch_sq <= GET_RB_CAPACITY (Wr_Rbid)) {
        WRITE_TO_RB  (Wr_Rbid,
                      Wr_Buf_Sel,
                      lvc_dsq_ch_sq,
                      lvc_dsq_ch_dnu,
                      lvc_dsq_ch_data)
    }
    // Do the read
    {Rd_Data, Rd_DNU} = READ_FROM_RB   (Rd_Rbid,
                                        ~Wr_Buf_Sel,
                                        Next_Rd_Pos)
    Next_Rd_Pos++
    // Generate the data and data valid signals to ANA
    If (Rd_Buf_Vld && ~Rd_DNU) {
        // Got valid payload data to send out
        dsq_ana_data_vld = 1
        dsq_ana_data = Rd_Data
    }
    Else {
        dsq_ana_data_vld = 0
    }
    // Update the VCG state
    If (Wr_Buf_Sel) {
        Buf1_Vld = Wr_Buf_Vld
    }
    Else {
        Buf0_Vld = Wr_Buf_Vld
    }
    DSQ_STATE_MEM[lvc_dsq_ch_sk_lpid] =    {Wr_Buf_Sel,
                                            Buf0_Vld,
                                            Buf1_Vld,
                                            Next_Rd_Pos
                                            Rbid_Wr_Copy,
                                            Rbid_Rd_Copy}
}
```

```
Else { // Channel in reset or not accepted
   dsq_ana_data_vld = 0
   dsq_ana_data = 0 // dummy
}
// LPID is passed through for non-VCAT channels
dsq_ana_lpid = lvc_dsq_ch_sk_lpid
// Generate the TID for ANA for non-VCAT channels
If (lvc_dsq_sts_vt) {
   If (lvc_dsq_sts_vtg_type) { // VC-11
      dsq_ana_tid =  lvc_dsq_wid[12:9] * 84 +
                     lvc_dsq_wid[8:7] * 28 +
                     lvc_dsq_wid[6:4] * 4 +
                     lvc_dsq_wid[1:0]
   }
   Else { // VC-12
      dsq_ana_tid = lvc_dsq_wid[12:9] * 84 +
                    lvc_dsq_wid[8:7] * 28 +
                    lvc_dsq_wid[6:4] * 4 +
                    lvc_dsq_wid[3:2]
   }
}
Else If (lvc_dsq_sts_vc4) {
   lvc_dsq_tid = alig_rd_lvc_wid[12:9] * 84
}
Else {
   dsq_ana_tid = lvc_dsq_wid[12:9] * 84 + lvc_dsq_wid[8:7] * 28
}
```

1. Overview 1.1 Functional Decomposition Model

Figure 8:
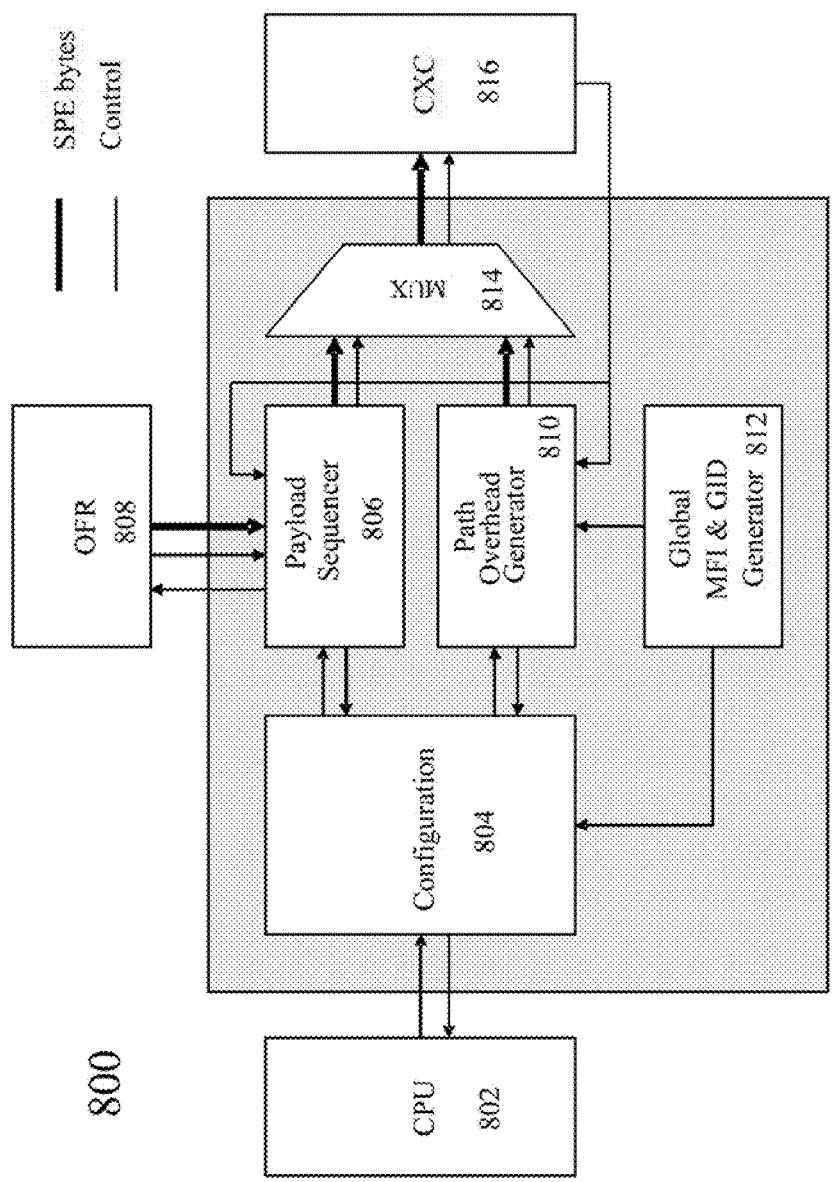
FIG. 8 is an illustration of a VCT_TX.

FIG. 8 shows the high level components of the virtual concatenation transmit (VCT_TX) block. The VCT_TX 800 interfaces with a cpu 802, and includes a configuration module 804 for communicating with the CPU. The configuration module also communicates with payload sequencer 806 (this interfaces with output OFR 808), and also communicates with path overhead generator 810. The configuration module and path overhead generator both receive input from the Global multiframe indicator (MFI) and group identification (GID) generator module 812. The payload sequencer and path overhead generator are multiplexed, both the SPE bytes and control data, and the output is sent to the cross connect (CXC). The data path of the VCT_TX block is completely driven by the requests from the CXC, which generates the frame calendar (including the VT super frame cycle).

When CXC makes a valid request in a given clock cycle, it specifies the channel id as well as frame position information such as the row and column numbers. Based on this information, the TX_VCAT block determines if a request from the CXC is for a payload byte or for an overhead byte and in the latter case which specific overhead byte should be generated. The payload requests are passed to the payload sequencer block and the overhead byte requests are passed to the path overhead generator block. The data outputs from these blocks are synchronized and multiplexed to the data input of the CXC.

In order to support VCAT function, payload bytes pulled from OFR are passed through a payload sequencer. Since the sequence numbers assigned to member channels of a VCG can represent a different order than the transmission slot order of the channels, the payload data bytes pulled from OFR need to be buffered before being sent to the CXC. The specific payload-sequencing algorithm chosen is described in herein.

Path overhead generator provides a response for all path overhead bytes. However, except for the H4/Z7 bytes, zeros are generated. Path overhead generator uses global MFI and GID counters and per channel internal state to generate the H4/Z7 overhead bytes.

To support LCAS, two copies of configuration memories that store VCAT forward control information and LCAS reverse control information are maintained. When software makes a request to change the configuration of a particular LCAS VCG to modify its membership or update LCAS reverse control information, global MFI counters are used to synchronize the configuration changes to frame boundaries corresponding to beginning of LCAS control packets.

This example does not show the data path for channels that are carrying packet data but are not virtually concatenated. However, the data flow process for such channels is described in the behavioral specification herein.

Payload Sequencing and De-Sequencing Algorithms

According to one embodiment of the invention, a system and method for performing a payload-sequencing algorithm is to reorder bytes pulled from the packet side according to the transmission slot order of member channels of a VCG, to match the programmed sequence order of those channels. It is also configured to handle dynamic VCG membership changes.

The payload-sequencing algorithm used by the VCT_TX block can be described at different levels. At one level, the basic reordering algorithm for a single VCG is described, which is the core of the overall payload-sequencing algorithm. The reordering algorithm uses double buffering to handle VCG membership changes to support LCAS.

It should be pointed out that the basic reordering algorithm could be reused in the design of de-sequencer module of the VCT_RX block. In fact, it would possible to use the same reordering core logic in these two blocks.

Next, we describe how the algorithm works for multiple VCGs in the context of the VCT_TX block. The key observation here is that VCGs of different type (i.e. type of the member channels) have different calendar rotation periods. For example, ignoring invalid clock cycles, an STS-1 type VCG will have a rotation calendar of 48 clocks whereas a VT-1.5/TU-11 type VCG will have a rotation calendar of 1344 clocks. The notion of calendar rotation period of a VCG is important within the VCT_TX block, because the payload-sequencing algorithm uses calendar rotations to control when reordering buffers of VCG are swapped between the read and write processes.

Finally, we introduce the concept of VCG buffer pair pools based on the maximum VCG size that a given buffer pair supports. This is an optimization technique for reducing the amount of buffer memory. It requires an extension to the reordering algorithm for switching between buffer pairs from different pools due to VCG membership changes.

2.1 Reordering Algorithm for Virtual Concatenated Groups (VCG)

Figure 9:
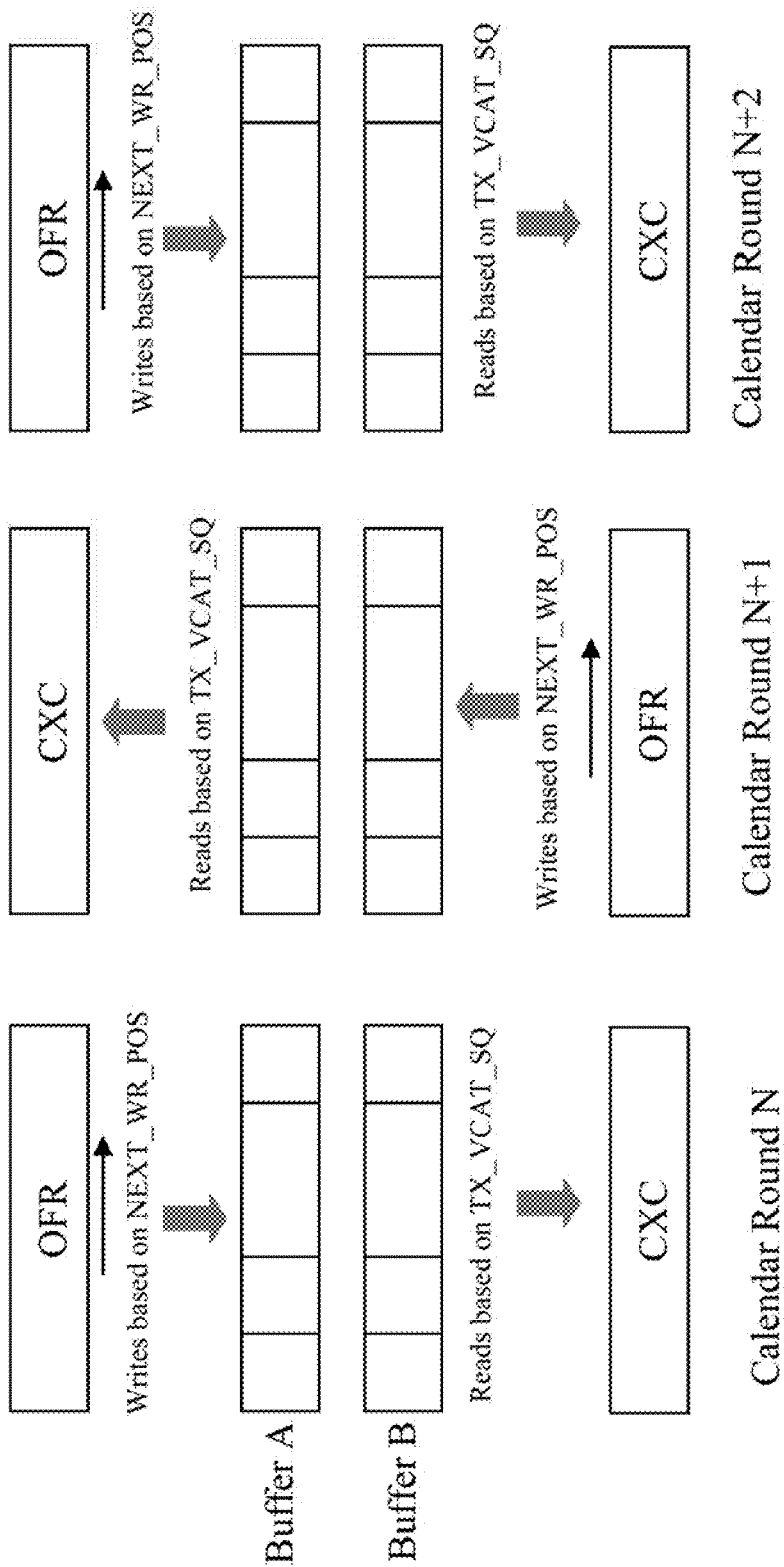
FIG. 9 is an illustration of a Buffer system.

FIG. 9 shows how the reordering algorithm uses a pair of buffers for each VCG. The byte capacity of each of the buffers is equal to or greater than the number of members of the VCG. The read and write processes alternate between these two buffers. While the write process is writing to one buffer, the read process is reading from the other buffer. Note that both processes are driven by the CXC requests.

The write process maintains a NEXT_WR_POS state variable for each VCG. Initially, this variable is set to zero. When CXC requests a payload byte for a given channel, the write process pulls a byte from OFR using the TX_PL_LPID configuration parameter of that channel and stores it in the current write buffer of that VCG at the location indexed using the NEXT_WR_POS state variable.

The NEXT_WR_POS state variable of a VCG is incremented by one every time a byte is written to the current write buffer of the VCG. After the number of bytes written to a VCG becomes equal to the size of that VCG, this variable is set to zero again and the next write to this VCG will happen after the buffers are swapped.

When CXC requests a payload byte for a given channel, the read process loads a byte from the current read buffer of a VCG at the location corresponding to the configured VCAT sequence number of that channel. So unlike writes, successive reads may not access consecutive locations in the current read buffer.

The reordering algorithm does not know the size of the VCG and therefore cannot determine by itself when to swap the VCG buffers between the read and write process. It assumes that this is tracked separately and the buffers will be swapped and NEXT_WR_POS variable be reset under the control of an external agent. In the case of the VCT_TX block, since all members of a VCG of a given type would have written one byte in one calendar rotation for that type, buffers can be swapped and the NEXT_WR_POS state variables of all VCGs of that type can be reset at either the beginning or end of the calendar rotation for that type.

Note that the reordering algorithm assumes that by the time the writes are finished, the reads from the previous round have also finished. This is clearly true for the VCT_TX block since both reads and writes are driven from the same calendar. Note that this assumption also holds for the VCT_RX block since IFR can accept a new request every clock without stalling. The VCT_RX block needs to deal with stalling of writes but this would be handled outside the reordering algorithm.

2.1.1 Dynamic Membership Changes

In order to handle dynamic VCG membership changes, the read process runs one rotation calendar behind the write process in terms of the configuration values it uses. Configuration changes can only take affect at frame boundaries corresponding to beginning of LCAS control packets. So for a VCG of a given type, in the first rotation calendar of that type that coincides within a frame that coincides with the beginning of an LCAS control packet for that type, the write process may use new configuration (in terms of which channels are members of this VCG and are requesting data; i.e. channels whose control word is NORM/WS) whereas the read process uses the previous configuration (which channels are members of this VCG and requesting data, and their sequence numbers). In the next calendar rotation, the read process will also use the new configuration.

During initialization of a VCG, before a member channel is brought out of reset, we assume that the software will set both copies of control word for that channel to IDLE. Therefore, neither the read nor write process would access the reordering buffers during initialization. Afterwards, when the control word configuration of some or all the member channels are set to NORM/WS, the write process will see configuration change first and start writing one round before the read processes see the configuration change and starts reading.

The examples provided in the next section illustrate the operation of the algorithm under dynamic configuration changes. For simplicity, we will consider a single high-order VCG within an STS-3 frame in the examples.

2.1.2 Reordering Algorithm Operation Examples

In the examples provided in this section, we consider a single VCG that initially has two members. The examples show, in each time slot, the data bytes pulled from OFR and written to the buffer, the data bytes read from the buffer and passed to the CXC, and the contents of the buffers.

TABLE A

Initial Members Example

| | Round | | | | | | | | |
|---|---|---|---|---|---|---|---|---|---|
| | −1 | | | 0 | | | 1 | | |
| Slot | 0 | 1 | 2 | 0 | 1 | 2 | 0 | 1 | 2 |
| NEXT_WR_POS | — | 0 | 1 | — | 0 | 1 | — | 0 | 1 |
| Input | — | D0 | D1 | — | D2 | D3 | — | D4 | D5 |
| TX_VCAT_SQ | — | 1 | 0 | — | 1 | 0 | — | 1 | 0 |
| WrBuf | A | A | A | B | B | B | A | A | A |
| WrAddr | — | 0 | 1 | — | 0 | 1 | — | 0 | 1 |
| RdBuf | B | B | B | A | A | A | B | B | B |
| RdAddr | — | — | — | 1 | 0 | — | 1 | 0 | — |
| BA-0 | — | D0 | D0 | D0 | D0 | — | — | D4 | D4 |
| BA-1 | — | — | D1 | D1 | — | — | — | — | D5 |
| BA-2 | — | — | — | — | — | — | — | — | — |
| BB-0 | — | — | — | — | D2 | D2 | D2 | D2 | — |
| BB-1 | — | — | — | — | — | D3 | D3 | — | — |
| BB-2 | — | — | — | — | — | — | — | — | — |
| Output | — | 0 | 0 | — | D1 | D0 | — | D3 | D2 |

TABLE B

Member Addition Example

| | Round | | | | | | | | | | | |
|---|---|---|---|---|---|---|---|---|---|---|---|---|
| | 12382 | | | 12383 | | | 12384 | | | 12385 | | |
| Slot | 0 | 1 | 2 | 0 | 1 | 2 | 0 | 1 | 2 | 0 | 1 | 2 |
| NEXT_WR_POS | — | 0 | 1 | 0 | 1 | 2 | 0 | 1 | 2 | 0 | 1 | 2 |
| Input | — | D24766 | D24767 | D24768 | D24769 | D24770 | D24771 | D24772 | D24773 | D24774 | D24775 | D24776 |
| TX_VCAT_SQ | — | 1 | 0 | 2 | 1 | 0 | 2 | 1 | 0 | 2 | 1 | 0 |
| WrBuf | B | B | B | A | A | A | B | B | B | A | A | A |

TABLE B-continued

Member Addition Example

| | Round | | | | | | | | | | | |
|---|---|---|---|---|---|---|---|---|---|---|---|---|
| | 12382 | | | 12383 | | | 12384 | | | 12385 | | |
| WrAddr | — | 0 | 1 | 0 | 1 | 2 | 0 | 1 | 2 | 0 | 1 | 2 |
| RdBuf | A | A | A | B | B | B | A | A | A | B | B | B |
| RdAddr | — | 1 | 0 | — | 1 | 0 | 2 | 1 | 0 | 2 | 1 | 0 |
| BA-0 | D24764 | D24764 | — | D24768 | D24768 | D24768 | D24768 | D24768 | — | D24774 | D24774 | D24774 |
| BA-1 | D24765 | — | — | — | D24769 | D24769 | D24769 | — | — | — | D24775 | D24775 |
| BA-2 | — | — | — | — | — | D24770 | — | — | — | — | — | D24776 |
| BB-0 | — | D24766 | D24766 | D24766 | D24766 | — | D24771 | D24771 | D24771 | D24771 | D24771 | — |
| BB-1 | — | — | D24767 | D24767 | — | — | — | D24772 | D24772 | D24772 | — | — |
| BB-2 | — | — | — | — | — | — | — | D24773 | — | — | — | — |
| Output | — | D24765 | D24764 | — | D24767 | D24766 | D24770 | D24769 | D24768 | D24773 | D24772 | D24771 |

The first example illustrated in Table A shows the algorithm operation starting from round 0 assumed to correspond to the beginning of a high order multi-frame (i.e. the first payload byte of STS-1 0). Note that the VCG configuration is modified to have two active members from having no active members in the previous round (i.e. the last payload byte of STS-1 2), which is numbered as −1.

The next example provided in Table B shows the algorithm operation when a new member is added to the VCG in the next multi-frame, which starts at calendar round 12,384. Again, note that the configuration is changed at the end of the multi-frame boundary (i.e. calendar rotation 12,383) since read process lags one round behind the write process. We assume that the size of the VCG buffer is at least 3-bytes to accommodate the new member addition.

The last example provided in Table C shows the algorithm operation when the member with sequence number 0 is removed from the VCG at the next multi-frame, which starts at calendar round 24,768.

2.1.3 Handling LCAS Temporary Member Removal

The LCAS protocol uses the DNU control word to indicate that a member is temporarily removed. When a channel is in DNU state, it does not carry payload data. On the write side, hardware should therefore not pull payload data from OFR in the timeslots for that channel. On the read side, it should send zeros.

However, the sequence numbers conveyed in the LCAS control packets do not change when one or more members are in the DNU state. If we used the sequence numbers that should be sent in LCAS control packets to control the read process, the reordering algorithm would not work correctly when one or more members of a VCG are in DNU state. Therefore, hardware uses separate sequence numbers for payload and overhead to handle temporary member removal.

Table D shows how the algorithm operates when the member with sequence 1 goes to DNU instead of being deleted permanently. Assume that round 12384 corresponds to the first calendar rotation in the frame whose H4 byte starts the first LCAS control packet that indicates DNU for this member. For the 16 frames less one calendar, i.e. till round 24767, the payload configuration does not change. At that calendar rotation the payload configuration changes.

TABLE C

Member Removal Example

| | Round | | | | | | | | | | | |
|---|---|---|---|---|---|---|---|---|---|---|---|---|
| | 24766 | | | 24767 | | | 24768 | | | 24769 | | |
| Slot | 0 | 1 | 2 | 0 | 1 | 2 | 0 | 1 | 2 | 0 | 1 | 2 |
| NEXT_WR_POS | 0 | 1 | 2 | 0 | 1 | — | 0 | 1 | — | 0 | 1 | — |
| Input | D61920 | D61921 | D61922 | D61923 | D61924 | — | D61925 | D61926 | — | D61927 | D61928 | — |
| TX_VCAT_SQ | 2 | 1 | 0 | 1 | 0 | — | 1 | 0 | — | 1 | 0 | — |
| WrBuf | B | B | B | A | A | A | B | B | B | A | A | A |
| WrAddr | 0 | 1 | 2 | 0 | 1 | — | 0 | 1 | — | 0 | 1 | — |
| RdBuf | A | A | A | B | B | B | A | A | A | B | B | B |
| RdAddr | 2 | 1 | 0 | 2 | 1 | 0 | 1 | 0 | — | 1 | 0 | — |
| BA-0 | D61917 | D61917 | — | D61923 | D61923 | D61923 | D61923 | — | — | D61927 | D61927 | D61927 |
| BA-1 | D61918 | — | — | — | D61924 | D61924 | — | — | — | — | D61928 | D62928 |
| BA-2 | — | — | — | — | — | — | — | — | — | — | — | — |
| BB-0 | D61920 | D61920 | D61920 | D61920 | D61920 | — | D61925 | D61925 | D61925 | D61925 | — | — |
| BB-1 | — | D61921 | D61921 | D61921 | — | — | — | D61926 | D61926 | — | — | — |
| BB-2 | — | — | D61922 | — | — | — | — | — | — | — | — | — |
| Output | D61919 | D61918 | D61917 | D61922 | D61921 | D61920 | D61924 | D61923 | — | D61926 | D61925 | — |

TABLE D

Temporary Member Removal Example

| | Round | | | | | | | | | | | |
|---|---|---|---|---|---|---|---|---|---|---|---|---|
| | 24766 | | | 24767 | | | 24768 | | | 24769 | | |
| Slot | 0 | 1 | 2 | 0 | 1 | 2 | 0 | 1 | 2 | 0 | 1 | 2 |
| NEXT_WR_POS | 0 | 1 | 2 | 0 | 1 | — | 0 | 1 | — | 0 | 1 | — |
| Input | D61920 | D61921 | D61922 | D61923 | D61924 | — | D61925 | D61926 | — | D61927 | D61928 | — |
| TX_VCAT_PL_SQ | 2 | 1 | 0 | 1 | — | 0 | 1 | — | 0 | 1 | — | 0 |
| TX_LCAS_OH_SQ | 2 | 1 | 0 | 2 | 1 | 0 | 2 | 1 | 0 | 2 | 1 | 0 |
| TX_VCAT_CTRL | EOS | DNU | NORM | EOS | DNU | NORM | EOS | DNU | NORM | EOS | DNU | NORM |
| WrBuf | B | B | B | A | A | A | B | B | B | A | A | A |
| WrAddr | 0 | 1 | 2 | 0 | — | 1 | 0 | — | 1 | 0 | — | 1 |
| RdBuf | A | A | A | B | B | B | A | A | A | B | B | B |
| RdAddr | 2 | 1 | 0 | 2 | 1 | 0 | 1 | — | 0 | 1 | — | 0 |
| BA-0 | D61917 | D61917 | — | D61923 | D61923 | D61923 | D61923 | D61923 | — | D61927 | D61927 | D61927 |
| BA-1 | D61918 | — | — | — | — | D61924 | — | — | — | — | — | D62928 |
| BA-2 | — | — | — | — | — | — | — | — | — | — | — | — |
| BB-0 | D61920 | D61920 | D61920 | D61920 | D61920 | — | D61925 | D61925 | D61925 | D61925 | D61925 | — |
| BB-1 | — | D61921 | D61921 | D61921 | — | — | — | — | D61926 | — | — | — |
| BB-2 | — | — | D61922 | — | — | — | — | — | — | — | — | — |
| Output | D61919 | D61918 | D61917 | D61922 | D61921 | D61920 | D61924 | — | D61923 | D61926 | — | D61925 |

Note that the sequence numbers used for payload reordering, called TX_VCAT_PL_SQ, are configured as if the member was removed where as the sequence numbers used in the overhead, called TX_LCAS_OH_SQ, did not change.

2.2 Payload Sequencing Algorithm Considering Multiple VCGs

Figure 10:
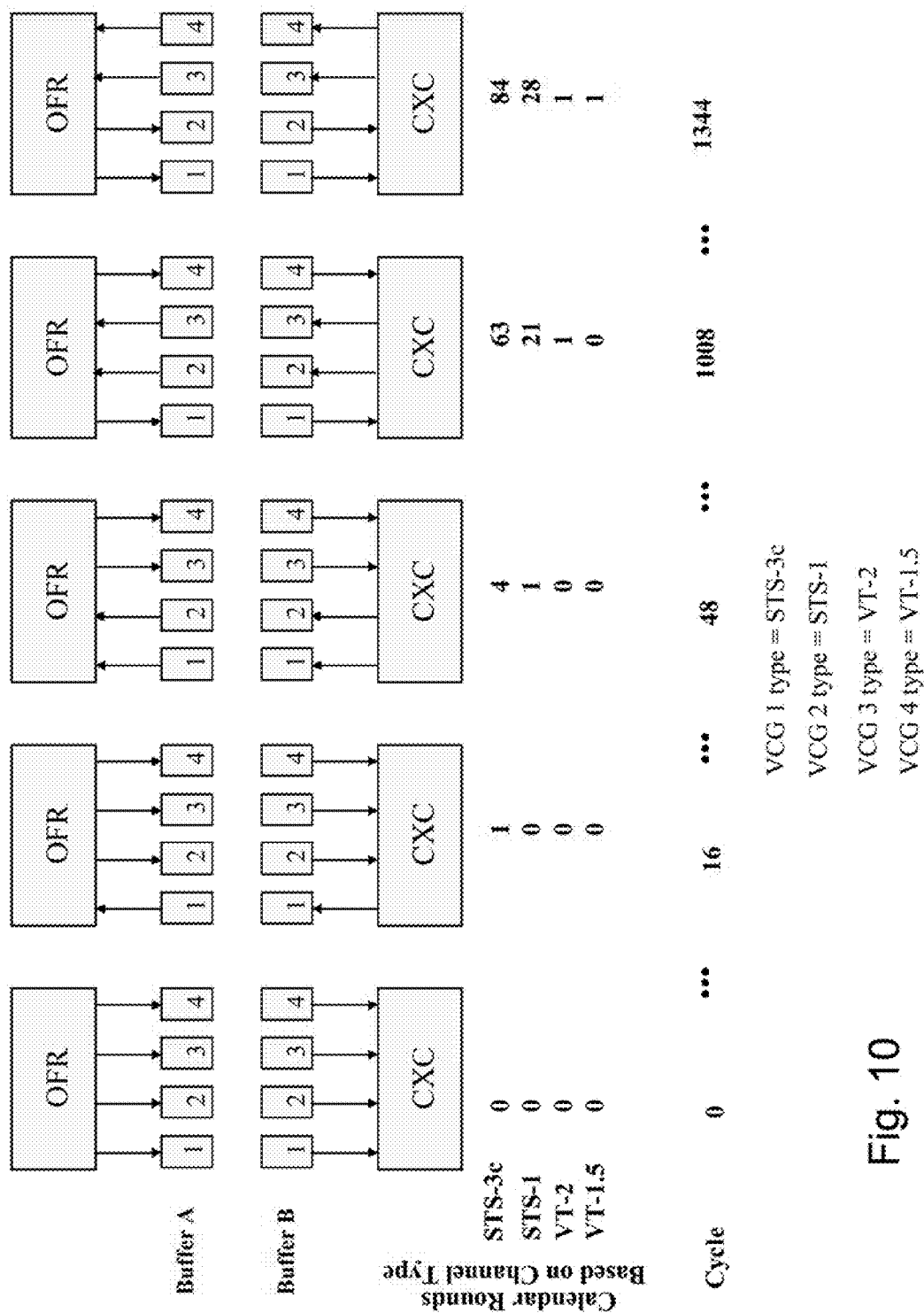
FIG. 10 is an illustration of a system for calendar rounds based on Channel type.

FIG. 10 shows how the payload-sequencing algorithm works with four VCGs of different types. Buffer A and B represent the two copies data buffer memories used to support the double buffering scheme of the reordering algorithm. It is assumed that calendar generation for all channel types started at clock 0.

The calendar rotation periods of these VCGs in terms of number of (valid) clock cycles is shown in the following table.

| VCG Number | Type | Calendar Rotation Period |
|---|---|---|
| 1 | STS-3c | 16 |
| 2 | STS-1 | 48 |
| 3 | VT-2 | 1008 |
| 4 | VT-1.5 | 1344 |

Due to differences between calendar rotation periods of different channel types, for each VCG type we need to keep track of which copy of the reorder buffer memories should be used for writing and which copy for reading. When the calendar rotates for a given channel type, all VCGs of that type switch write/read view of their reorder buffer memories. FIG. 10 illustrates a payload sequencing algorithm with VCGs of different type.

Note that it is possible to use single port memories for the data buffers by aligning the read and write process pipelines such that only one VCG is reading and writing from the buffer memories in a given clock.

2.3 Reorder Buffer Pools

Reorder buffers are grouped into the following pools based on their capacities:
 64-byte pool
 32-byte pool
 16-byte pool
 8-byte pool A VCG is assigned by software to a reorder buffer from a specific pool based on the size of that VCG. For example, if the VCG is to have 10 member channels initially, it can be assigned to a reorder buffer from the 16-byte pool. If the size of this VCG needed to grow beyond 16 members later on, then the VCG would need to be mapped to a bigger buffer from. By the same token, if the size of the VCG gets reduced below 8 in the future, the VCG may be switched to an 8-byte buffer pair in order to make the 16-byte buffer pair available to another VCG that may need it. The switching mechanism between buffer pairs is discussed in the following section.

Given the total number of channels that may need to be virtually concatenated, we can determine the number of buffer pairs that each pool needs to have in order to have no limitations on VCG combinations. For 1344 channels, the way we do this is as follows:
1. The maximum number of 33 member VCGs is 40. Since the only pool that can be used for these VCGs is the 64-byte pool, the capacity of the 64-byte buffer pool must be 40.
2. The maximum number of 17 member VCGs is 79. We can use either the 64-byte or the 32-byte pool for them. If we used all the buffer pairs in the 64-byte pool for them, we would need 79-40=39 buffer pairs in the 32-byte pool.
3. The maximum number of 9 member VCGs is 149. We can use the 64-byte, the 32-byte pool, or the 16-byte pool for them. If we used all the buffer pairs in the 64-byte, 32-byte and 16-byte pools for them, we would need 149-79-40=70 buffer pairs in the 16-byte pool.
4. The maximum number of 8 member VCGs is 168. We can use the 64-byte, 32-byte, or 16-byte pool for them. If we used all the buffer pairs in the 64-byte, 32-byte, and 16-byte pools for them, we would need 168-70-39-40=19 buffer pairs in the 8-byte pool.

To summarize, the required capacity of each pool for supporting 1344 channels is as follows:

| Pool Type | Pool Capacity |
|---|---|
| 64-byte | 40 |
| 32-byte | 39 |
| 16-byte | 70 |
| 8-byte | 19 |

The total number of buffer bytes required with buffer pooling optimization is 10160 bytes. Without this optimization, i.e. assuming that each VCG can have 64 members, the required bytes would be 32768 bytes. Ignoring memory-structuring inefficiencies that would be involved in supporting buffer pools, this represents savings of about 69%.

Note that since the total number of reorder buffers (168) is greater than the number of VCGs that need to be supported (128), there is no concern for the case where all VCGs are used and none of them have more than 8 members.

2.3.1 Switching Reorder Buffers

Switching from one type of reorder buffer to another happens at calendar boundaries. Since the read and write processes alternate between the two buffers of a reorder buffer at frame boundaries anyway, switching from one type of reorder buffer to another can be handled the same way as dynamic membership changes are handled; i.e. by having the read see configuration change one calendar after the write process. For reorder buffer switching, what changes is the VCG to reorder buffer mapping configuration.

Figure 11:
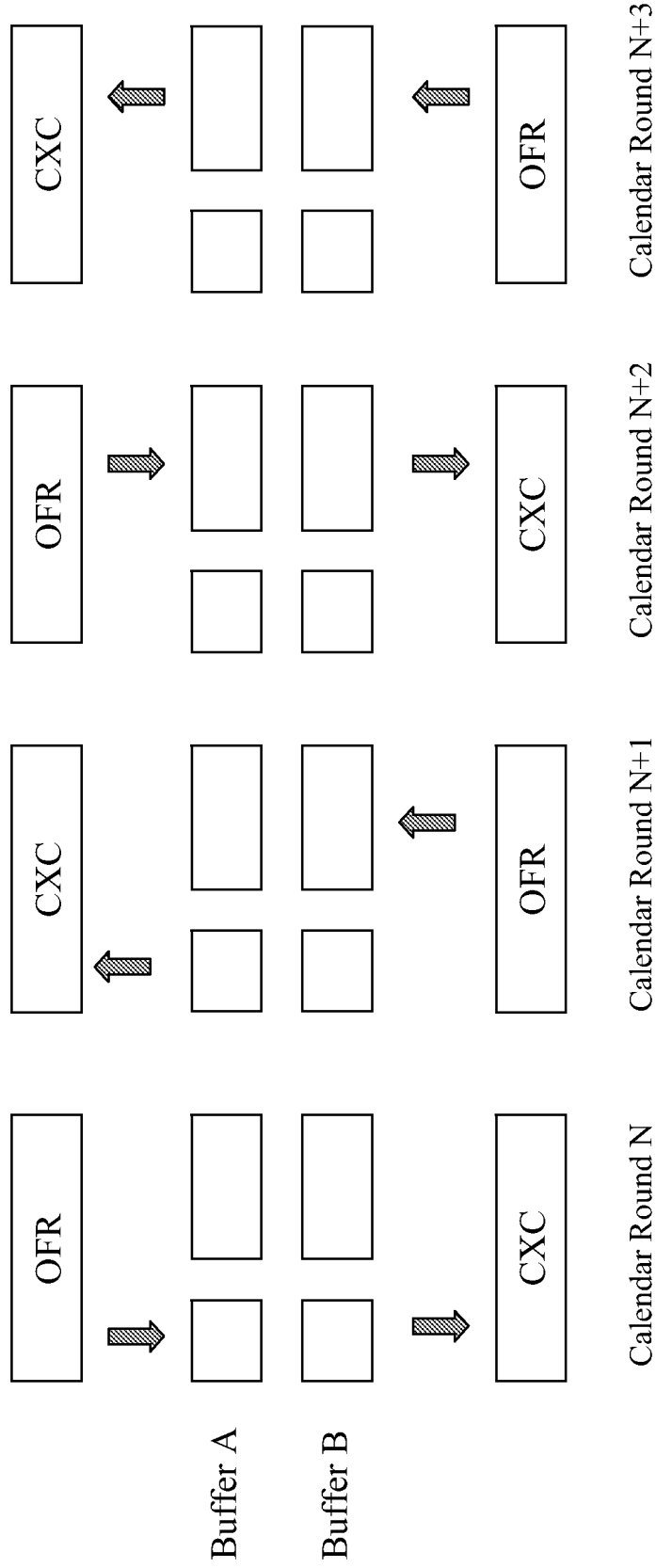
FIG. 11 is an illustration of a Buffer system.

FIG. 11 shows how reorder buffer switching would be accomplished. The smaller buffer pair in calendar round N is the current reorder buffer used by the VCG. In round N+1, the write process uses the new buffer pair but the read process reads from the old buffer pair. Starting from round N+2, the VCG has switched to the new larger buffer pair for both read and write processes and the old buffer pair can be returned to the pool.

Software needs to specify what the next reorder buffer that should be used by a VCG and provide an indication to the hardware of the requested change for the affected VCG. Once the hardware sees the indication, it will first switch the write process for that VCG to the new buffer at the next calendar boundary. In the following calendar boundary, the read process will switch to the new buffer as well.

FIG. 11 illustrates an example of switching between buffer pairs. Note that the reorder buffer switch can happen at any calendar boundary, so it can be decoupled from membership configuration changes that happen at multi-frame boundaries. For example, before adding new members to a VCG, software can first switch the VCG to a new buffer or greater capacity and then add the new members to the VCG. When members are being removed, software may switch the VCG to a smaller buffer pair after the remove operation is completed.

On the other hand, there is no reason why reorder buffer switching cannot be done in the VCT_TX block at the same time as membership configuration changes are done. By combining them, the same software configuration change mechanism be used to make VCAT forward configuration changes. We assume this is the case in the configuration model described in section 3

2.3.2 Reorder Buffer Switching Example

Table E provides an example of how two reorder buffers are used during the buffer switching. In this example, the VCG is initialized in calendar round 0 with a reorder buffer 1 that has two bytes of capacity. Starting in round 2, the VCG switches to reorder buffer 2, which has three bytes of capacity. At the end of round 4, the switching operation is complete and reorder buffer 1 is available for use by another VCG.

TABLE E

Switching To Larger Buffer Pair Example

| | Round 0 | | | Round 1 | | | Round 2 | | | Round 3 | | |
|---|---|---|---|---|---|---|---|---|---|---|---|---|
| Slot | 0 | 1 | 2 | 0 | 1 | 2 | 0 | 1 | 2 | 0 | 1 | 2 |
| NEXT_WR_POS | — | 0 | 1 | — | 0 | 1 | — | 0 | 1 | — | 0 | 1 |
| Input | — | D0 | D1 | — | D2 | D3 | — | D4 | D5 | — | D6 | D7 |
| TX_VCAT_SQ | — | 1 | 0 | — | 1 | 0 | — | 1 | 0 | — | 1 | 0 |
| WrBuf | A1 | A1 | A1 | B1 | B1 | B1 | A2 | A2 | A2 | B2 | B2 | B2 |
| WrAddr | — | 0 | 1 | — | 0 | 1 | — | 0 | 1 | — | 0 | 1 |
| RdBuf | B1 | B1 | B1 | A1 | A1 | A1 | B1 | B1 | B1 | A2 | A2 | A2 |
| RdAddr | — | — | — | — | 1 | 0 | — | 1 | 0 | — | 1 | 0 |
| A1-0 | — | D0 | D0 | D0 | — | — | — | — | — | — | — | — |
| A1-1 | — | — | D1 | D1 | — | — | — | — | — | — | — | — |
| B1-0 | — | — | — | — | D2 | D2 | D2 | D2 | — | — | — | — |
| B1-1 | — | — | — | — | — | D3 | D3 | — | — | — | — | — |
| A2-0 | — | — | — | — | — | — | — | D4 | D4 | — | D4 | — |
| A2-1 | — | — | — | — | — | — | — | — | D5 | — | — | — |
| A2-2 | — | — | — | — | — | — | — | — | — | — | — | — |
| B2-0 | — | — | — | — | — | — | — | — | — | — | D6 | D6 |
| B2-1 | — | — | — | — | — | — | — | — | — | — | — | D7 |
| B2-2 | — | — | — | — | — | — | — | — | — | — | — | — |
| Output | — | 0 | 0 | — | D1 | D0 | — | D3 | D2 | — | D5 | D4 |

Configuration Model

Some configuration parameters are specified at the channel level whereas others are specified at the VCG level. Channel level parameters are prefixed with TX_CH and VCG level parameters are prefixed with TX_SO or TX_SK, depending on if they refer to forward or reverse directions, respectively.

Except for TX_CH_SO_LPID parameter, all configuration parameters are applicable to channels that are members of a VCG. Some of these parameters apply only to LCAS VCGs, whereas other parameters apply to both non-LCAS and LCAS VCGs. Parameters that apply only to LCAS VCGs are distinguished by using LCAS in the parameter name. Parameters that apply to both LCAS and non-LCAS VCGs are distinguished by using VCAT in the parameter name The configuration parameters that control the payload types of transmit logical ports, i.e. TX_SO_VCAT_EN and TX_SO_LCAS_EN parameters, are static in the sense that while there are any out-of-reset transmit channels that are mapped to a given logical port, the value of these parameters for that logical port should not be changed.

All other parameters are dynamic in the sense that they can be changed without resetting the channels. However, in the case of TX_CH_SO_LPID parameter, if a channel is currently assigned to a VCG (i.e. SO_VCAT_EN is set), then the TX_CH_VCAT_CTRL parameter of that channel should first be changed to IDLE (and change completed) before changing the TX_CH_SO_LPID parameter of that channel.

Software can trigger configuration changes at one of the four levels independently:

VCG level VCAT/LCAS forward configuration
VCG level LCAS reverse MST and RS_ACK configuration
Channel level LCAS reverse insert sink port and insert enable configuration
Channel level source port mapping configuration The configuration parameters that change at the VCG forward or reverse level require two copies to support dynamic VCG configuration changes to support LCAS and also to support orderly VCG bring up and shutdown in the case of non-LCAS VCGs.

Note that even though some dynamic configuration parameters (e.g. TX_VCAT_CTRL) are specified at the channel level, they are changed at the VCG level. This allows configuration changes involving multiple member channels to take affect simultaneously.

The following table provides the list of configuration parameters, their static/dynamic nature and at what level they are changed.

the configuration switch process, both copies of configuration information need to be available for up to 32 ms for a low order LCAS VCG.

Channel type configuration is not required in the VCT_TX block since the CXC provides this information with each request.

The parity bits used for error detection in configuration memories are not shown.

Note that the global reset bit for the VCT_TX block is kept outside the block.

3.1.1 Global Configuration

| Parameter | Size | Initial value after global reset |
|---|---|---|
| FAST_LOCK_EN | 1 | 0 |
| TX_MFI_EN | 1 | 0 |
| TX_SHORT_FRAME_EN | 1 | 0 |

The FAST_LOCK_EN applies to both VCT_TX and VCT_RX. So it will be kept outside the VCT_TX block. The TX_MFI_EN and TX_SHORT_FRAME_EN parameters apply only to VCT_TX block but they may also be kept outside as well.

| Configuration Parameter | Static or Dynamic | Change level | Copies |
|---|---|---|---|
| TX_CH_SO_LPID | Dynamic[1] | Channel forward | 1 |
| TX_CH_VCAT_PL_SQ | Dynamic | VCG forward | 2 |
| TX_CH_LCAS_OH_SQ | Dynamic | VCG forward | 2 |
| TX_CH_VCAT_CTRL | Dynamic | VCG forward | 2 |
| TX_CH_LCAS_REV_INS_EN | Dynamic | Channel reverse | 1 |
| TX_CH_LCAS_REV_INS_SK_LPID | Dynamic | Channel reverse | 1 |
| TX_SO_VCAT_EN | Static | N/A | 1 |
| TX_SO_LCAS_EN | Static | N/A | 1 |
| TX_SO_VCAT_RBID | Dynamic | VCG forward | 2 |
| TX_SK_LCAS_MST | Dynamic | VCG reverse | 2 |
| TX_SK_LCAS_RS_ACK | Dynamic | VCG reverse | 2 |

Note
[1]Even though the TX_CH_SO_LPID parameter is dynamic, in order to ensure orderly VCG configuration changes, if a channel is currently assigned to a VCG, then the TX_CH_VCAT_CTRL parameter of that channel should first be changed to IDLE and forward change completed before changing its TX_CH_SO_LPID parameter.

For configuration parameters that have two copies, the same type of configuration change control mechanism is used for either forward or reverse VCG level change. Software specifies which copy of the configuration that hardware shall use using a select bit. Hardware synchronizes the changes to proper frame boundaries and can notify software when the change is completed by an interrupt.

During the switch over from the previous configuration to the new configuration, software should not change the previous configuration of the VCG as hardware may be using the previous configuration. The amount of switching time depends on if the reverse of forward configuration is being changed and whether or not VCG is LCAS enabled or not.

3.1 Configuration Memories

Memories that store static configuration parameters and dynamic configuration change control parameters must be dual ported to support simultaneous hardware and software access.

Memories that store dynamic configuration parameters are also dual ported to reduce the amount of time that software has to wait to make a new change (likely to another VCG) while a previous change is in progress. This is because during Note that these global configuration parameters are designed for speeding up verification.

3.1.2 Per Channel Configuration 3.1.2.1 TX_LPID_CFG_MEM

The following configuration parameters are grouped into a 1344×9 dual port memory, which is shared by high and low order channels.

| Parameter | Size | Initial value after global reset |
|---|---|---|
| TX_CH_RST | 1 | 1 |
| TX_CH_SO_LPID | 8 | Undefined |
| TX_CH_LCAS_REV_INS_EN | 8 | 0 |
| TX_CH_LCAS_REV_INS_SK_LPID | 8 | Undefined |

3.1.2.2 TX_CH_VCAT_FWD_CFG_MEM_0/1

The following configuration parameters are grouped into a 1344x16 dual port memory, which is shared by high and low order channels.

| Parameter | Size | Initial value after global reset |
|---|---|---|
| TX_CH_VCAT_PL_SQ | 6 | Undefined |
| TX_CH_LCAS_OH_SQ | 6 | Undefined |
| TX_CH_VCAT_CTRL | 4 | IDLE |

There are two copies of this memory to support dynamic VCG configuration changes. Software makes per VCG switch requests using the TX_SO_VCAT_FWD_SEL configuration parameter. Hardware compares the TX_SO_VCAT_FWD_SEL configuration parameter with the internal TX_SO_VCAT_FWD_COPY state variable. If they are different, this means that software has requested a change. When the switch is done, hardware will set the TX_SO_VCAT_FWD_CHG_DONE interrupt status bit.

3.1.3 Per VCG Configuration Memories 3.1.3.1 TX_SO_PL_TYPE_CFG_MEM

The following configuration parameters are grouped into a dual port 128×2 memory:

| Parameter | Size | Initial value after global reset |
|---|---|---|
| TX_SO_VCAT_EN | 1 | 0 |
| TX_SO_LCAS_EN | 1 | 0 |

While there are channels out of reset that are mapped to this port, these parameters should not be changed.

3.1.3.2 TX_SO_VCAT_RBID_CFG_MEM_0/1

The following configuration parameters are grouped into a dual port 128×10 memory:

| Parameter | Size | Initial value after global reset |
|---|---|---|
| TX_SO_VCAT_RBID | 10 | Undefined |

There are two copies of this memory to support dynamic VCG configuration changes. Software makes per VCG switch requests using the TX_SO_VCAT_FWD_SEL configuration parameter. Hardware compares the TX_SO_VCAT_FWD_SEL configuration parameter with the internal TX_SO_VCAT_FWD_COPY state variable. If they are different, this means that software has requested a change. When the switch is done, hardware will set the TX_SO_VCAT_FWD_CHG_DONE interrupt status bit.

3.1.3.3 SO_VCAT_FWD_SEL_CFG_MEM

The following configuration parameters are grouped into a dual port 128×2 memory:

| Parameter | Size | Initial value after global reset |
|---|---|---|
| TX_SO_VCAT_FWD_SEL | 1 | 0 |
| TX_SO_VCAT_FWD_CHG_DONE_INT_EN | 1 | 0 |

3.1.3.4 SK_LCAS_REV_SEL_CFG_MEM

The following configuration parameters are grouped into a dual port 128×2 memory:

| Parameter | Size | Initial value after global reset |
|---|---|---|
| TX_SK_LCAS_REV_SEL | 1 | 0 |
| TX_SK_LCAS_REV_CHG_DONE_INT_EN | 1 | 0 |

3.1.3.5 SK_LCAS_REV_CFG_MEM_0/1

The following configuration parameters are grouped into a dual port 128x65 memory:

| Parameter | Size | Initial value after global reset |
|---|---|---|
| TX_SK_LCAS_INS_MST | 64 | 1 |
| TX_SK_LCAS_INS_RS_ACK | 1 | 0 |

There are two copies of this memory to support dynamic VCG configuration changes. Software makes per VCG switch requests using the TX_SK_LCAS_REV_SEL configuration parameter. Hardware compares the TX_SK_LCAS_REV_SEL configuration parameter with the internal TX_SK_LCAS_REV_COPY state variable. If they are different, this means that software has requested a change. When the switch is done, hardware will set the TX_SK_LCAS_REV_CHG_DONE interrupt status bit.

4. Interrupt Status Model 4.1 Interrupt Status Memories

Software has both read and write access to the interrupt status memories to read and clear interrupt status bits. Hardware needs only write access to set the interrupt status bits.

If an interrupt status read request from software collides with a write (i.e. set) request from hardware, new values from the write request are passed as read results.

If an interrupt status clear request from software collides with a set request from hardware, the interrupt status will be set.

4.1.1 Per VCG Interrupt Status Memories 4.1.1.1 TX_SO_VCAT_FWD_CHG_DONE_MEM

The following interrupt status parameters are grouped into a dual port 128×1 memory:

| Parameter | Size | Initial value after global reset |
|---|---|---|
| TX_SO_VCAT_FWD_CHG_DONE | 1 | 0 |

4.1.1.2 TX_SK_LCAS_REV_CHG_DONE_MEM

The following interrupt status parameters are grouped into a dual port 128×1 memory:

| Parameter | Size | Initial value after global reset |
|---|---|---|
| TX_SK_LCAS_REV_CHG_DONE | 1 | 0 |

5 State Model

Except possibly in diagnostic mode, the state memories do not need to be accessible by software.

Parity bits used for error detection in all state memories except for the payload sequencer buffer are not shown in this section.

5.1 State Memories
5.1.1 Per Channel State Memories
5.1.1.1 TX_CH_LCAS_STATE_MEM The following state variables are grouped into a dual port 1344×12 memory, which is shared by high order and low order channels

| Parameter | Size | Initial value after channel reset |
| --- | --- | --- |
| TX_CH_LCAS_CRC | 8 | 0 |
| TX_CH_LCAS_CRC_ALIGNED | 1 | 0 |

5.1.2 Per VCG State Memories
5.1.2.1 TX_SO_VCAT_STATE_MEM

The following state variables are grouped into a dual port 128×10 memory:

| Parameter | Size | Initial value after global reset |
| --- | --- | --- |
| TX_SO_VCAT_FWD_COPY | 1 | 0 |
| TX_SO_VCAT_FWD_TOGGLE_STATE | 2 | 0 |
| TX_SO_VCAT_WR_B_SEL | 1 | 0 |
| TX_SO_VCAT_WR_POS | 6 | 0 |

Although the above memory assumes that the write buffer memory selection state is kept per VCG, it is possible to use a global variable for each VCG type for this purpose.

5.1.2.2 TX_SK_LCAS_STATE_MEM

The following state variables are grouped into a dual port 128×3 memory:

| Parameter | Size | Initial value after global reset |
| --- | --- | --- |
| TX_SK_LCAS_REV_COPY | 1 | 0 |
| TX_SK_LCAS_REV_TOGGLE_STATE | 1 | 0 |
| TX_SK_LCAS_REV_TOGGLE_MFI2_LSB | 1 | Undefined |

5.2 Global State Variables

| Parameter | Size | Initial value after global reset |
| --- | --- | --- |
| HO_MFI1 | 4 | 0 |
| HO_MFI2 | 8 | 0 |
| HO_GID | 16 | 0 |
| LO_MFI1 | 5 | 0 |
| LO_MFI2 | 5 | 0 |
| LO_GID | 16 | 0 |

5.3 Payload Reorder Buffer Memories
5.3.1 PL_REORDER_BUF_MEM_0/1

There are two copies of payload reorder buffer memory (or memories) to implement the double buffering scheme used by the reordering algorithm. It is possible to use single port memories by aligning the read and write process pipelines such that only one VCG is reading and writing from the buffer memories within one clock.

Spec for Alligner
6 Introduction

Orion's VC/LCAS alignment block is responsible for de-skewing or desequencing the member channels belonging to the same virtually concatenated group (VCG). The de-skewing is performed by compensating in external DRAM the network differential delay accumulated by the different channels.

The VCT aligner receives one byte of data per clock cycle from the VCT analyzer, along with control information for that byte. The data sequence consists of time interleaved Sonet channels (HO SPEs or LO VT SPEs). There is no frame no multi-frame alignment between the different SPEs. The differential delay between them is arbitrary and dependent on the external network topology.

After going through the VCT aligner, the SPEs of all the channels belonging to the same VCGs are multi-frame aligned. At the output of the VCT aligner, contiguous payload bytes for each VCG (on different) are made available. This is sufficient for the VCT De-sequencer to reorder bytes and recover the VCG payload.

Figure 12:
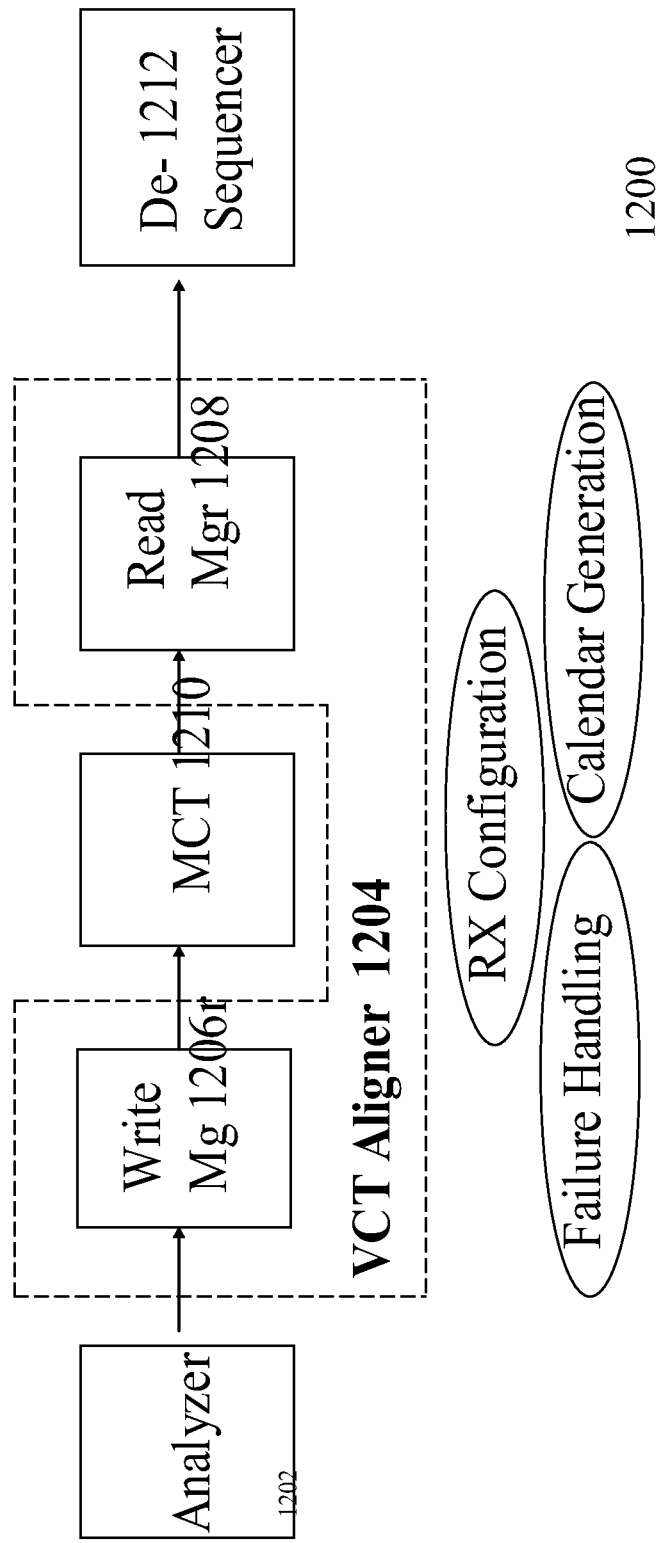
FIG. 12 is an illustration of a VCT an aligner.

FIG. 12 shows the various modules within the VCT alignment block. The VCT aligner consists of a Write Manager module and Read Manager module. It also uses information generated by the configuration, calendar generation, and failure handling logic. The Write Manager temporarily stores data arriving one byte at a time on per-channel FIFOs. After accumulating enough bytes for a given channel, they get sent to DRAM in a burst. The Read Manager performs the inverse process: it reads data from DRAM in bursts and stores the data on per channel FIFOs before being sent out one byte at a time.

The alignment process itself is performed by the Read Manager. This is done by selectively draining channel FIFOs so that all FIFO data for a given VCG is aligned.

The entire VCT aligner makes heavy use of free-running TDM calendars to move data from one stage to the next. All calendars follow the same order of channels (determined through configuration), but each calendar may rotate at a different speed depending on the amount of data that needs to be moved.

Also, a failure handling unit determines which channels and VCGs are active at any given time, The system of FIG. 12 illustrates a system 1200 having and analyzer 1202, such as an MFI analyzer, a VCT aligner 1204 that includes a write manager 1206 and a read manager 1208. The system further includes a MCT 1210, which may be internal or external to the system. The output is sent to the desequencer 1212.

7 Calendars

There are 5 stages within the VCT alignment block where a free-running calendar is used to decide which channel is being serviced next. There are 4 different calendars used for this purpose (two of the stages share the same calendar). Each calendar follows the same order which is determined through configuration. However, each different calendar travels this order using a different speed, resulting in different periods. The four calendars in the VCT alignment block have the following clock-cycle periods: 1×1344, 2×1344, 56×1344, and 62×1344.

Figure 13:
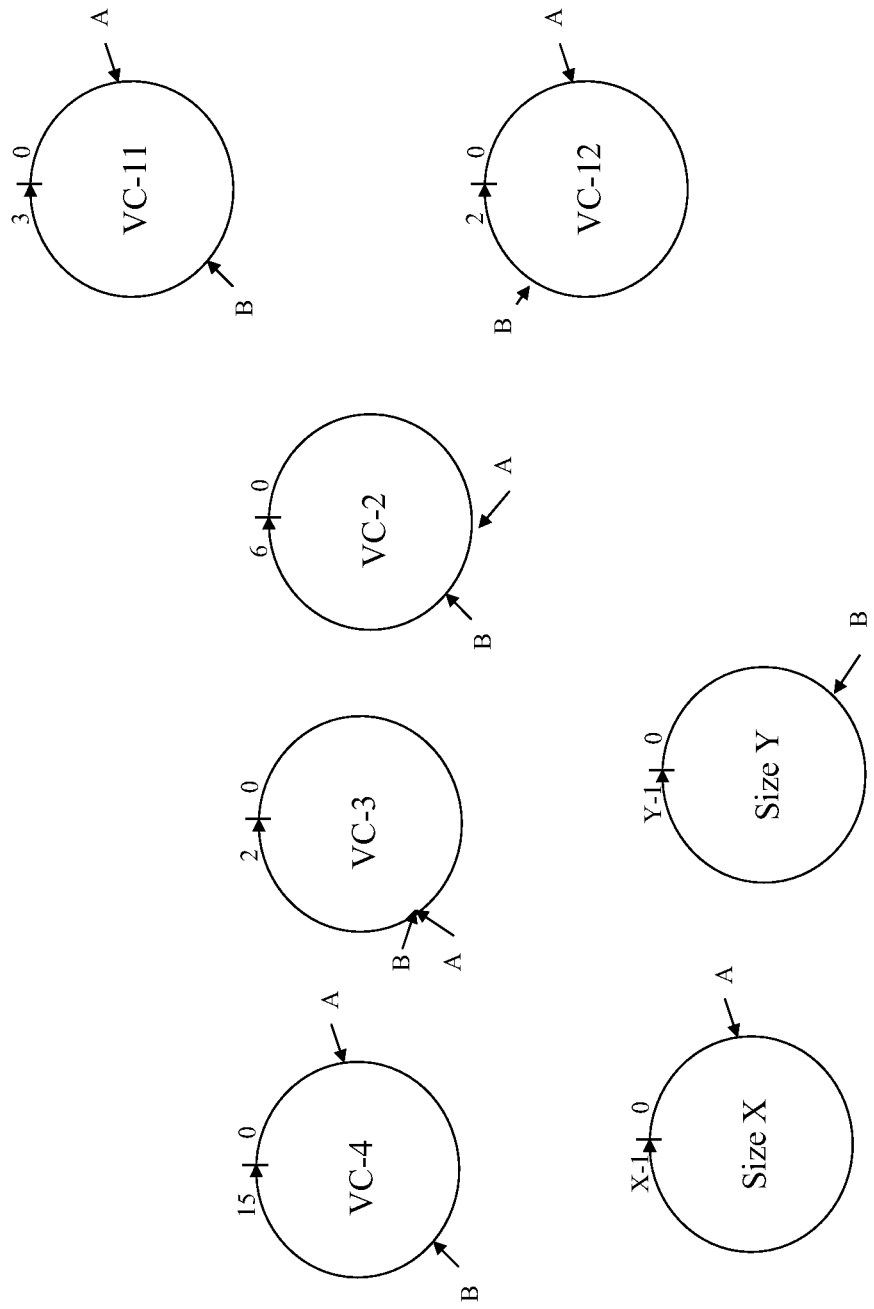
FIG. 13 is an illustration of how calendars are generated by the VCT aligner.

FIG. 13 shows how the calendars are generated by the VCT aligner. Calendar A (of size X, where X is 1, 2, 56, or 62) has a counter for each of the five wheels VC-4, VC-3, VC-2, VC-12, and VC-11. The VC-4 wheel is of size 16; the VC-3 wheel is of size 3; the VC-2 wheel is of size 7, the VC-12 wheel is of size 3, and the VC-11 wheel is of size 4.

Every X core-clock cycles, the VC-4 counter is incremented by 1. At 15, the counter rolls back to 0. For every VC-4 rotation, the VC-3 counter is incremented by one. Likewise, for every VC-3 rotation, the VC-2 counter is incremented by one. Finally, for every VC-2 rotation, both the VC-11 and VC-12 counters are incremented by one.

The same mechanism is performed for every other calendar, except that the period for updating the first wheel (VC-4) may vary.

In this manner, the four calendars of different speeds are generated by the VCT alignment block. At any time, each calendar provides the current VC-4, VC-3, VC-2, VC-12, and VC-11 counters. This information, along with the channelizations configuration, is sufficient to determine the channel number to be processed next.

The channelization configuration requires 48×9 bits as shown in Table 7. This information might have to be replicated for each calendar to avoid read conflicts.

TABLE 7

Channelization information required in VCT alignment block. x48

| Field | Size | Description |
|---|---|---|
| VC4 | 1 | 1 if this sts is part of a VC-4 (sts-3c) |
| VT | 1 | 1 if sts contains VTs. Used to differentiate between VC-4/3 (including TU-3 mapping) and VC-11/12 |
| VTG1 | 1 | 1 if VTG #1 has VC-11. 0 if it has VC-12 |
| VTG2 | 1 | 1 if VTG #2 has VC-11. 0 if it has VC-12 |
| VTG3 | 1 | 1 if VTG #3 has VC-11. 0 if it has VC-12 |
| VTG4 | 1 | 1 if VTG #4 has VC-11. 0 if it has VC-12 |
| VTG5 | 1 | 1 if VTG #5 has VC-11. 0 if it has VC-12 |
| VTG6 | 1 | 1 if VTG #6 has VC-11. 0 if it has VC-12 |
| VTG7 | 1 | 1 if VTG #7 has VC-11. 0 if it has VC-12 |

8 DRAM Organization and Shared State

The VCT alignment block writes and reads data to/from external DRAM in 64-byte transfers. The external DRAM can hold up to 64 MB of VCAT data. If less storage is required, The DRAM can also be configured to hold only up to 16, 32, or 48 MB of memory. Note that this is a global configuration setting for the entire VCT block.

TABLE 8

DRAM size configuration.

| Field | Size | Description |
|---|---|---|
| DRAM Size | 2 | Size of DRAM space allocated for VCAT. 00-16 MB, 01-32 MB, 10-48 MB, 11-64 MB |

The VCAT data in DRAM is organized in per-channel FIFOs. There are up to 1344 such FIFOs. The maximum size of each FIFO depends on the type of channel as well as the global size of the VCAT DRAM (16 MB-64 MB). Each FIFO uses a fixed position in DRAM that is fixed after the VCT block comes out of reset.

The DRAM location used by each FIFO is determined in such a way that consecutive reads and writes are issued to different DRAM banks. Table F shows how the different VC-4s (sts-3s) are organized in DRAM so that consecutive accesses to the VC-4s will result in continuous periodic interleaving of banks 0 through 3.

TABLE F

DRAM bank interleaving of VCAT FIFOs.

| Bank 0 | | | | Bank 1 | | | | Bank 2 | | | | Bank 3 | | | |
|---|---|---|---|---|---|---|---|---|---|---|---|---|---|---|---|
| VC-4 #0 | VC-4 #4 | VC-4 #8 | VC-4 #12 | VC-4 #1 | VC-4 #5 | VC-4 #9 | VC-4 #13 | VC-4 #2 | VC-4 #6 | VC-4 #10 | VC-4 #14 | VC-4 #3 | VC-4 #7 | VC-4 #11 | VC-4 #15 |

The size of each FIFO depends on the channel type and total VCAT DRAM size. The smallest FIFO would correspond to a vt 1.5 channel in a VCAT DRAM of size 16 MB, while the largest FIFO would correspond to an sts-3c in a VCAT DRAM of size 64 MB. In order to accommodate these variable FIFO sizes, we define a VCAT memory unit (VMU) that is the basic memory size that can be reassigned to different FIFOs.

A VMU has a size of 4096 or 4 KB. A VMU can hold up to 64 64-byte transfers from the VCT block. When in 16 MB mode, a vt1.5 channel is assigned 3 VMUs of DRAM storage, a vt2 is assigned 4 VMUs, an sts-1 is assigned 84 VMUs, and an sts-3c is assigned 256 VMUs. If the VCAT DRAM has more than 16 MB, the per-channel storage is increased proportionately.

A fixed formula can be used to calculate the position in DRAM that is used by a given FIFO. The calendar indices of that channel, as well as the channel type, are used as the input for the formula to compute the starting address of the FIFO. The maximum size of the FIFO depends only on the type of the channel. Let the following variables A, B, C, D, and E be the calendar indices for a given channel:

TABLE 9

Calendar indices for a given channel.

| Index | Value |
|---|---|
| VC-4 | VC-4: $a_1 a_2 a_3 a_4$ (4 bits) |
| VC-2 | VC-2: C (3 bits) |
| VC-11 | VC-11: E (2 bits) |
| VC-3 | VC-3: B (2 bits) |
| VC-12 | VC-12: D (2 bits) |

Using the calendar indices and channel type, Table 10 specifies the formula used to compute the bank number, starting address, and maximum size of each channel FIFO in DRAM. Not that in these formulas, VMU is 4 KB and "S" is the global configuration register specifying the total space used by VCAT (0-16 MB, 1-32 MB, 2-48 MB, 3-64 MB).

TABLE 10

DRAM allocation for VCAT.

| Channel type | | |
|---|---|---|
| VC-4 | Lowest address | $(a_1a_2 * 256) * VMU * (S + 1)$ |
| VC-4 | Max Size | $256 * VMU * (S + 1)$ |
| VC-3 | Lowest address | $(a_1a_2 * 256 + B * 84) * VMU * (S + 1)$ |
| VC-3 | Max Size | $84 * VMU * (S + 1)$ |
| VC-12 | Lowest address | $(a_1a_2 * 256 + B * 84 + C * 12 + D * 4) * VMU * (S + 1)$ |
| VC-12 | Max Size | $4 * VMU * (S + 1)$ |
| VC-11 | Lowest address | $(a_1a_2 * 256 + B * 84 + C * 12 + E * 3) * VMU * (S + 1)$ |
| VC-11 | Max Size | $3 * VMU * (S + 1)$ |
| Bank Number | | $a_3a_4$ |

Note that the above memory allocation scheme leaves a hole of 16 KB for every 1 MB, whenever that space is not used for sts-3c.

The above calculation results in a 2-bit bank number as well as an 18 bit memory address (in 64 byte units).

For each channel FIFO, the alignment block needs to carry the following state information:

TABLE 11

Shared state for DRAM FIFOs.
x1344

| Read pointer | 16 | Pointer to head of DRAM FIFO |
|---|---|---|
| Write pointer | 16 | Pointer to tail of DRAM FIFO |
| Invalid FIFO | 1 | 1 if FIFO is invalid and should not be read |
| Head MFI | 12 | MFI value of first frame being written after failure mode |

The pointers are stored in 64-byte units and are added to the channel FIFO base address to obtain the actual DRAM memory location. The write pointer is updated by the write manager as it stores new 64-byte chunks into DRAM. The read pointer is updated by the read manager as it obtains a new 64-byte transfers from DRAM.

The read pointer is read by the write manager to make sure the FIFO is not full. The write pointer is also read by the read manager in order to verify that the FIFO is not empty.

When a FIFO is reset by the write manager, it will first set the Invalid FIFO bit to one, and then write zero into both the write and read pointers. Whenever a FIFO comes out of reset, the write manager will first write the MFI number of the new valid data into the "Head MFI" field. It will then write the new 64-byte transfer into DRAM, update the write pointer, and unset the Invalid FIFO bit.

9 Reset, Failures, and Alarms

The alignment block supports per-channel as well as per-VCG reset. Both resets are enabled by software by writing into the appropriate RX configuration registers. When a channel is in reset, the alignment block will not process that channel and will flush any FIFOs belonging to that FIFO. When an entire VCG is in reset, it will cause all the member channels to be in reset.

The alignment block also supports per-channel and per-VCG failure mode. Failure mode is very similar to reset mode, except that the mode can be triggered directly by hardware, rather than software. A channel in failure mode is not processed and its FIFOs are flushed. A VCG in failure mode will force all its members to be in failure mode. Unlike software resets that affect channels and VCGs in the entire RX block, the failure mode only affects channels and VCGs in the alignment block.

There are also two types of per channel alarms in the alignment block. The write manager has a per-channel alarm state when it receives an alarm from the analyzer. Likewise, the read manager has a per channel alarm state when it receives an alarm from the MCT The next sections will describe how these alarms are detected.

The failure scenarios are different depending on whether a given channel has been "accepted" by software or not. An accepted member is one that is carrying or expecting to carry valid data. A non-accepted member is one that is not carrying valid data (is in LCAS idle state) but needs to be aligned with the rest of the VCG in order to process its LCAS information. Non-accepted members are treated differently because a problem with them should not affect other accepted members of the VCG.

Figure 14:
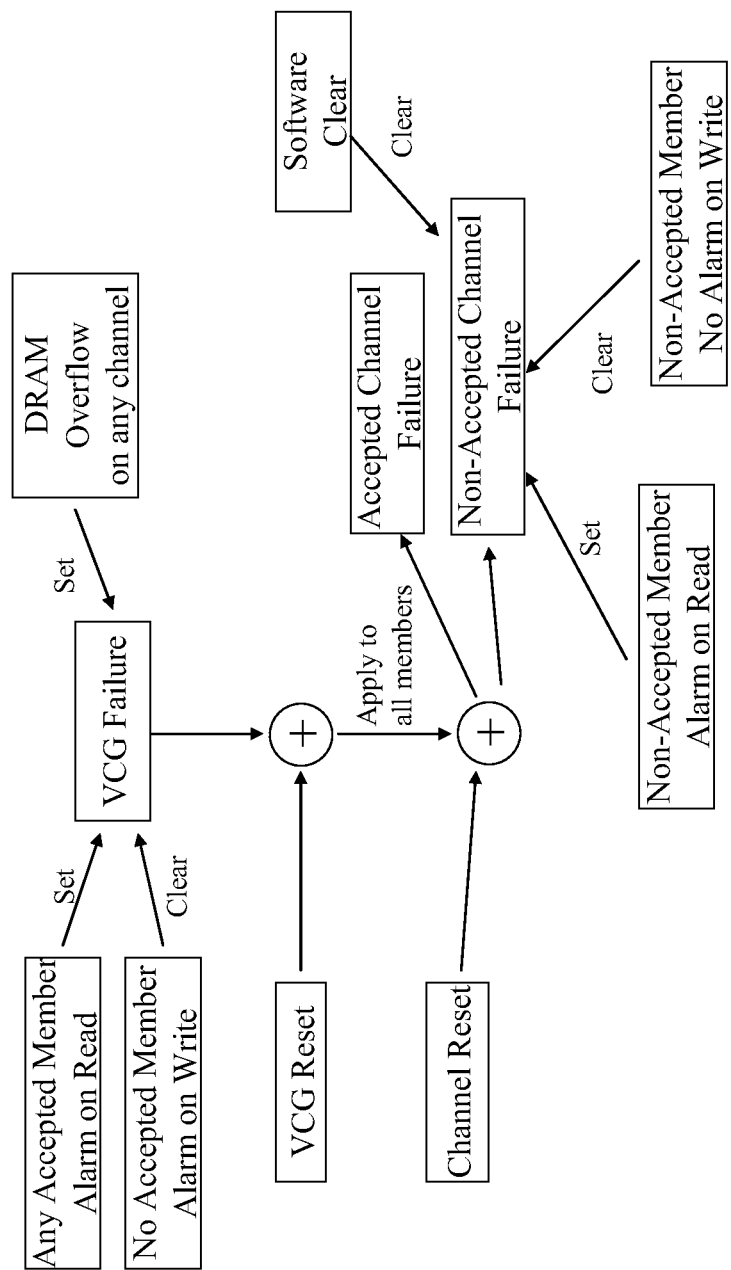
FIG. 14 is an illustration of how reset and failure modes work together for accepted and non-accepted members.

FIG. 14 shows how reset and failure modes work together for accepted and non-accepted members. VCG reset and channel reset are configuration states that are written by software. On the other hand, the per-channel read and write alarms are internal states maintained by hardware. Similarly, VCG failure and channel failure are also internal states maintained by hardware.

A single piece of logic, using any of the available calendars, uses the reset and alarm states to determine the failure states.

If any of the accepted channels of a VCG has its read alarm set, then the VCG failure bit will be set. On the other hand, if none of the channels of a VCG has its write alarm set, then the VCG failure bit is cleared. In order to ensure enough time for flushing the FIFOs, the VCG failure state needs to be asserted for a minimum amount of time of 1344×64 core-clock cycles.

When a VCG is in failure or reset mode, then all its members (accepted and non-accepted) will have their failure bits set. A channel failure bit will also be set when the channel is in reset mode. An accepted channel failure bit will only be cleared if the channel reset, the corresponding VCG reset, and the corresponding VCG failure bits are cleared. The incoming data must also be at the start of frame.

For non-accepted members, alarms will not cause VCG failures. Instead a channel read alarm (on the non-accepted member) will cause the member to go in failure mode. The channel will also go into failure mode if it is in reset. Once it is in failure mode, the non-accepted channel will set a sticky failure bit.

For a non-accepted member to go out of failure mode, it must have no write alarm, no reset, the sticky bit must have been cleared by software, and it must be receiving the start of frame.

The following table summarizes the bits required to maintain the alarm, reset, and failure states. Note that the space dedicated to reset state, the accepted bit, and the failure sticky bit is in the RX configuration.

TABLE 12

Alignment block alarm, reset, and failure state.

| Field | Size | Description |
|---|---|---|
| | | x128 |
| VCG Reset | 1 | Entire VCG is in reset state |
| VCG Failure | 1 | Entire VCG has failed |
| | | x1344 |
| Channel Reset | 1 | Channel is in reset state |
| Channel Failure | 1 | Channel is in failure state |
| Write Alarm | 1 | Alarm was detected by write manager |
| Read Alarm | 1 | Alarm was detected by read manager |
| Failure sticky | 1 | Stays high if a channel was in failure mode. Needs to be cleared by software. |
| Accepted | 1 | Member has been expected by software. Expected to carry valid data now or in the near future. |
| DRAM overflow | 1 | DRAM FIFO has overflowed. Will cause a VCG failure |

10 Write Manager

Figure 15:
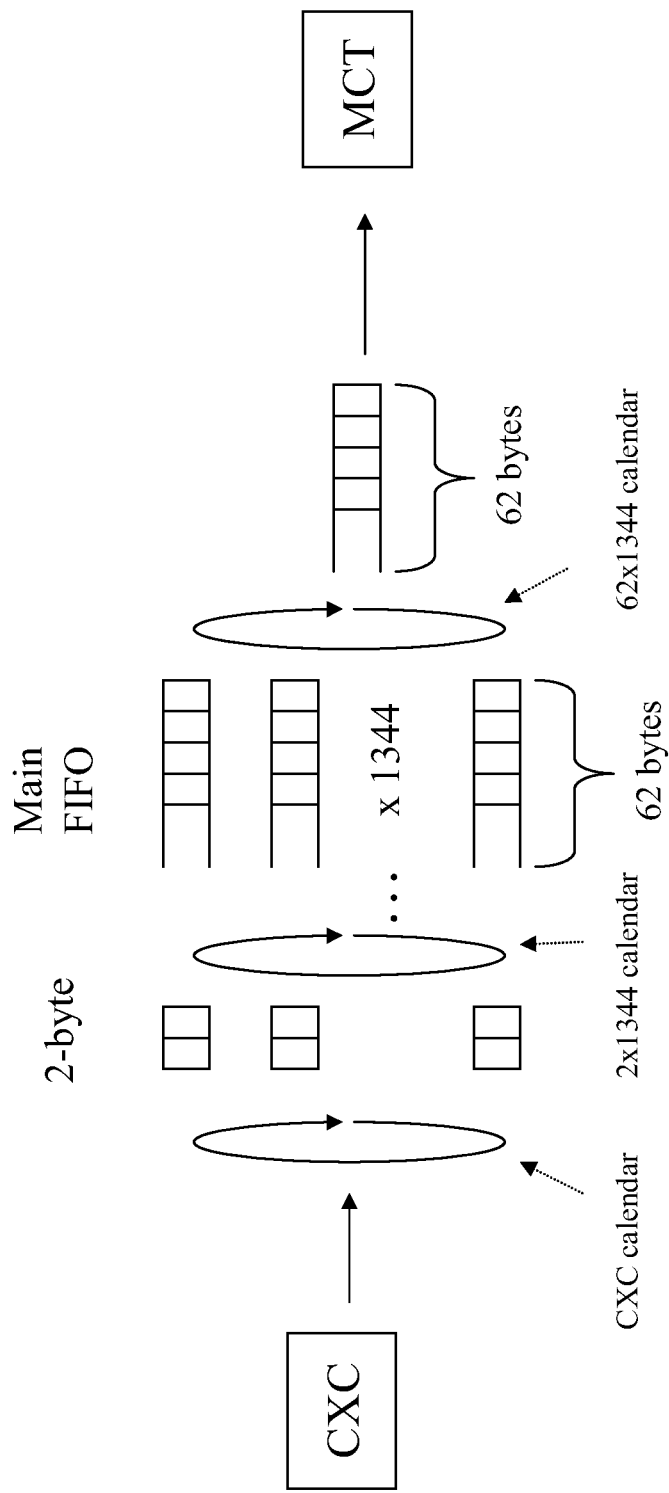
FIG. 15 is an illustration of a Main FIFO.

FIG. 15 shows another diagrammatic view of the write manager.

The write manager has 1344 main FIFOs, one for each channel. There is a two byte staging RAM preceding each FIFO. After all the main FIFOs, there is a single 62 byte RAM which is used to store bytes before they are sent as a single transfer to the MCT.

A byte arriving from the CXC is stored into the two-byte memory corresponding to its channel. A free running calendar periodically empties out the contents of the 2-byte memory into the corresponding main FIFO. Note that, most of the time, we will be writing two bytes worth of data, but sometimes there might be only 1 byte or none.

The main FIFO is made out of single port memories. Therefore, reads and writes in and out of these FIFOs are interleaved. There is a read cycle between every two write cycles and vice-versa. The free-running calendar that transfers data from the 2-byte RAM to its corresponding FIFO is running at full speed (no idles). A new FIFO is visited every two clocks cycles and up to two bytes are inserted during that clock cycle. The period will repeat every 1344×2 cycles.

Figure 16:
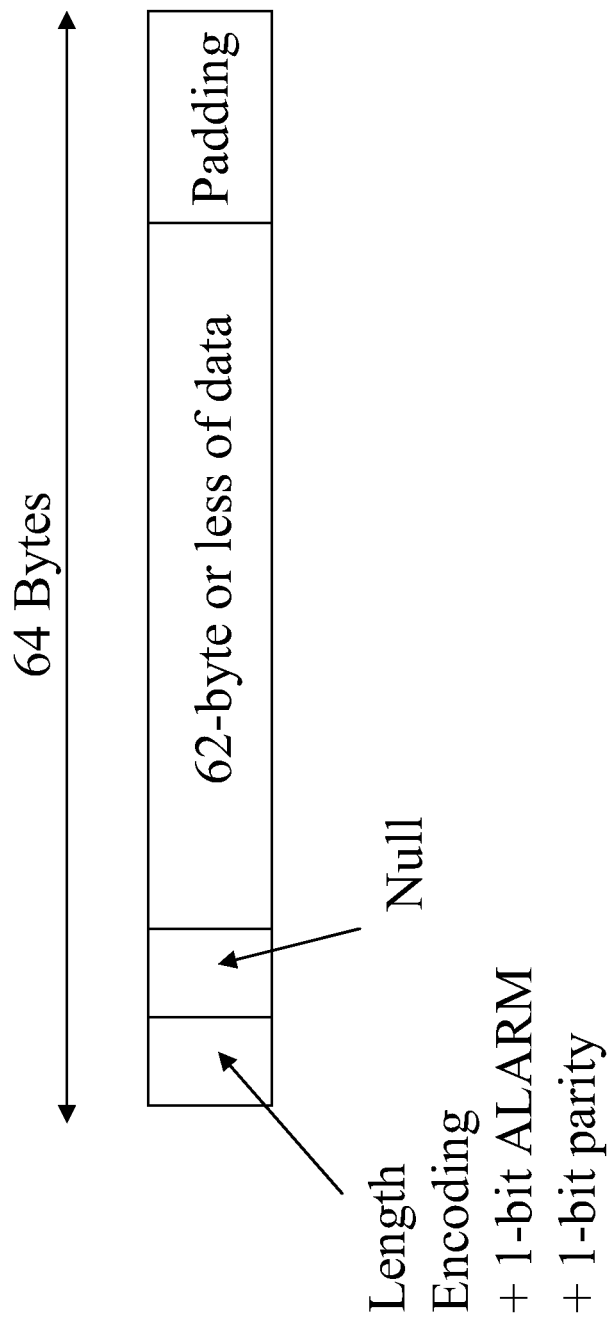
FIG. 16 is an illustration of a 64 byte word.

Similarly, a free-running calendar selects a main FIFO every 62 clock cycles and drains its contents (62 bytes or less) into a 62-byte RAM. The amount of data transferred is counted. This count and a null byte are prepended to the 62 bytes of data to form a 64-byte transfer. The overhead also contains a bit that signals failure (AIS) of the incoming channel as well as a parity bit protecting the 1-byte header. Table G illustrates the 64-byte transfer sent to the MCT. The period will repeat every 1344×62 cycles. This is illustrated in FIG. 16.

10.1 Alarm and Failure States

If a given channel receives data with the alarm signal from the analyzer block, it always sets the channel write alarm state. When it stops receiving alarmed data, it will clear the write alarm state.

If a channel is in write alarm state, but not in failure state, the write manager continues to write data to the MCT, but this data consists of all-ones, along with the alarm bit in the 64-byte transfer unit being active. The 2-byte and main FIFOs are not used, but need not be flushed (as long as the channel is not in failure mode). When a non-failed channel comes out of write alarm, the write manager continues writing to the MCT. Even though this data is stale, it does no harm to write it into the MCT.

As will be seen in the next section, setting the alarm bit in 64-byte transfer unit, will eventually cause a read alarm and consequently a VCG failure. VCG failure can also be caused by VCG reset or by a member of the VCG trying to write into a full FIFO. VCG failure will then create channel failures on all its members.

If a given channel is in failure state, the write manager no longer writes data to the MCT. Instead, the time intervals dedicated to that channel are used to flush the 2-byte FIFO, the main FIFO, as well as the DRAM FIFO. Data pushed by the CXC for that channel is discarded. The 2-byte FIFO and the main FIFO are flushed by reading the data as usual without passing it to the next stage. The DRAM FIFOs are flushed by setting the Invalid FIFO bit and by resetting the read and write pointers.

When a member comes out of failure state (it must be at the beginning of a frame), the MFI for the new frame is written in the Head MFI field. The new data transfer is sent to the MCT, and the write pointer is updated. Finally, the FIFO invalid bit is unset.

11 Read Manager

Figure 17:
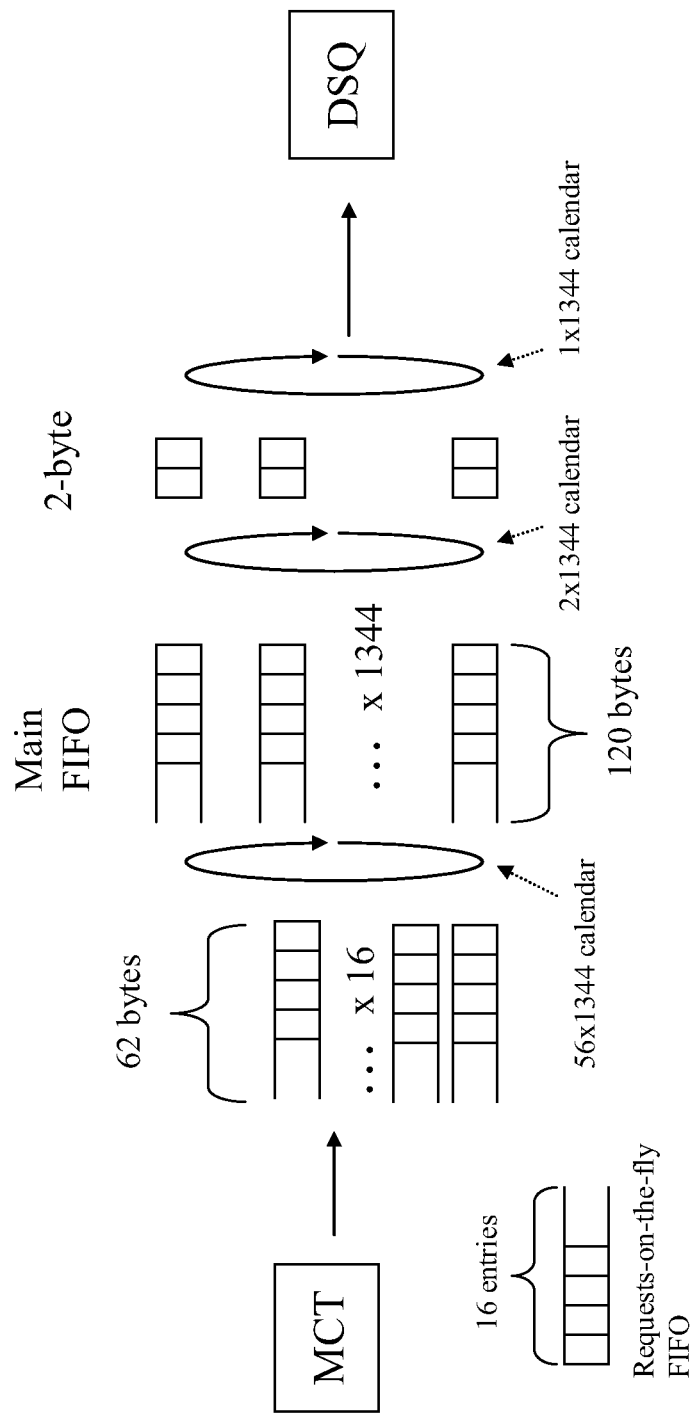
FIG. 17 is an illustration of a Main FIFO in a receive circuit.

FIG. 17 shows a block diagram of the read manager. The read manager has 1344 main FIFOs, one for each channel. Each FIFO has a size of 120 bytes. There is a two byte staging RAM after each FIFO. Before the main FIFOs, there is a single 62 byte RAM which is used to store bytes received from a single MCT transfer, while these bytes are being written to the main FIFOs.

A free-running calendar selects a main FIFO every 56 clock cycles. If the FIFO level is less than 58 bytes, then a read request is made to the MCT for that FIFO. When a read request is made, 62 bytes (or less) are eventually written into that FIFO. The read request period is repeated every 56×1344 clock cycles. Since each MCT transfer carries at least 56 bytes, this guarantees that the FIFO will not be totally empty as long as there is data in DRAM.

The read manager maintains a FIFO of requests that it has made to the MCT for which it has not received data yet. When a new request is made, a new entry is placed at the tail of this requests-on-the-fly FIFO. The entry contains the channel ID of the request. When a new piece of data is received from the MCT, the entry at the head of the requests-on-the-fly FIFO is retrieved. The channel ID on that entry indicates the FIFO to which that data belongs.

The maximum size of this requests-on-the-fly FIFO is 16 entries. If this FIFO is ever full, it is indicative of a DRAM bandwidth problem. This is NOT a catastrophic event. The read manager simply skips the current timeslot (does not make a new request in that timeslot), and keeps operating normally. If this overflow condition is only temporary, the read manager will eventually make up for the lost bandwidth.

If the request FIFO overflow condition happens too frequently, the DRAM FIFOs will eventually overflow and the alignment process will fail. This is an indication that the DRAM bandwidth is insufficient. In order to be able to detect this condition, the read manager keeps a global 32-bit status counter that records the number of times an overflow condition has been detected or a MCT not ready is detected. The CPU is notified via a (maskable) interrupt whenever the counter value changes.

The read manager may also need up to 16 62-byte buffers to store bursts of data coming from the MCT. If writing into the main FIFO is faster than 2-bytes for every two cycles, this buffering can potentially be decreased.

The main FIFO is made out of single port memories. Therefore, reads and writes in and out of these FIFOs are interleaved. There is a read cycle between every two write cycles and vice-versa.

Another free running calendar periodically fills the contents of the 2-byte memories by transferring data from the corresponding main FIFO. This is done 2 bytes at a time every two cycles (only during read cycles). The period repeats itself every 1344×2 cycles.

Another free-running calendar pulls data from the 2-byte staging RAM to send to the desequencer. One byte may be read every clock cycle from a different RAM. The period repeats itself every 1344 cycles. Section 11.2 describes how the read state machine decides whether to read a byte or not.

11.1 Alarm and Failure States

The read manager detects read alarms by observing the alarm bit in the 64-byte transfer unit that is read from the MCT.

If a read alarm is detected on an accepted channel, it will cause the entire VCG to go into failure state. This will then cause every member of that VCG to go into failure mode. If a read alarm is detected on a non-accepted channel, it will only cause that channel to enter into failure state.

While a channel is in failure mode, the read manager does not read data from the MCT. During the time intervals dedicated to that channel, the read manager simply flushes the corresponding main FIFO and 2-byte FIFO. On the interface to the DeSequencer, it sends an all-ones byte, along with an alarm indication.

When a channel comes out of failure mode, it checks to see if the DRAM FIFO invalid bit is cleared. Once this bit is cleared, it reads the Head MFI value for that channel. It can now continue reading from the MCT and proceed with the normal operations.

11.2 Read State Machine

The following state machine describes the operation performed by the read manager in order to achieve alignment of all members of a VCG. The state machine decides, for each channel, whether the byte sitting at the head of the 2-byte FIFO should be kept there, read and discarded, or read and passed to the DeSequencer. The appropriate combination of these 3 operations will byte-align all members of the same VCG.

Table 13 shows the additional state required for each VCG. The per-VCG state contains information describing the conditions of a given VCG as it is trying to align itself. The alignment MFI (AMFI) is the target MFI to which the entire VCG is trying to align itself. Aligned members have their own MFI locked to the VCG's AMFI. The SOF bit indicates that the aligned members of the VCG are encountering a start of frame. The DRAIN bit indicates that there is at least one member of the group that is trying to catch up to the aligned members (later this is defined as being in DRAIN state). Finally the STALL bit indicates that at least one aligned member of the VCG has an empty FIFO. This means that that the entire VCG needs to wait for this one member.

TABLE 13

Additional per-VCG state require by Read Manager state machine. x128

| Field | Size | Description |
| --- | --- | --- |
| AMFI | 12 (x1) | Alignment MFI that all VCG member are trying to reach. |
| AMFI_VALID | 1 (x1) | 1 if AMFI is valid. Set to 0 during FAILURE state |
| VCG_NSOF | 1 (x3) | 1 if aligned members are NOT at start of frame position |
| VCG_DRAIN | 1 (x3) | 1 if at least one member of the VCG is in DRAIN state |
| VCG_STALL | 1 (x3) | 1 if entire VCG has to wait temporarily for FIFO to refill |

Figure 18:
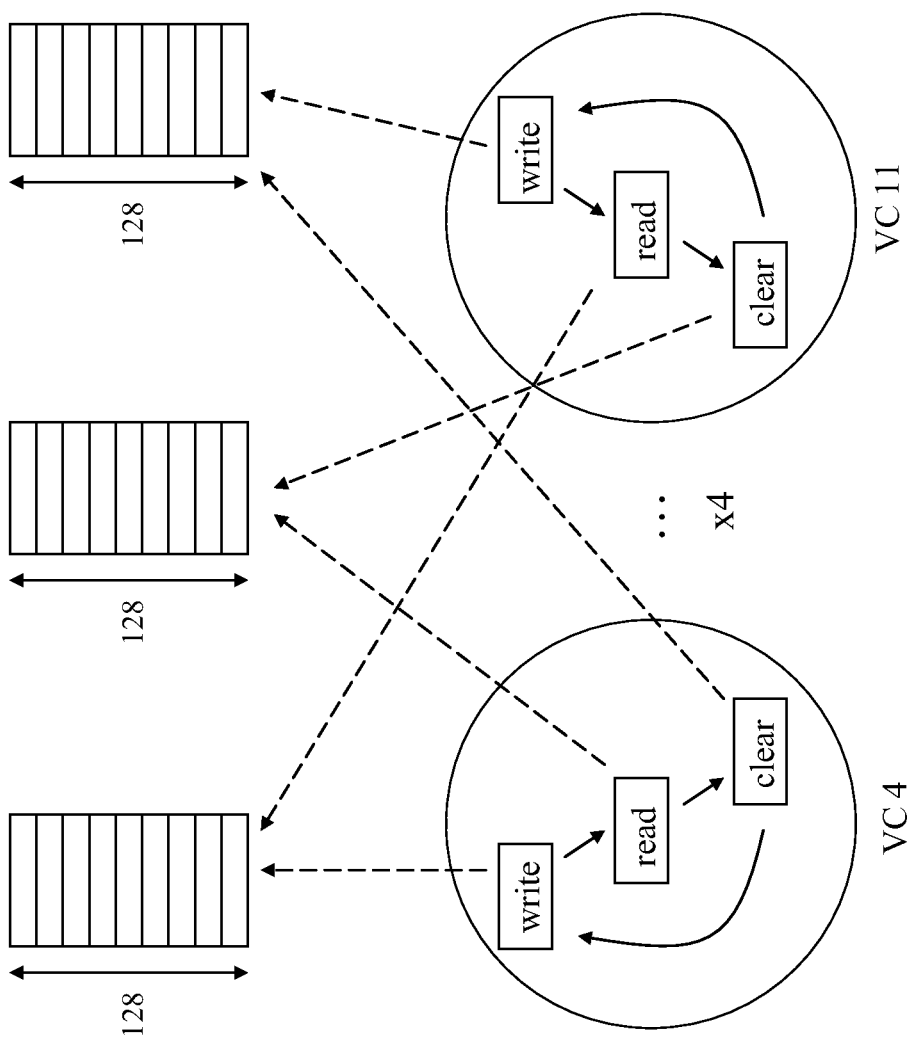
FIG. 18 is an illustration of how states are set.

There are 3 copies of the per-VCG states NSOF, DRAIN, and STALL (or wait). FIG. 18 illustrates how the 3 copies are used. During one calendar rotation period, the state machine is writing into one of the copies, reading from another one, and clearing the $3^{rd}$ copy. After a calendar rotation, the write copy becomes the read copy, the read copy becomes the clear copy, and the clear copy becomes the write copy.

Note that each type of VCG (VC-4, VC-3, VC-12, and VC-11) has a different calendar rotation period. The VC-4 calendar rotates every 16 core clock cycles, the VC-3 calendar rotates every 48 core clock cycles, the VC-12 calendar rotates every 1008 cycles, and the VC-11 calendar rotates every 1344 cycles. Therefore for each of the 4 VCG types, we need a set of pointers indicating which of the 3 copies is write, read, or clear.

Table 14 shows the additional per-channel state required by this state machine.

TABLE 14

Additional per-channel state require by Read Manager state machine. x1344

| | | |
| --- | --- | --- |
| CMFI | 12 | Current MFI of byte at the head of the 2-byte FIFO |
| STATE | 3 | Determines if the state is FAIL, INIT, WAIT, DRAIN, or GO |
| BYTE_COUNT | 12 | Number of bytes processed for the current packet |

Figure 19:
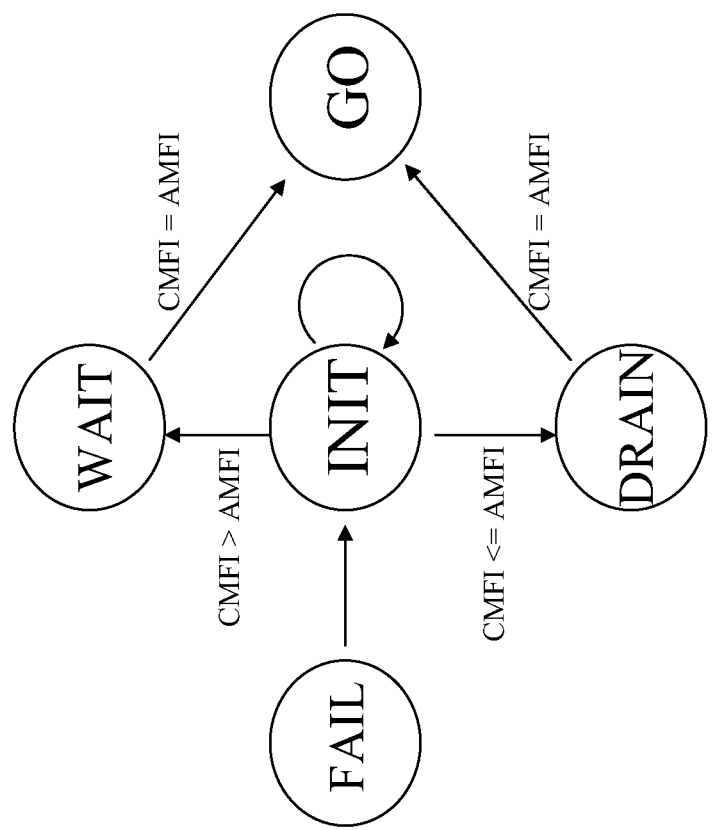
FIG. 19 is an illustration of a state diagram for LCAS.

FIG. 19 shows a high-level state diagram of the algorithm used by the Read Manager to perform alignment. When not in channel failure mode, each channel can be in one of 4 states: INIT, WAIT, DRAIN, and GO.

In INIT state, a channel is waiting to obtain the MFI value from Head MFI field. Once the current MFI value is obtained, the channel can determine whether it is too far ahead of the alignment MFI (WAIT state) or whether it is too far behind the alignment MFI (DRAIN state). In WAIT state the FIFO is never drained, while in DRAIN state that FIFO is always drained and the data discarded. When the channel MFI is the same as the alignment MFI, it enters the GO state where it is now reading data from the FIFO along with the other members of the VCG in GO state. All the members in GO state are aligned. A per-channel status bit (and interrupt) will notify software of whether a given channel is aligned or not.

The following pseudo-code explains in more detail the read manager algorithm. The subscripts _write, _read, and _clear are used to indicate which of the 3 per-VCG state copies is being used.

```
1. Check for channel failure
    If channel failure bit is set
        Go to step 7
    If channel failure bit is released
        Set state to INIT
2. Initialization and Read Actions
If (state == INIT)
    If (DRAM FIFO invalid == 1) or (SRAM FIFO is empty)
        Stay in INIT
    Else
        Get CMFI from Head MFI field
        If (AMFI_VALID == 0)
            Stay in INIT
        Else If (CMFI <= AMFI)
            Set state to DRAIN
        Else If (CMFI > AMFI)
            Set state to WAIT
If (state == DRAIN)
    If (CMFI == AMFI) and (VCG_NSOF_read == 0) and
    (channel is in SOF)
        Set state to GO
    Else If (SRAM FIFO is non-empty) and (VCG_STALL_read == 0)
        Read byte from Read Mgr FIFO and throw it away
If (state == WAIT)
    If (CMFI == AMFI) and (VCG_NSOF_read == 0)
        If (VCG_STALL_read == 0) and (VCG_DRAIN_read ==0)
            Read byte from Read Mgr FIFO and send to De-Sequencer
        Set state to GO
If (state == GO)
    If (VCG_STALL_read == 0) and [(VCG_NSOF_read == 1)
    or (VCG_DRAIN_read == 0)]
        Read byte from Read Mgr FIFO and send to De-Sequencer
If (state == IDLE)
    Transmit "Fail/Reset" to De-Sequencer
4. Write Actions (using FIFO levels and byte counts updated after step 3)
    If (state == DRAIN)
        VCG_DRAIN_write = 1
    If (state == GO) and (SRAM FIFO is empty)
        VCG_STALL_write = 1
    If [(state == GO) and SRAM FIFO head is NOT SOF
        VCG_NSOF_write = 1
5. Update CMFI (using FIFO levels and byte counts updated after step 3)
6. Update AMFI (using CMFI values computed in step 5)
    If (state == INIT) and (DRAM FIFO invalid == 0) and
    (AMFI_VALID ==0) and (SRAM FIFO is non-empty)
        AMFI = CMFI
        AMFI_VALID = 1
    If state = GO
        AMFI = max (CMFI, AMFI)
        AMFI_VALID = 1
7. Clear Actions
    VCG_DRAIN_clear =0
    VCG_STALL_clear = 0
    VCG_NSOF_clear = 0
```

Figure 20:
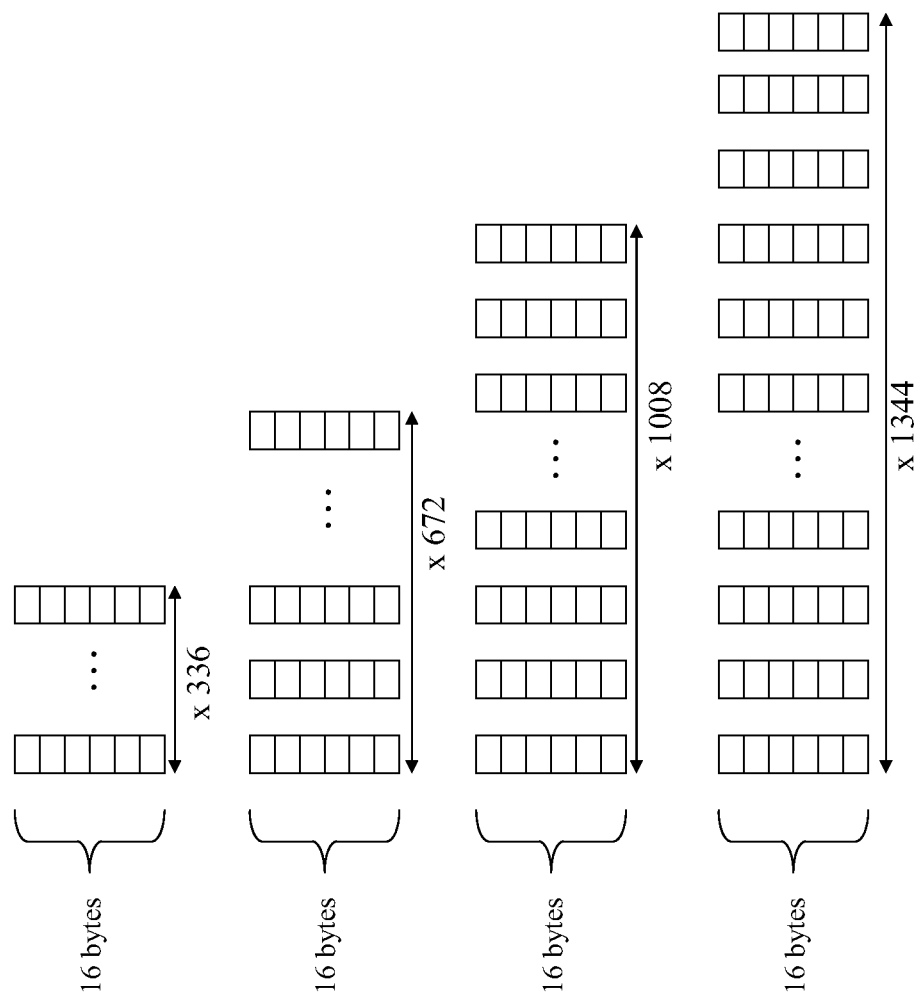
FIG. 20 is an illustration of how main FIFOs are distributed.

12 Optimizations
12.1 Write Main FIFOs
FIG. 20 illustrates how the main FIFOs are distributed.

The invention claimed is:

1. A system for performing Local Center Authorization Service (LCAS) in a network system, comprising:
   a data aligner configured to receive input data from a plurality of data channels, each data channel from among the plurality of data channels including a plurality of channel members, and each channel member from among the plurality of channel members including a plurality of data bytes, and to group the data bytes according to channel members to provide aligned data;
   an LCAS control manager configured to generate de-sequencing control commands in response to the aligned data;
   a de-sequencer configured to de-sequence the aligned data according to the de-sequencing control commands; and
   a plurality of free running calendars configured to run at different speeds and to provide the data aligner with a channel processing order,
   wherein the data aligner is further configured to process data within each of the plurality of data channels in accordance with the channel processing order to provide the aligned data by correlating each of the plurality of free running calendars to a corresponding data channel from among the plurality of data channels depending on an amount of data within each data channel from among the plurality of data channels.

2. The system according to claim 1, wherein the data aligner comprises:
   a write manager configured to store the input data in a first memory;
   a multi-channel transparency module having a second memory, the second memory being configured to store the input data received from the write manager; and
   a read manager configured to write the input data stored in the second memory into a third memory as the aligned data.

3. The system according to claim 2, wherein the first and the third memory are static random access memory (SRAM) modules, and wherein the second memory is a dynamic random access memory (DRAM) module.

4. The system according to claim 1, wherein the plurality of free running calendars is further configured to move data between stages of a virtual concatenation (VCT) alignment block included in the input data.

5. The system according to claim 4, wherein the plurality of free running calendars
is configured to operate at the different speeds for different stages.

6. The system according to claim 1, wherein the network system is configured to operate utilizing a Synchronous Optical Network (SONET) transport protocol.

7. The system according to claim 1, wherein the LCAS control manager comprises:
   an LCAS state machine configured to store and to manage state data related to a state of system LCAS hardware; and
   a virtual concatenation (VCT) module configured to perform virtual and standard concatenation processes in the network system.

8. The system according to claim 7, wherein the VCT module is further configured to receive or to transmit Synchronous Optical Network/Synchronous Digital Hierarchy (SONET/SDH) traffic.

9. The system according to claim 1, wherein each channel member from among the plurality of channel members corresponds to a multi-frame indicator (MFI), and wherein the de-sequencing control commands further include the MFI for each channel member from among the plurality of channel members.

10. A system for performing Local Center Authorization Service (LCAS), comprising:
    a data aligner configured to receive input data from a plurality of channels, each channel from among the plurality of channels including a plurality of channel members and a plurality of data bytes, each channel member from among the plurality of channel members corresponding to a multi-frame indicator (MFI), and to group the plurality of data bytes according to channel members to provide aligned data, the data aligner including:

a write manager configured to store the input data in a first memory;

a second memory configured to store the input data received from the write manager in a second memory; and a read manager configured to write the input data stored in the second memory in a third memory as the aligned data;

an LCAS control manager configured to generate de-sequencing control commands including the MFI for each channel member in response to storage of the aligned data in the third memory;

a de-sequencer configured to de-sequence the aligned data according to the de-sequencing control commands; and a plurality of free running calendars configured to run at different speeds and to provide the data aligner with a channel processing order, wherein the data aligner is further configured to process data within each data channel from among the plurality of data channels in accordance with the channel processing order to provide the aligned data by correlating each free running calendar from among the plurality of free running calendars to a corresponding data channel from among the plurality of data channels depending on an amount of data within each data channel from among the plurality of data channels.

11. The system according to claim 10, wherein the LCAS control manager comprises:

an LCAS state machine configured to store and to manage state data related to a state of system LCAS hardware; and a virtual concatenation (VCT) module to perform virtual and standard concatenation processes in the network system.

12. The system according to claim 11, wherein the VCT module is further configured to receive or to transmit Synchronous Optical Network/Synchronous Digital Hierarchy (SONET/SDH) traffic.

13. A method for performing Local Center Authorization Service (LCAS) in a network system, comprising:

receiving by the network system, input data from a plurality of channels, each channel from among the plurality of channels including a plurality of data bytes;

grouping, by the network system, the plurality of data bytes according to channel members to provide aligned data;

generating, by the network system, de-sequencing control commands in response to the aligned data;

de-sequencing, by the network system, the aligned data according to the de-sequencing control commands;

determining, by the network system, a channel processing order for the data aligner to align the input data;

correlating, by the network system, a free running calendar from among a plurality of free running calendars running at different speeds to a corresponding data channel from among the plurality of data channels depending on an amount of data within each data channel from among the plurality of data channels; and processing, by the network system data within each data channel from among the plurality of data channels in accordance, with the channel processing order.

14. The method according to claim 13, wherein the grouping comprises:

storing the input data in a first memory;

storing the input data received from the first memory in a second memory; and writing the input data stored in the second memory to a third memory as the aligned data.

15. The method according to claim 14, wherein the first memory is a static random access memory (SRAM), wherein the second memory is a dynamic random access memory (DRAM), and wherein the third memory is another SRAM memory.

16. The method according to claim 14, further comprising:

determining an LCAS packet identification (LPID) for each data channel from among the plurality of data channels;

storing the input data in the first memory if the LPID indicates a data channel is a Virtual Concatenation (VCAT) transmission; and otherwise:

sending the input data to a non-VCAT transmission module for packet overhead processing (POH).

17. The method according to claim 13, further comprising:

moving data between stages of a virtual concatenation (VCT) alignment block included in the input data, utilizing the plurality of free running calendars.

18. The method according to claim 17, wherein the moving further comprises:

moving the data between stages of a VCT alignment block utilizing a free running calendar from among the plurality of free running calendars at different speeds for different stages.

19. The method according to claim 13, wherein the grouping through the processing conforms to a Synchronous Optical Network/Synchronous Digital Hierarchy (SONET) transport protocol.

20. The method according to claim 13, further comprising:

configuring an LCAS state machine to store and manage state data related to a state of system LCAS hardware; and performing virtual and standard concatenation processes in the network system using a virtual concatenation (VCT) module.

21. The method according to claim 20, wherein the performing further comprises:

receiving or transmitting Synchronous Optical Network/Synchronous Digital Hierarchy (SONET/SDH) traffic utilizing the VCT module.

* * * * *

UNITED STATES PATENT AND TRADEMARK OFFICE
CERTIFICATE OF CORRECTION

PATENT NO. : 8,503,470 B2
APPLICATION NO. : 12/716094
DATED : August 6, 2013
INVENTOR(S) : Paolo Narvaez Page 1 of 1

It is certified that error appears in the above-identified patent and that said Letters Patent is hereby corrected as shown below:

In the Claims:

Column 116, Line 4, please change "network system data" to --network system, data--.

Column 116, Lines 5-6, please change "in accordance, with" to --in accordance with--.

Signed and Sealed this
Twelfth Day of November, 2013

Teresa Stanek Rea
*Deputy Director of the United States Patent and Trademark Office*